(12) United States Patent
Waga et al.

(10) Patent No.: US 11,537,415 B2
(45) Date of Patent: Dec. 27, 2022

(54) INFORMATION PROCESSING APPARATUS, INFORMATION PROCESSING CIRCUIT, INFORMATION PROCESSING SYSTEM, AND INFORMATION PROCESSING METHOD

(71) Applicant: Inter-University Research Institute Corporation Research Organization of Information and Systems, Tokyo (JP)

(72) Inventors: Masaki Waga, Saitama (JP); Ichiro Hasuo, Tokyo (JP)

(73) Assignee: Inter-University Research Institute Corporation Research Organization of Information and Systems, Tokyo (JP)

(*) Notice: Subject to any disclaimer, the term of this patent is extended or adjusted under 35 U.S.C. 154(b) by 651 days.

(21) Appl. No.: 16/583,876

(22) Filed: Sep. 26, 2019

(65) Prior Publication Data
US 2020/0104142 A1    Apr. 2, 2020

(30) Foreign Application Priority Data

Oct. 2, 2018  (JP) .............................. JP2018-187340
Jul. 11, 2019  (JP) .............................. JP2019-129643

(51) Int. Cl.
*G06F 9/448*  (2018.01)
*G06F 16/903*  (2019.01)
(Continued)

(52) U.S. Cl.
CPC ............ *G06F 9/4498* (2018.02); *G06F 9/544* (2013.01); *G06F 16/90344* (2019.01);
(Continued)

(58) Field of Classification Search
CPC .... G06F 9/4498; G06F 9/544; G06F 11/3072; G06F 16/90344; G06N 5/00; G06N 7/00
See application file for complete search history.

(56) References Cited

U.S. PATENT DOCUMENTS

2006/0015858 A1   1/2006  Tanimoto et al.
2009/0306965 A1*  12/2009  Bonnet ............... G06F 16/9027
                                                             704/9
(Continued)

FOREIGN PATENT DOCUMENTS

GB    2362789 A  * 11/2001 ......... G06K 9/00711
JP    2004-110327     4/2004
(Continued)

OTHER PUBLICATIONS

English Translation of JP-2004110327-A (Year: 2004).*
(Continued)

*Primary Examiner* — Henry Tsai
*Assistant Examiner* — John B Roche
(74) *Attorney, Agent, or Firm* — IPUSA, PLLC

(57) ABSTRACT

An information processing apparatus according to an aspect of the present invention includes an information processing circuit configured to generate a finite state machine based on a predetermined matching condition with respect to sequence data of an event that is input to the information processing apparatus; to process the sequence data so as to substantially remove data that does not match the matching condition from the sequence data; and to output the processed sequence data.

14 Claims, 38 Drawing Sheets

(51) Int. Cl.
*G06F 9/54* (2006.01)
*G06N 5/00* (2006.01)
*G06N 7/00* (2006.01)
*G06F 11/30* (2006.01)

(52) U.S. Cl.
CPC ............... *G06N 5/00* (2013.01); *G06N 7/00* (2013.01); *G06F 11/3072* (2013.01)

(56) References Cited

U.S. PATENT DOCUMENTS

| | | | | |
|---|---|---|---|---|
| 2011/0295869 | A1* | 12/2011 | Schneider | G06F 16/90344 707/758 |
| 2013/0263092 | A1 | 10/2013 | Chikahisa et al. | |
| 2018/0307584 | A1* | 10/2018 | Smith | G06F 9/44521 |
| 2018/0330008 | A1* | 11/2018 | Fan | G06F 16/9024 |

FOREIGN PATENT DOCUMENTS

| | | | |
|---|---|---|---|
| JP | 2004110327 A | * | 4/2004 |
| JP | 2009-058989 | | 3/2009 |
| WO | 2004/038620 | | 5/2004 |
| WO | 2012/057170 | | 5/2012 |

OTHER PUBLICATIONS

Eugene Asarin, Oded Maier, Dejan Nickovic, and Dogan Ulus, 2017, Combining the Temporal and Epistemic Dimensions for MTL Monitoring. A. Abate and G. Geeraerts (Eds.), 2017, Proc. Formats. LNCS, vol. 10419. Springer.

M. Krichen and S. Tripakis, 2009, Conformance testing for real-time systems, FMSD 34, 3 (2009), pp. 238-304.

Leena Salmela, Jorma Tarhio, and Jari Kytojoki, 2006, Multi-pattern string matching with q-grams, ACM Journal of Experimental Algorithmics 11 (2006).

D. Ulus, T. Ferrere, E. Asarin, and O. Maier, 2014, Timed Pattern Matching, In Proc. Formats, (LNCS), A. Legay and M. Bozga (Eds.), vol. 8711, Springer, pp. 222-236.

Masaki Waga, Ichiro Hasuo, and Kohei Suenaga, 2017, Efficient Online Timed Pattern Matching by Automata-Based Skipping, pp. 224-243.

* cited by examiner

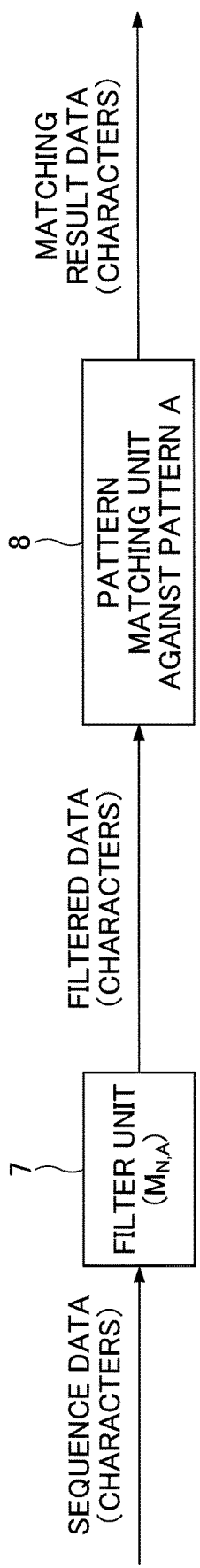

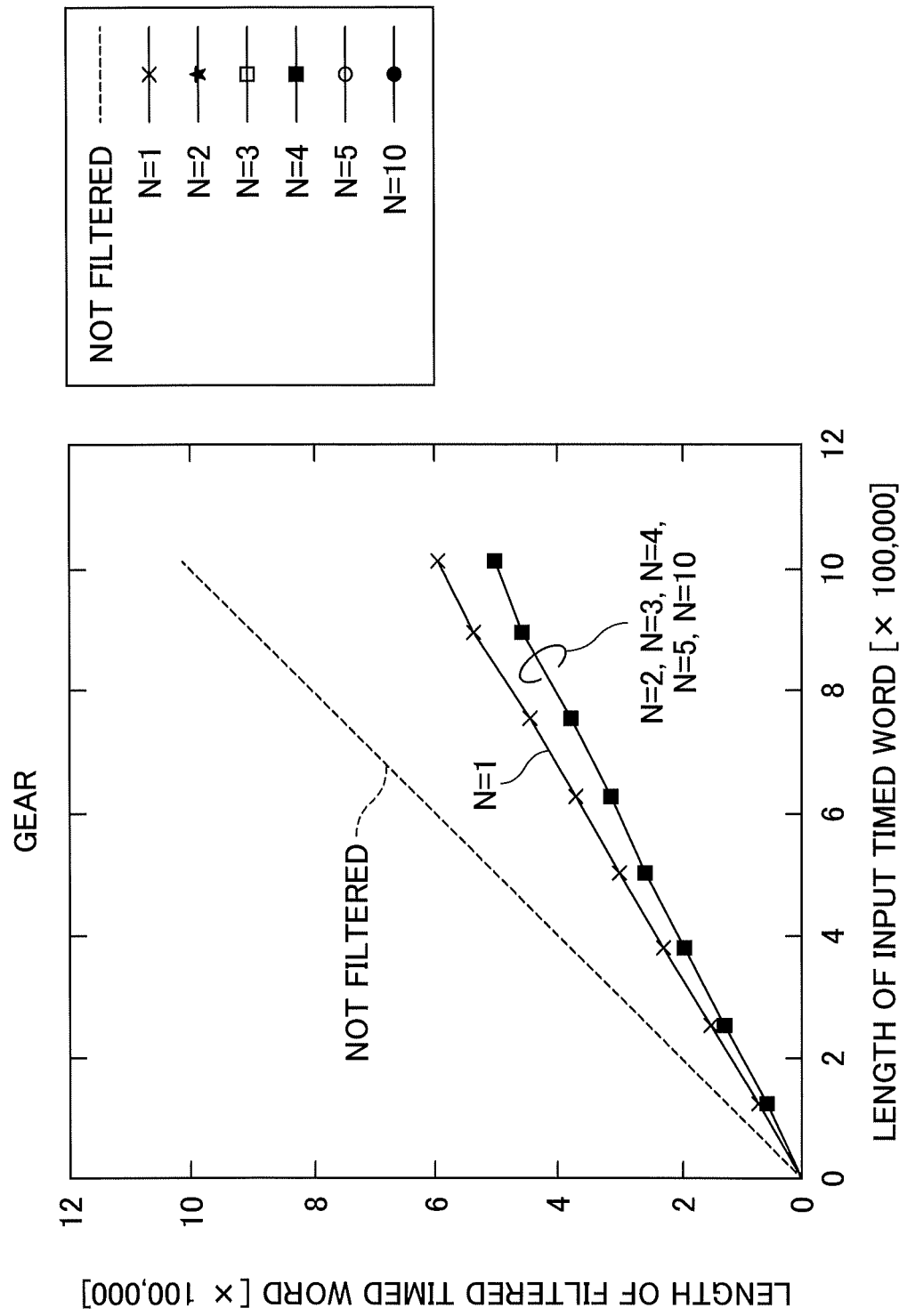

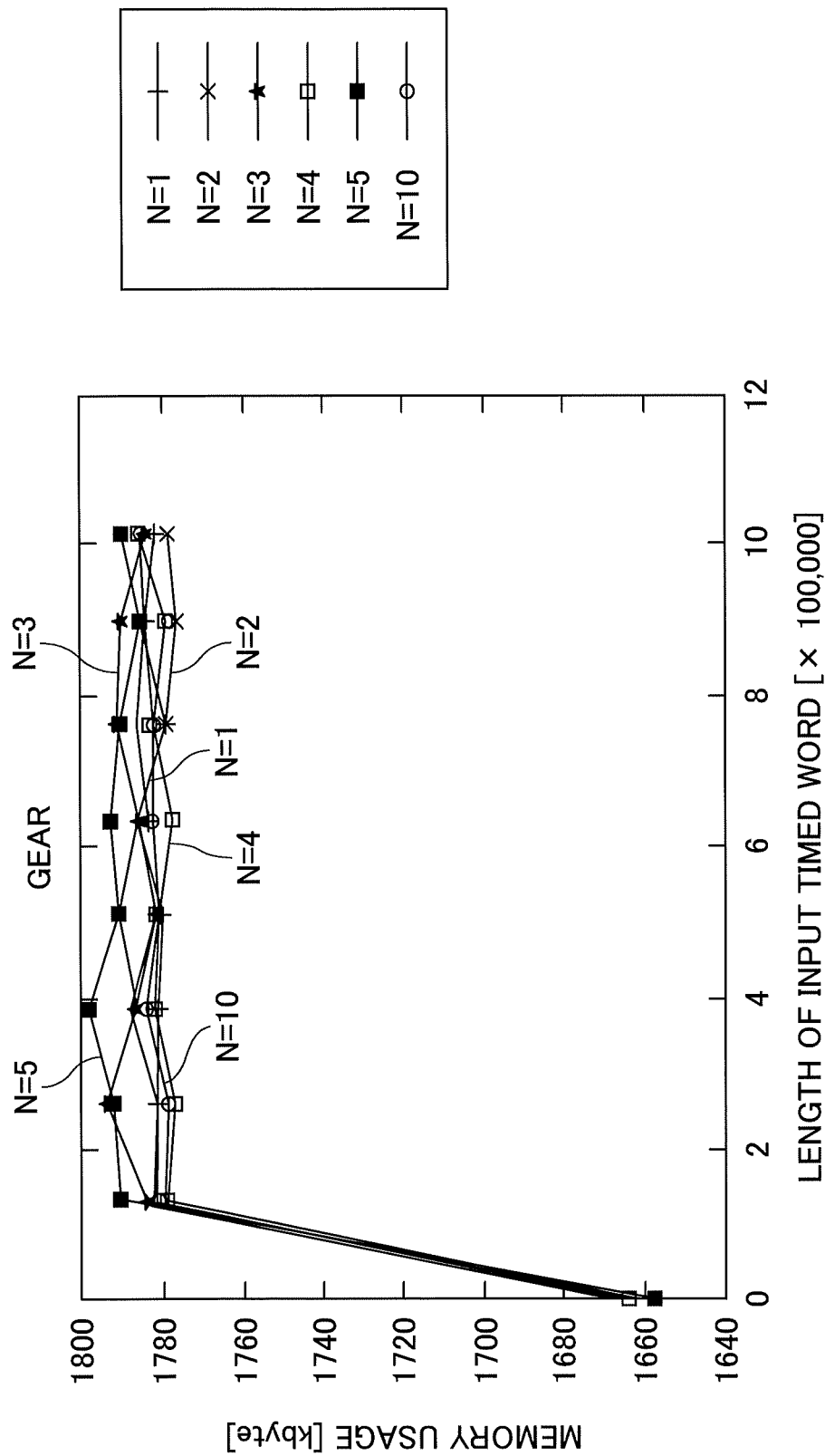

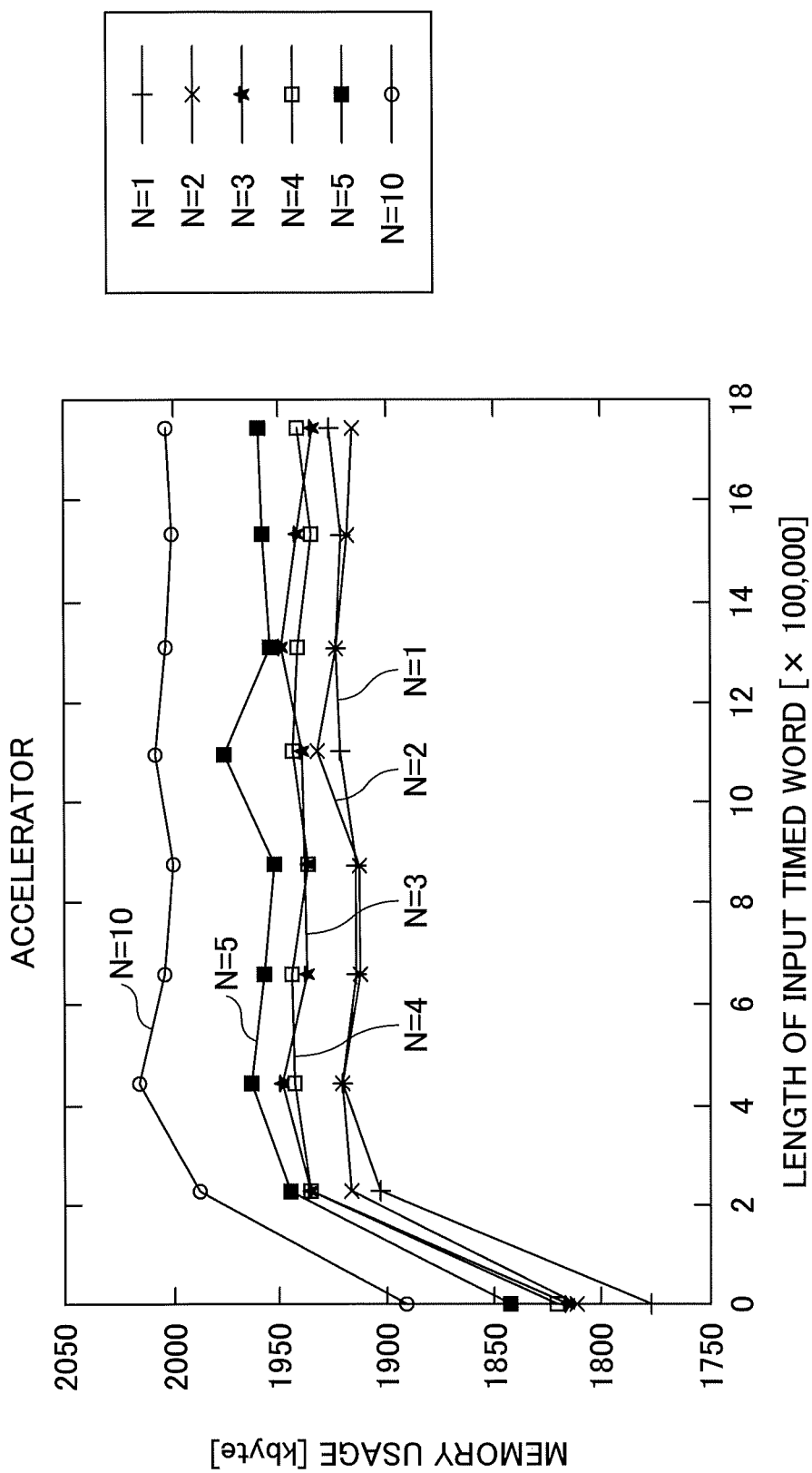

INITIAL STATE             ACCEPTING STATE

FIG.20

| TRAN-SITION | STATE BEFORE TRANSITION | STATE AFTER TRANSITION | INPUT |
|---|---|---|---|
| $\delta_0$ | $q_0'$ | $q_1'$ | a |
| $\delta_1$ | $q_0'$ | $q_0'$ | b, $\perp$ |
| $\delta_2$ | $q_1'$ | $q_2'$ | a |
| $\delta_3$ | $q_1'$ | $q_3'$ | b |
| $\delta_4$ | $q_1'$ | $q_0'$ | $\perp$ |
| $\delta_5$ | $q_2'$ | $q_2'$ | a |
| $\delta_6$ | $q_2'$ | $q_4'$ | b |
| $\delta_7$ | $q_2'$ | $q_0'$ | $\perp$ |
| $\delta_8$ | $q_3'$ | $q_1'$ | a |
| $\delta_9$ | $q_3'$ | $q_0'$ | b, $\perp$ |
| $\delta_{10}$ | $q_4'$ | $q_2'$ | a |
| $\delta_{11}$ | $q_4'$ | $q_0'$ | b, $\perp$ |

FIG.21

| STATE | SUBSET | Current |
|---|---|---|
| $q_0'$ | $\{(s_0, 0)\}$ | 0 |
| $q_1'$ | $\{(s_0, 0), (s_1, 1)\}$ | 1 |
| $q_2'$ | $\{(s_0, 0), (s_1, 1), (s_1, 2)\}$ | 0 |
| $q_3'$ | $\{(s_0, 0), (s_2, 2)\}$ | 0 |
| $q_4'$ | $\{(s_0, 0), (s_2, 1), (s_2, 2)\}$ | 0 |

INFORMATION PROCESSING APPARATUS, INFORMATION PROCESSING CIRCUIT, INFORMATION PROCESSING SYSTEM, AND INFORMATION PROCESSING METHOD

CROSS-REFERENCE TO RELATED APPLICATION

This patent application is based on and claims priority to Japanese Patent Application No. 2018-187340 filed on Oct. 2, 2018, and Japanese Patent Application No. 2019-129643 filed on Jul. 11, 2019, the entire contents of which are hereby incorporated by reference.

BACKGROUND OF THE INVENTION

1. Field of the Invention

The present invention relates to an information processing apparatus that performs filtering for pattern matching, an information processing system including the information processing apparatus, and an information processing method.

2. Description of the Related Art

For example, Patent Document 1 discloses a time-series association extracting device for filtering time-series data, which is capable of preventing a significant time-consuming process even if the number of transactions increases. When retrieving a combination of records from a set of records consisting of multiple attributes, this time-series association extracting device includes a time-series filter unit including a specifying means for specifying a search pattern using multiple events each defining that a predetermined attribute takes a specific value, and using a relationship of an order between the multiple events that is defined based on an order of the attributes, a search means for searching for a combination of records corresponding to the specified search pattern from the set of records, and an output means for outputting a search result. The time-series association extracting device also has a function for extracting a time-series association rule by a time-series association engine unit.

RELATED ART DOCUMENTS

Patent Documents

[Patent Document 1] Japanese Laid-open Patent Application Publication No. 2004-110327
[Patent Document 2] WO 2004/038620
[Patent Document 3] WO 2012/057170

Non-Patent Documents

[Non-patent Document 1] Eugene Asarin, Oded Maler, Dejan Nickovic, and Dogan Ulus, 2017, Combining the Temporal and Epistemic Dimensions for MTL Monitoring. A. Abate and G. Geeraerts (Eds.), 2017, Proc. FORMATS. LNCS, Vol. 10419. Springer.
[Non-Patent Document 2] M. Krichen and S. Tripakis, 2009, Conformance testing for real-time systems, FMSD 34, (2009), 238-304.
[Non-patent Document 3] Leena Salmela, Jorma Tarhio, and Jari Kytojoki, 2006, Multi-pattern string matching with q-grams, ACM Journal of Experimental Algorithmics (2006)
[Non-Patent Document 4] D. Ulus, T. Ferrere, E. Asarin, and O. Maler, 2014, Timed Pattern Matching, In Proc. FORMATS, (LNCS), A. Legay and M. Bozga (Eds.), Vol. 8711, Springer, 222-236.
[Non-Patent Document 5] Masaki Waga, Ichiro Hasuo, and Kohei Suenaga, 2017, Efficient Online Timed Pattern Matching by Automata-Based Skipping, 224-243.

SUMMARY OF THE INVENTION

An object of the present invention is to provide an information processing apparatus for performing filtering for pattern matching, an information processing system and an information processing method for efficiently performing pattern matching using filtering compared to conventional examples.

An information processing apparatus according to an embodiment of the present invention comprises an information processing circuit configured to generate a finite state machine based on a predetermined matching condition with respect to sequence data of an event that is input to the information processing apparatus; to process the sequence data so as to substantially remove data that does not match the matching condition from the sequence data; and to output the processed sequence data.

BRIEF DESCRIPTION OF THE DRAWINGS

FIG. 2 is a conceptual diagram illustrating a relationship between a pattern matching process and a filtering process;

FIG. 11B is a graph illustrating simulation results in the Moore machine filter for the data of the gear position sensor of the automobile according to Example 1, and illustrating a length of a filtered timed word with respect to a length of an input timed word;

FIG. 13B is a graph illustrating simulation results of the Moore machine filter for the automotive gear position sensor data according to Example 1, and illustrating memory usage with respect to a length of an input timed word;

FIG. 13C is a graph illustrating simulation results of the Moore machine filter for the automotive throttle position sensor data according to Example 1, and illustrating memory usage with respect to a length of an input timed word;

FIG. 20 is a diagram illustrating an example of a state transition table of the Moore machine according to the second embodiment;

FIG. 21 is a diagram illustrating an example of a state management table of the Moore machine according to the second embodiment;

DESCRIPTION OF THE EMBODIMENTS

Figure 1:
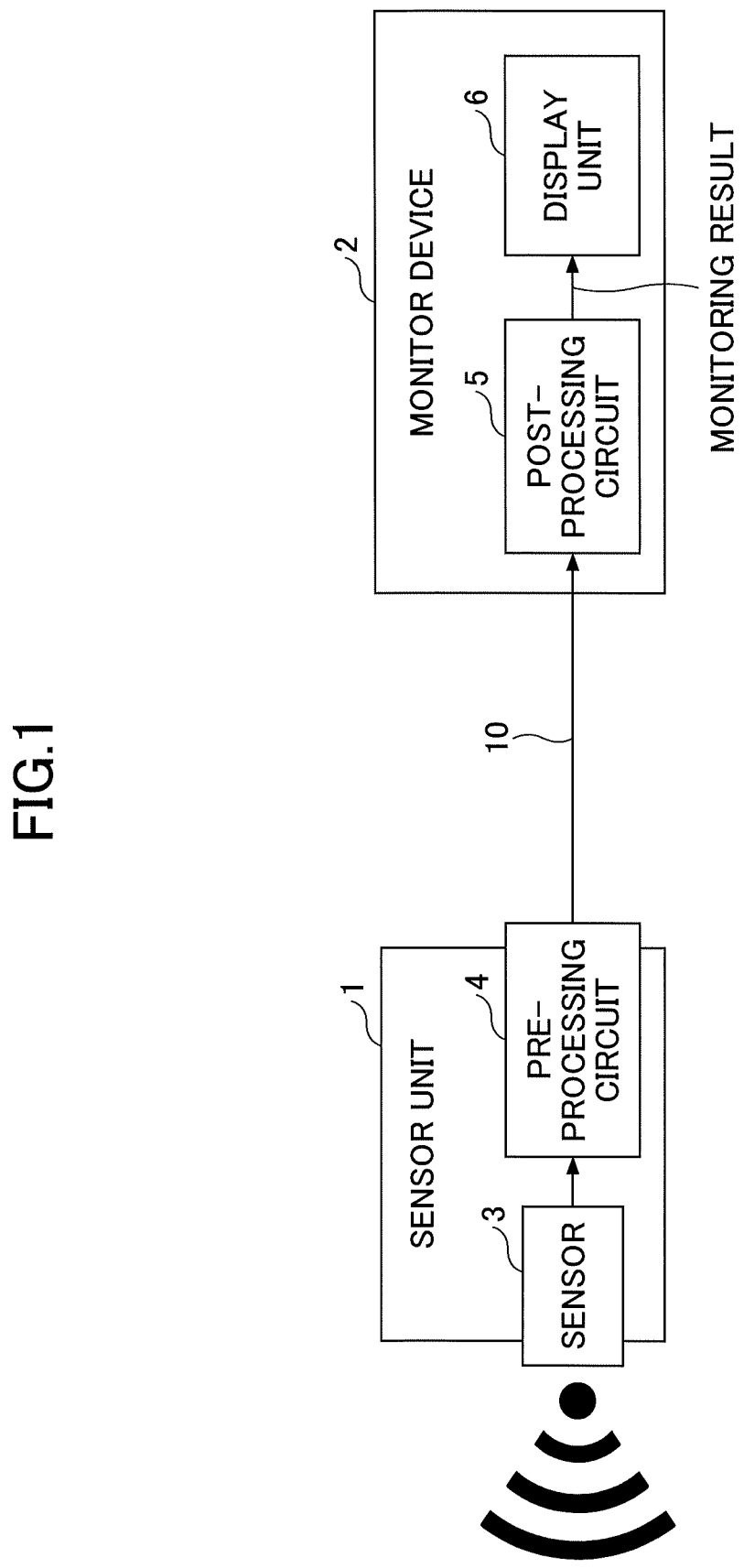
FIG. 1 is a block diagram illustrating an example of a configuration of a cyber-physical system (CPS) according to an embodiment.

Hereinafter, embodiments according to the present invention and examples will be described with reference to the drawings. In the following embodiments, similar components are denoted by the same reference symbols.

First Embodiment

Monitoring is the basis of real-time, embedded cyberphysical system verification techniques. Mathematically, the monitoring problem is formulated as a pattern matching problem for a pattern automaton. Inventors of the present application are studying a filtering process as a pre-processing of monitoring, motivated by embedded applications, particularly having limited channel capacity between a sensor and a processor that monitors, and propose a method of configuring a Moore machine for a given pattern automaton to function as a filter.

This architecture is automaton-theoretic, and the inventors have found that use of a Moore machine is particularly suited for embedded applications. This is not only because of the relatively low cost of sequential computation by the Moore machine, but also because the Moore machine is compatible with hardware acceleration by dedicated circuitry. The inventors also demonstrate soundness (absence of lost matches). The inventors conduct this study in the following cases. A first one is a case not having time constraint, setting in which a pattern is described as a finite automaton. The other is a case having time constraint, in which a pattern is described as a timed automaton. Although extending a configuration not having time constraint to a time-constrained configuration is technically complex, the following embodiments and examples illustrate its practical benefits. In the following embodiment, chapter numbers and section numbers are given for convenience of description.

1. Introduction 1.1 Monitoring and Timed Pattern Matching

The cyber physical system (CPS) is becoming increasingly complex. This is because of, for example, rapid development of digital control, which not only improves efficiency of fuel economy of an automobile but also realizes new functions such as autonomous driving. Accordingly, it is still an important and rewarding challenge to correctly understand such a system.

Due to such complexity of a CPS and other reasons such as black-box components provided by other suppliers, it is difficult to apply conventional formatting verification to a CPU in the real world. Thus, researchers and practitioners have focused on so-called light-weight formal verification. Runtime verification is one of activities, in which an execution trace of a given system is inspected against a given specification. Various algorithms for monitoring have been proposed for this purpose.

Mathematically speaking, one of the general formulations of a monitoring problem is a pattern matching problem (another general formulation is a pattern search problem as we call it: pattern searching is easier than pattern matching, but provides less information). When an execution trace is given by a string (may also be referred to as a word in the present embodiment) $w = a_1 a_2 \ldots a_n$, an expected output of monitoring is expressed by the following Formula (1). That is, the expected output is a set of pairs of indices (i,j), each of which represents restriction of the string w satisfying a given pattern pat.

$$\text{Match}(w, pat) := \{(i,j) \mid w|_{[i,j]} = pat\} \text{ (where } w|_{[i,j]} = a_i a_{i+1} \ldots a_j) \tag{1}$$

The pattern pat may be given by a string, a set of strings, a regular expression, an automaton, and the like. Note that the above Formula (1) means that a string from i-th character to j-th character matches the pattern pat.

EXAMPLE 1.1

Consider a case in which a string $w_1$=abbbbbaab and a pattern expressed by a regular expression $A_1$=a(a*)b are given. There are three matches, Match($w_1, A_1$)={(1,2), (7,9), (8,9)}.

What is important in a cyber-physical system (CPS) is handling of a pattern matching with time constraint. In one general specification, an execution trace is given by a time-stamped string (may be referred to as a "timed word"). This is a sequence of characters with time records, such as a string $w_2$=(a, 0.1)(b, 2.5)(a, 3.5)(b, 4.8). A pattern pat is given by a timed automaton (TA), and a set of time intervals (t, t'), each representing a restriction of a string w which is accepted by a timed automaton (TA) A, is calculated.

$$\text{Match}(w, \mathcal{A}) := \{t,t') \in \mathbb{R}_{\geq 0}^2 \mid t < t' \text{ and } w|_{(t,t')} \in L(\mathcal{A})\} \tag{2}$$

Unlike the case of not having time constraint, a timed automaton (TA) A can represent various real-time constraints, allowing for finer analysis of execution traces of cyber-physical systems (CPS).

EXAMPLE 1.2

Figure 9:
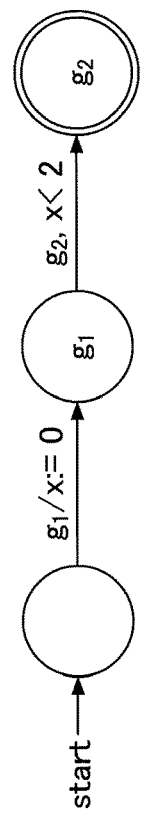
FIG. 9 is a diagram illustrating an example of a Moore machine filter for data of a gear position sensor of an automobile according to Example 1.

Consider a case in which a timed word $w_2$=(a, 0.1) (b, 2.5) (a, 3.5) (b, 4.8) and a pattern "'b' appears within two seconds after 'a' appears" (a timed automaton (TA) corresponding to this pattern is substantially the same as that in FIG. 9). Any matching contains a second sequence (in the timed word) of 'a' and 'b'. Note that a first sequence is too far apart. Such a match is given, for example, by a string $w_2|(3,5)$, but such a match exists indefinitely. This set of matches is symbolically denoted by $\{(t, t') \mid 2.5 \leq t < 3.5, 4.8 < t'\}$.

Despite obvious applications in various stages of design and deployment of cyber-physical systems (CPS), the study of timed pattern matching has started only recently (see, Non-Patent Documents 1, 4, and 6, for example). Therefore, application of a timed pattern matching in the industry is limited.

1.2 Remote Monitoring of an Embedded Application

The present embodiment proposes filtering for timed pattern matching or untimed pattern matching. This is a preprocessing applied to an input string (word).

The motivation for this study comes from an embedded application. In an embedded system (which is an important aspect of a cyber-physical system (CPS)), it is common that a sensor and a processor (which performs monitoring calculations) are placed in physically separate locations. Moreover, a communication channel between the sensor and the processor often has a limited capacity (see FIG. 1).

FIG. 1 is a block diagram illustrating an example of a configuration of a cyber-physical system (CPS) according to the present embodiment.

In FIG. 1, the CPS includes a sensor unit 1 and a monitor device 2 that are connected via a communication line 10 having a limited communication capacity, e.g., a CAN bus, a wireless network, or the like. Here, the sensor unit 1 includes a sensor 3 and a preprocessing circuit 4 having a slower processor, and the monitor device 2 includes a post-processing circuit 5 having a faster processor, and a display unit 6.

Examples of such a configuration can be found, for example, in modern automobiles. Here, a sensor unit 1 in an engine collects data, and transmits the data to a remotely placed monitor device 2 having a processor to avoid engine heat and vibration, for example. The sensor unit 1 and the monitor device 2 are connected to each other via a communication line 10 such as a controller area network (CAN). The communication line 10 is subject to severe performance limitations to reduce cost. Another example can be found in an IoT (Internet of Things) device such as an electrical home appliance or an automobile connected to a communication line 10 such as a wireless network. The IoT device continuously sends its status to a server, and the server connected to the cloud monitors the device. The wireless communication line is limited due to, for example, battery capacity of the device.

In the present embodiment, the preprocessing circuit 4 generates a Moore machine based on an automaton (timed automaton or untimed automaton) describing a predetermined matching condition with respect to sequence data of event with real-time timestamps, performs filtering using the generated Moore machine such that data not matching the matching condition is removed from the sequence data, and outputs the filtered sequence data. The filtered sequence data is serial digital data, and is transmitted to the post-processing circuit 5 of the monitor device 2 through the communication line 10. In response to this, the post-processing circuit 5 extracts, from the filtered sequence data, data matching the matching condition, and outputs the extracted data to the display unit 6.

1.3 Filtering for Timed Pattern Matching

In such remote monitoring, it is natural to attempt to reduce amount of data transmitted from the sensor to the processor without affecting a monitoring result. Because most sensors have their own built-in processors, the processors can be used for preprocessing. Assume that the preprocessor (FIG. 1) embedded in the sensor is much slower than a processor that performs monitoring actually. In other words, the preprocessing must be inexpensive in the computational sense.

FIG. 2 is a diagram conceptually illustrating a relationship between a pattern matching process performed and a filtering process that are performed in the cyber-physical system (CPS) illustrated in FIG. 1. In FIG. 2, a filter unit ($M_{N,A}$) 7 is a functional block that the sensor unit 1 has, which is embodied by, for example, the preprocessing circuit 4. A pattern matching unit 8 is a functional block provided in the monitor device 2, and is embodied by, for example, the post-processing circuit 5. That is, as illustrated in FIG. 2, in a workflow proposed by the inventors, by applying computationally inexpensive filtering to an input string using the filter unit ($M_{N,A}$) 7, load on the communication line 10 for transmitting data from the preprocessing circuit 4 to a processor in the post-processing circuit 5 is reduced, and load on the processor is also reduced.

1.4 Moore Machine as a Filter

The present embodiment addresses two settings for monitoring:

(1) Setting without a real-time constraint: an execution trace (input character string) is a word $w \in \Sigma^*$, and a pattern is given by a nondeterministic finite automaton (NFA) A on $\Sigma$.

(2) Setting with a real-time constraint: an execution trace is a timed word, and a pattern is given by timed automaton (TA). The inventors' technical contribution is to provide a configuration of a filter ($M_{N,A}$) which is implemented as a Moore machine based on a pattern automaton A and a buffer size N (N is a natural number). A Moore machine is a well-known model of state-based computation, which is an automaton with additional state-dependent output functions. The Moore machine operates well sequentially and synchronously. The Moore machine reads one input character, transits to a next state, and outputs one character. This feature is particularly suited for logic synthesis of a digital circuit, and hardware acceleration by an FPGA (Field Programmable Gate Array) or an ASIC (Application Specific Integrated Circuit) can be utilized.

Figure 3A:
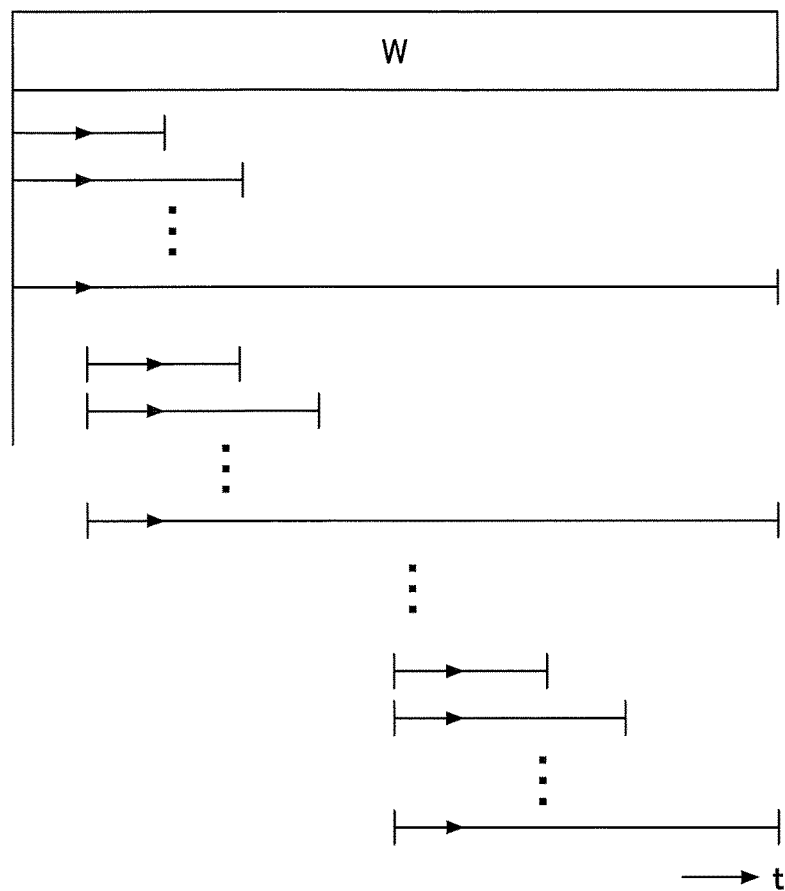
FIG. 3A is a timing chart illustrating a process for moving a matching window back and forth.

Such sequential operation of a Moore machine is in stark contrast to an operation of pattern matching. In the settings of the present embodiment, because a pattern is given by an automaton A, a matching length (e.g., $|w|_{[i,j]}=(j-i+1)$) that satisfies $w|_{[i,j]} \in L(A)$) is not fixed. Thus, matching needs to be tried many times, by moving various matching windows having different sizes back and forth over an input string w (see FIG. 3A). FIG. 3A is a timing chart illustrating a process for moving a matching window back and forth.

This indicates that there is a qualitative difference between the filtering operation by the preprocessing circuit 4 with a relatively slow preprocessor and the pattern matching operation performed by the post-processing circuit 5 with a relatively fast main processor, which is performed by moving a matching window back and forth as illustrated in FIG. 3A. In the configuration of the present embodiment, an untimed Moore machine is generated as a filter ($M_{A,N}$), even in the setting with a real time-constraint.

The output of the Moore machine filter ($M_{A,N}$) is similar to the input word (or input timed word) except that some characters are masked with an unused character $\bot$. (Note that the character $\bot$ herein means a character that cannot be included in a set of characters that constitutes an input word (input string) of the Moore machine filter $M_{A,N}$). For example, w=abbbbbaab is processed into ab$\bot\bot\bot\bot$aab under a pattern A=aa*b. By binary representation of a length of the successive $\bot$'s, a size of the output data is reduced exponentially. In addition, if only a matched substring $w|_{[i,j]}$ is necessary (i.e., if indices i and j are not necessary), a successive $\bot$'s can be suppressed into a single $\bot$. Note that removing all $\bot$'s at the filtering stage may result in false matching at the pattern matching stage (see FIG. 2).

The Moore machine filter ($M_{A,N}$) of the present embodiment consists of a pattern automaton A and a positive integer N representing a buffer size. The parameter N allows a user to balance filtering cost (if N is increased, the number of states of the Moore machine filter $M_{A,N}$ increases) with a size of a filtered string (if N is increased, $\bot$ increases, i.e., decreasing the size of the filtered string). This flexibility makes the algorithm suitable for various hardware settings.

The inventors of the present application have implemented this configuration, and experimental results for the setting with real-time constraint (which are more difficult) will be presented below. Examples of input strings were chosen from an automotive field. As a result, it can be seen that the filtered string becomes two to one hundred times shorter than an original input string w for realistic patterns (timed automata (TAs)) A and input timed strings (words) w. Furthermore, it is confirmed experimentally that running a Moore machine filter $M_{A,N}$ does not use much processing power. Further, it is confirmed that the timed pattern matching itself is accelerated by 1.2 to 2 times by using the filter unit 7 of FIG. 2.

With respect to theoretical analysis of this configuration, in the present embodiment, soundness is proved. That is, all matching in an original input word can be preserved by filtering. The soundness is proven for both the timed setting and the untimed setting. However, it should be noted that the soundness is satisfied by a trivial (identity) filter. Thus, benefit of the filtering is poorly understood from the soundness itself. In addition to the experiments, the present embodiment describes some theoretical results of filtering performance in the untimed setting.

The theoretical results include the following: completeness (i.e., all unnecessary characters are masked) if language L(A) is finite (this is a setting of multiple string matching), and monotonicity (i.e., when N is increased, filtering results are improved). Because the timed setting shares basic ideas with the untimed setting, these results also suggest performance advantages of the timed setting.

The configuration of the filter in the present embodiment is automata-theoretic, and includes the following two basic steps: (1) Preparing a buffer (of size N), and (2) performing determinization. For the second step in the timed setting, one-clock determinization of TA (see, for example, Section 5.3 of Non-Patent Document 2) is used, which overapproximates a given timed automaton (TA) by a one-clock deterministic TA.

1.5 Contribution

Contribution of the present application (the features of the embodiment) is summarized as follows:

(1) Configuration of a Filter ($M_{A,N}$) for Untimed Pattern Matching Against Automaton A The filter is given as a Moore machine, and therefore operates in a simple and sequential manner synchronously. In addition, it is compatible with hardware acceleration by logic circuitry. By controlling a size of a parameter N, a user can adjust trade-off between calculation cost and an effect of filtering.

(2) Configuration of a Moore Machine Filter ($M_{A,N}$) for Timed Pattern Matching The (untimed) Moore machine filter ($M_{A,N}$) is constructed when a timed automaton A as a pattern and a buffer size are given. This configuration is more common because it is an extension of an untimed automaton, and utilizes a zone-based pattern timed automaton. In view of practicality, it is believed that this timed automaton is a major contribution to the present embodiment.

(3) Proof of Soundness (Preservation of All Matches) in Both the Timed and Untimed Setting Settings (4) Proof of Theoretical Results of Performance of the Filter in the Timed Setting (5) Implementation of Timed Configurations and Experiments that Demonstrate Benefit of the Filter.

1.6 Pattern Matching vs. Pattern Search

Another mathematical formulation of monitoring (i.e., another option for pattern matching) is a pattern search problem as the inventers call it. The pattern search problem determines whether or not a match set (see Formula 1 or 2) is empty. The pattern search problem is attractive because it is easily reduced to a membership problem. Roughly speaking, when a pattern automaton A is given, a self-loop may be added to the initial state first so that a prefix of an input string can be ignored, and then monitoring as to whether or not an accepting state becomes active may be performed. The pattern search problem has been well studied in the context of monitoring.

Because indices must be retained in pattern matching (FIG. 3A), pattern matching is computationally more expensive than pattern search. However, pattern matching is strongly related to a real-world monitoring application (particularly in remote monitoring as will be described in Example 1.3 below). Note that remote monitoring is often simply semi-online. Because a log may arrive at a monitor intermittently in sizable chunks, it is essential to be able to select which part of the received log is issuing an alert.

The applicability of pattern matching to monitoring applications is well recognized in the community, and the literature has been increasing rapidly in recent years (see, e.g., Non-Patent Documents 4 and 5).

EXAMPLE 1.3

Semi-Online Remote Monitoring

As an example of remote monitoring (FIG. 1), consider a semi-network connected vehicle. The vehicle retains a driving log in a memory, and transmits the log to a center via the Internet when the vehicle stops within the range of a known wireless network. Log analysis is performed at the center. The driving log is a timed word containing information about a position, speed and a throttle status of the vehicle. One such timed word w (taken from ROSBAGSTORE, rosbag.tier4.jp) looks like FIG. 3B, when plotting the position of the vehicle.

Figure 3B:
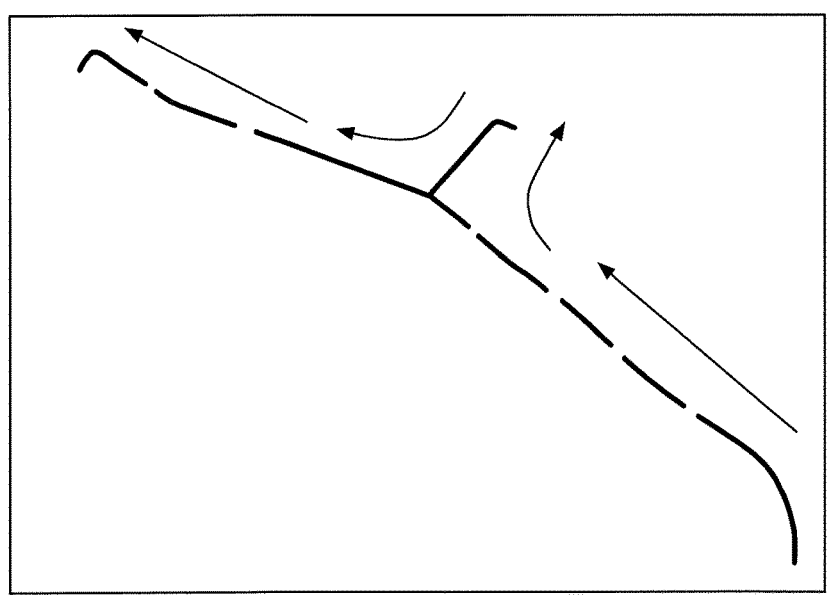
FIG. 3B is a plan view illustrating an example of a position plot.
Figure 3C:
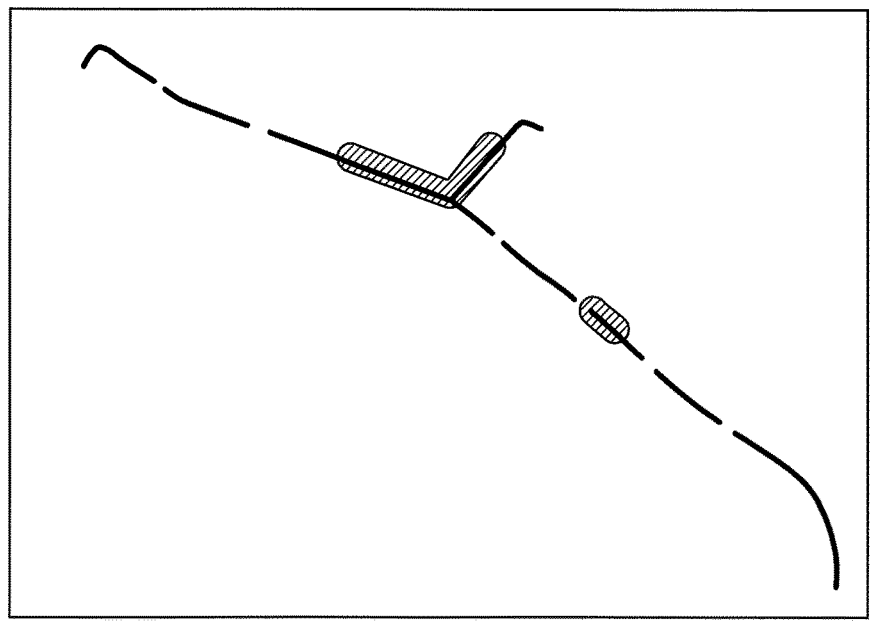
FIG. 3C is a plan view illustrating identified sections in the position plot of FIG. 3B.

FIG. 3B is a plan view illustrating an example of a position plot (a result of plotting positions of a vehicle), and FIG. 3C is a plan view illustrating an identified section in the position plot of FIG. 3B.

Note that a position plot may be discontinuous, because data in some sections may not have been able to be obtained due to loss of GPS signals. Suppose a case in which we are interested in a section of such a road where an opening of a throttle exceeds a certain threshold for 10 seconds or more. If we perform timed pattern matching on a word w with an appropriate pattern automaton A, and if we map the specified time interval to the position plot, the section of the road that we wanted to know can be identified (see FIG. 3C, hatching section is generated by tool MONAA).

Organization of Embodiment

Terms are defined in section 2. A Moore machine filter for untimed pattern matching is constructed in section 3, and properties such as soundness are also proved. The same idea is used in section 4 for a more complex problem of filtering for timed pattern matching. Soundness is proved here. Section 5 presents implementation and experimental results for the timed case. Related work is discussed in section 6.

2. Preparation

A Set $\Sigma^* = \cup_{n \in N} \Sigma^n$ is a set of strings (words) over $\Sigma$. A length n of a word $w = a_1 a_2 \ldots a_n$ (where $a_i \in \Sigma$) is denoted by $|w|$.

With respect to a non-deterministic finite automaton (NFA) $A = (\Sigma, S, s_0, S_F, E)$ and a string $w \in \Sigma^*$ over a common alphabet $\Sigma$, a run $\bar{s}$ of automaton A over w is a sequence $\bar{s} = s_0, s_1, \ldots s_{|w|}$ such that $(s_{i-1}, w_i, s_i) \in \Sigma$ is established for each $i \in [1, |w|]$. When $s_{|w|} \in S_F$ is established, the run $\bar{s} = s_0, s_1, \ldots s_{|w|}$ is referred to "accepting" (an accepting state).

A powerset of X is denoted by P(X). A disjoint union of X and Y is denoted by $X \sqcup Y$. For an alphabet $\Sigma$, a set $\Sigma \sqcup \{\bot\}$ in which $\Sigma$ is augmented with an unused symbol $\bot$ is denoted by $\Sigma_\bot$.

A set $\{1, 2, \ldots, N\}$ is used as a range of a counter. This is denoted by Z/NZ because its algebraic structure is used (addition modulo N).

A Moore machine is denoted by $M = (\Sigma_{in}, \Sigma_{out}, Q, q_0, \Delta, \Lambda)$, where $\Sigma_{in}$ and $\Sigma_{out}$ are input and output alphabets, Q is a finite set of states, $q_0 \in Q$ is an initial state, $\Delta : Q \times \Sigma_{in} \to Q$ is a transition function, and $\Lambda : Q \to \Sigma_{out}$ is an output function. For the Moore machine M and an input word $w = a_1 a_2 \ldots a_n \in \Sigma^*_{in}$ (where $a_i \in \Sigma_{in}$), a run $\bar{q}$ of the Moore machine M over the word w is a sequence $\bar{q} = q_0, q_1, \ldots q_n \in Q^*$ that satisfies $q_i = \Delta(q_{i-1}, a_i)$ for each $i \in [1, |w|]$. In this case, an output word $w' \in \Sigma^*_{out}$ is $w' = \Lambda(q_0)\Lambda(q_1) \ldots \Lambda(q_{n-1}) \in \Sigma^*_{out}$.

3. Moore machine Filtering 1 for Pattern Matching: Untimed 3.1 Problem Formulation (Definition 3.1) (Untimed Pattern Matching): For a Non-deterministic Finite Automaton (NFA) A and a Word $w = a_1 a_2 \ldots a_n \in \Sigma^*$, the Pattern Matching Problem Asks for a Match Set $$\text{Match}(w, \mathcal{A}) = \{(i,j) \in \mathbb{N}^2 | w|_{[i,j]} \in L(\mathcal{A})\}$$

where $w|_{[i,j]} = a_i a_{i+1} \ldots a_j$.

A goal of the present embodiment is the workflow illustrated in FIG. 2. Types of input/output information of the filter unit 7 will be defined as follows.

(Definition 3.2) (Moore Machine for Untimed Pattern Matching):

Let an automaton A be a nondeterministic finite automaton (NFA) over the alphabet $\Sigma$, and let N be a positive integer. A filter for the automaton A having a buffer size N is the Moore machine filter $M = (\Sigma_{in}, \Sigma_{out}, Q, q_0, \Delta, \Lambda)$ that satisfies the following:

(1) $\Sigma_{in} = \Sigma_{out} = \Sigma_\bot$ (2) Let $w = a_1 a_2 \ldots a_n \in \Sigma^*$ be an arbitrary string (word), and consider a word $w \bot^N$ obtained by padding $\bot$'s at the end of w. An output word of the Moore machine M for the word $w \bot^N$ needs to be in the form of $\bot^N_{w'}$, where $w' = b_1 \ldots b_n$, and $b_i$ is either $\perp$ or a character $a_i$ for any i. With respect to the character ($a_i$) at an i-th position, if $b_i=a_i$ is established, it is referred to as "$a_i$ is passed". Otherwise (that is, if $b_i=\perp$), it is referred to as "the character $a_i$ is masked".

The Moore machine filter M is said to be sound if all matching intervals are preserved. This means that $b_k=a_k$ is established for each k∈[1,n] such that ∃i,j. (k ∈ [i,j]∧[i,j] ∈ Match(w,A)).

Figure 4:
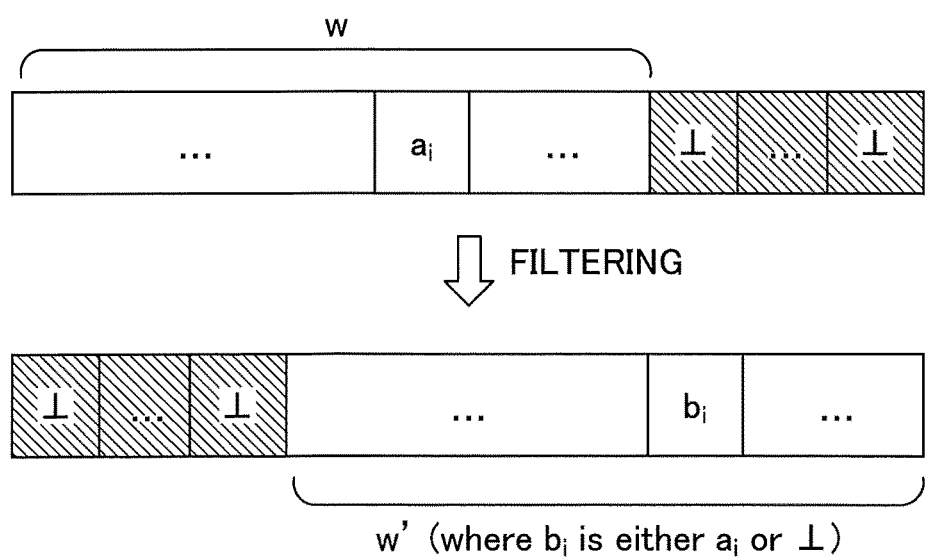
FIG. 4 is a conceptual diagram illustrating a padding process for filtering in the embodiment.

FIG. 4 is a conceptual diagram illustrating a padding process of filtering in the present embodiment.

The buffer size N, and addition (padding) of $\perp$'s to the input/output words will be described. The padding means that filtering is performed with a delay of N steps, in a manner illustrated in FIG. 4. This delay occurs due to an operating method of the Moore machine according to the present embodiment. Because this Moore machine reads the input string from left to right; stores N characters into a FIFO buffer in a format encoded in the state space Q; and outputs the characters as an output string when retrieving the characters from the FIFO buffer; a delay of N steps occurs.

Figure 5:
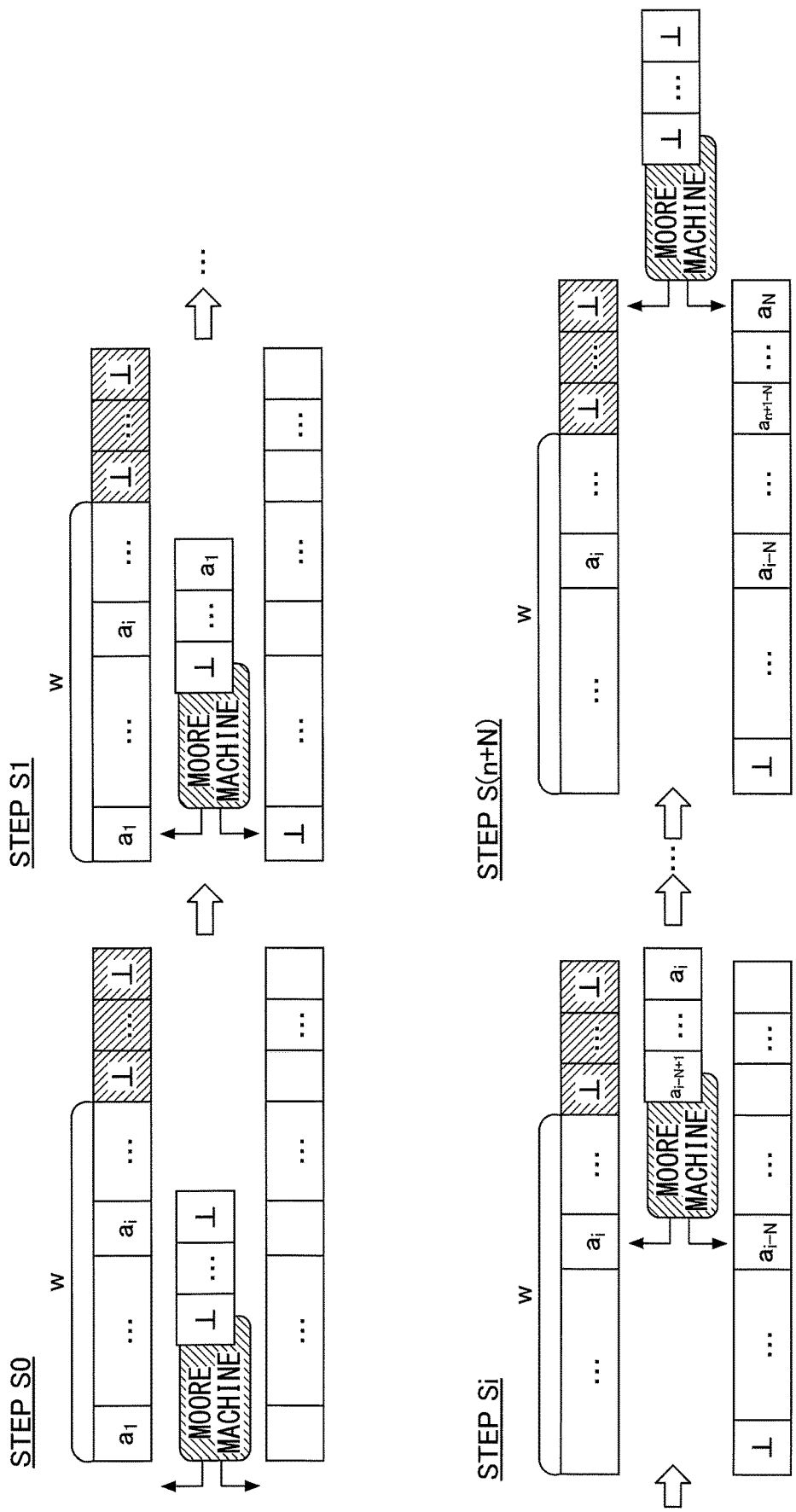
FIG. 5 is a conceptual diagram illustrating a filtering process by a Moore machine according to the embodiment.

FIG. 5 is a conceptual diagram illustrating a filtering process by the Moore machine in the present embodiment.

In FIG. 5, the buffers are initially filled with $\perp$ (step S0 in FIG. 5), which is why the prefix $\perp^N$ appears in the output word $\perp^N w'$. The padding of $\perp^N$ at the end of the input word $w\perp^N$ is necessary to retrieve contents in the buffer (step S(n+1) to step S(n+N)). During the process of FIG. 5, some of the characters of w=$a_1 \ldots a_N$ are masked ($b_i=\perp$), but this is not explicitly illustrated in FIG. 5.

3.2 Configuration of Moore Machine filter $M_{A,N}$ (Definition 3.3) ((Untimed) Moore Machine Filter $M_{A,N}$):

Let $\Sigma$ be an alphabet, N be a positive integer, and A=($\Sigma$, S, $s_0$, $S_F$, E) is a nondeterministic finite automaton (NFA). A Moore machine filter $M_{A,N}$=($\Sigma_\perp$, $\Sigma_\perp$, Q, $q_0$, $\Delta$, $\Lambda$) is defined as follows.

Note that state space Q is expressed by the following formula.

$$Q = \mathcal{P}(S \times (\mathbb{Z}/N\mathbb{Z})) \times ((\Sigma_\perp)^N \times \{pass, mask\}^N)$$

In the above formula, Z/NZ is the N-element set with addition modulo N.

The initial state is expressed by the following formula.

$$q_0 = (\{(s_0,0)\}, (\perp, \ldots, \perp), (mask, \ldots, mask))$$

The transition $\Delta: Q \times \Sigma_\perp \rightarrow Q$ is defined as follows. For each $a \in \Sigma_\perp$, $$\Delta((S, (a_1, a_2, \ldots, a_N), (l_1, l_2, \ldots, l_N)), a) = (S', (a_2, \ldots, a_N, a), \bar{l}), \quad (3)$$

where $$S' = \{(s', (n \mod N)+1) \mid (s,n) \in S, (s,a,s') \in E\} \cup \{(s_0, 0)\} \quad (4)$$

and $$\bar{l} = \begin{cases} (pass, \ldots, pass) & \text{if } \exists s \cdot (s,N) \in S', \\ (l_2, l_3, \ldots, l_{N-\psi(S')+1}, \overline{pass, \ldots, pass}^{\psi(S')}) & \text{else if } \exists n, s \in S_F \cdot (s,n) \in S', \\ (l_2, l_3, \ldots, l_N, mask) & \text{otherwise.} \end{cases} \quad (5)$$

Here, $\psi(S')$ is expressed as follows.

$$\psi(S') = \max\{n \mid \exists s \in S_{F'}(s,n) \in S'\}$$

Finally, the output function $\Lambda: Q \rightarrow \Sigma_\perp$ is defined as follows.

$$\Lambda(S, (a_1, a_2, \ldots, a_N), (l_1, l_2, \ldots, l_N)) = \begin{cases} a_1 & \text{if } l_1 = pass \\ \perp & \text{if } l_1 = mask \end{cases} \quad (6)$$

Intuitive understanding will be discussed. The Moore machine filter $M_{A,N}$ is configured by combining the following three blocks: the determinization processor (CPU 20 of FIG. 15, which will be described in detail below), a counter (included in 22b of FIG. 15), and a buffer of size N (22a of FIG. 15).

(Determinization)

The Pattern A is a non-deterministic finite automaton (NFA), but what is required is a deterministic Moore machine. This is why a powerset $\mathcal{P}(S \times (Z/NZ))$ appears in a component of the state space Q. For example, an element $\{(s_1, n_1), \ldots, (s_k, n_k)\}$ of this component means that in a non-deterministic finite automaton (NFA) A, states $s_1, \ldots, $ and $s_k$ are active. Formula (4) indicates that this is a normal determinization. The exception is that $(s_0, 0)$ is added in Formula (4). This is to allow matching to begin at any position in the input word.

(Counter)

In addition, the active state that traverses the automaton A has counter(s) (within 22b of FIG. 15) indicating the number of steps moved from the initial state. The counters correspond to the component Z/NZ in the state space Q. The maximum value of these counters is the same as the buffer size N. When the counter reaches the maximum value, the counter starts over from 1. As can be seen from Formula (4), the counter for the active state is incremented (increased by one) modulo N. For example, the maximum value of the counter may be 2×N, and an increment may be set to 2 rather than 1. The increment may not be limited to 1, but may be a predetermined natural number such as 2 or 3.

(Buffer)

The FIFO buffer of size N (22a in FIG. 15) explains why the second component $(\Sigma_\perp)^N \times \{pass, mask\}^N$ appears in the state space Q. Each of the N cells in the FIFO buffer retains a character in $\Sigma_\perp$ and a label (pass or mask). As can be seen from Formulas (3) and (5), basic operations of the buffer are to dequeue the leftmost element and to add (enqueue) the read character to the right.

Whether a character should be masked or not is determined by the label (pass or mask) in the buffer. The default label is "mask" (the third case in Formula (5)). If the label remains unchanged for N steps, a character corresponding to the label is masked with $\perp$ when the character is output (the second case of Formula (6)). The label may change from "mask" to "pass" for two different reasons (the first two cases of Formula (5)).

1. The second case of Formula (5) is when some characters that are stored toward the end of the buffer form a match for the pattern A, which leads to an accepting state $s \in S_F$ of pattern A. In this case, these characters are marked with "pass" to clearly indicate that these characters must be passed to pattern matching (FIG. 2). The number of characters to be passed ($\psi(S')$) is calculated using the counter n associated with the active state $s \in S_F$.

2. A condition ∃s·(s,N)∈S' in the first case of Formula (5) means that the counter of an active state s has reached the maximum value N. In this case, it is unclear whether the active state s of A ultimately reaches the accepting state. Thus, to be on the safe side, all N characters are passed to pattern matching without masking. In the untimed setting, this is the only case in which completeness of filtering may be lost.

In summary, Definition 3.3 configures a Moore machine that operates in a manner illustrated in FIG. 5. The state space of the Moore machine is a combination of: determinization of the pattern NFA A; counters to count the number of steps from the initial state; and a FIFO (First-In First-Out) buffer to store N characters labeled with "pass" or "mask".

(Proposition 3.4):

The Moore machine $M_{A,N}$ is a filter for A with buffer size N, in the sense of Definition 3.2.

The inventors did not implement a filter as a Moore machine having a state space $$Q = \mathcal{P}(S \times (\mathbb{Z}/N\mathbb{Z})) \times ((\Sigma_\perp)^N \times \{pass, mask\}^N)$$

as described in Definition 3.2. Instead, the state space Q is divided into a "buffer portion" $(\Sigma_\perp)^N \times \{pass,mask\}^N$ and a "non-buffer portion" $\mathcal{P}(S \times (\mathbb{Z}/N\mathbb{Z}))$, and the former buffer portion is generated on-the-fly. More precisely, the non-buffer portion is initially constructed as a deterministic finite automaton (DFA) all at once, and this DFA dictates how to operate the buffer portion implemented as an array of size N. An example is described in Example 3.6.

(Proposition 3.5):

Let $A=(\Sigma, S, s_0, S_F, E)$ be a nondeterministic finite automaton (NFA). A size of the non-buffer portion $P(S \times (\mathbb{Z}/N\mathbb{Z}))$ of the state space for the induced Moore machine filter $(M_{A,N})$ is bounded by $O(2^{N \cdot |S|})$.

Therefore, memory usage for the non-buffer portion including the transition is $O(2^{N \cdot |S|} \cdot |\Sigma|)$. Memory usage for the buffer portion is $O(N \cdot \log|\Sigma|)$. In summary, the space complexity of running the Moore machine filter $(M_{A,N})$ developed by the inventors is $O(2^{N \cdot |S|} \cdot |\Sigma|)$.

The space complexity is exponential in N, which comes from powerset construction for the non-buffer portion $P(S \times (\mathbb{Z}/N\mathbb{Z}))$. Experimentally, however, memory consumption does not necessarily increase exponentially in N. This is because not all states of $P(S \times (\mathbb{Z}/N\mathbb{Z}))$ are reachable (see RQ2 in section 5).

Figure 6A:
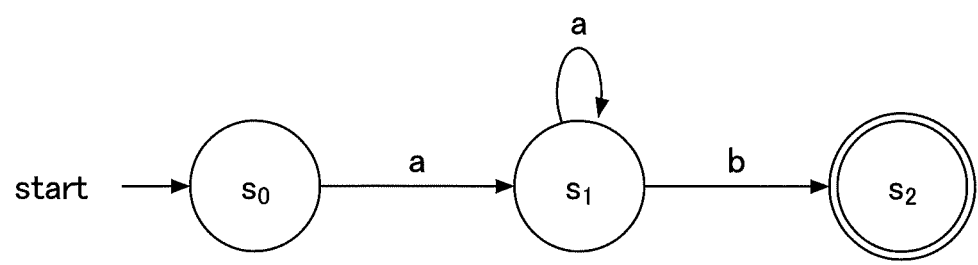
FIG. 6A illustrates an example of a pattern that is a non-deterministic finite automation (NFA) according to the embodiment.
Figure 6B:
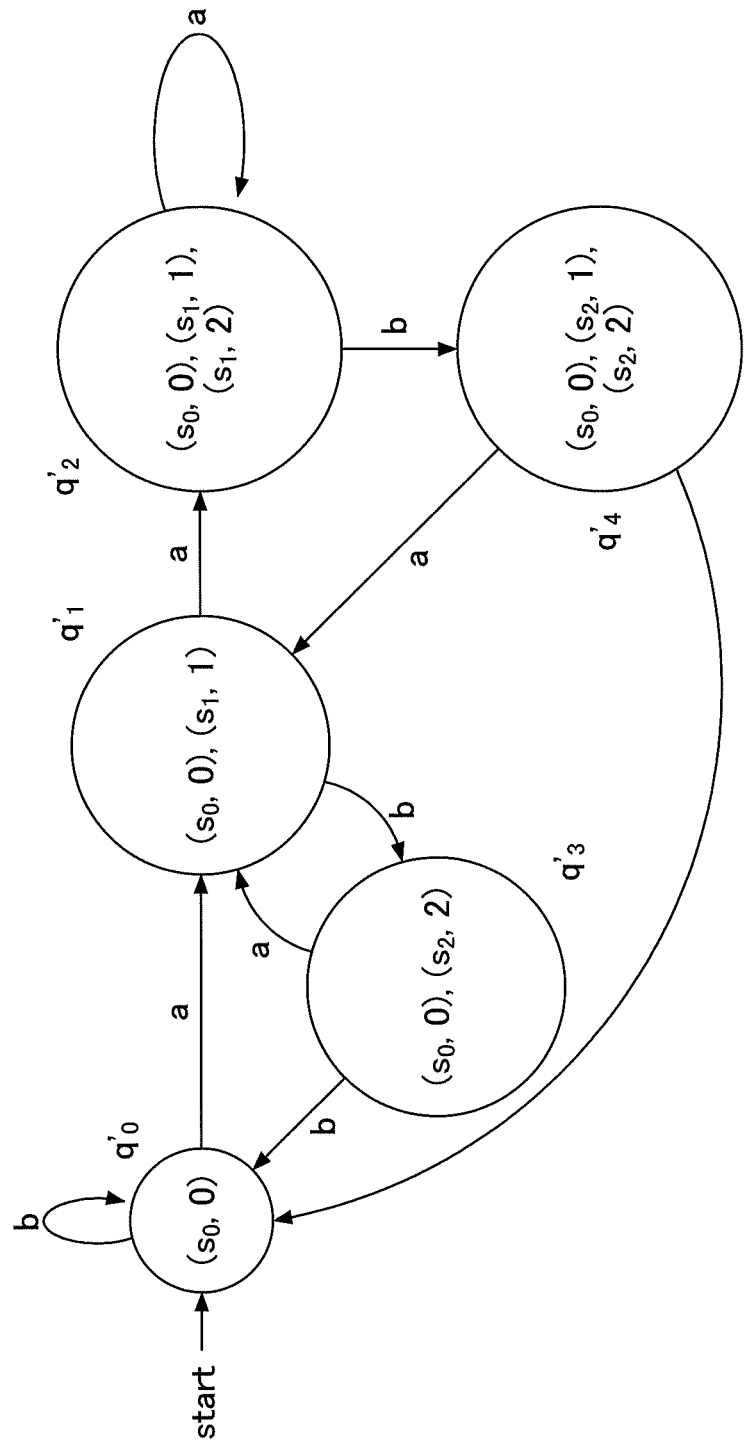
FIG. 6B illustrates an example of a non-buffer portion of a Moore machine filter according to the embodiment.
Figure 7A:
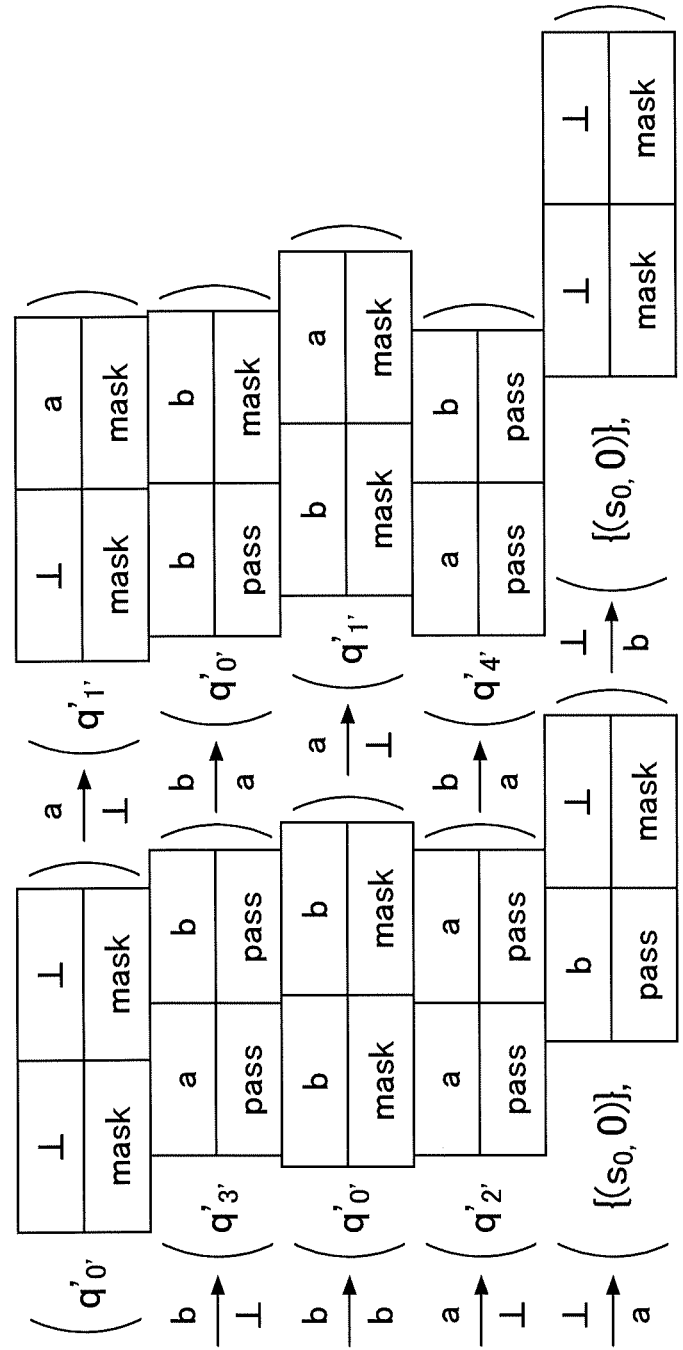
FIG. 7A illustrates a run of the Moore machine filter for a given string.

FIG. 6A is a diagram illustrating an example of a pattern that is a non-deterministic finite automaton (NFA) according to the present embodiment, and FIG. 6B is a diagram illustrating an example of a non-buffer portion of a Moore machine filter according to the present embodiment. FIG. 7A is a diagram illustrating a run of the Moore machine filter for a given word.

EXAMPLE 3.6

Consider pattern aa*b. This is illustrated by the non-deterministic finite automaton (NFA) $A_0$ in FIG. 6A. A Moore machine filter $M_{A0,2}$ of Definition 3.3 is illustrated in FIG. 6B, in which illustration of buffer states of the Moore machine filter is omitted. A run over a word w=abbbaab is illustrated in FIG. 7A. An output word is the ⊥⊥ab⊥⊥aab, which indicates that a result of filtering is ab⊥⊥aab.

FIG. 7A illustrates the runs over $M_{A0,2}$ for the string w=abbbaab. Tables in FIG. 7A illustrate states of a buffer of $M_{A0,2}$. Character data is stored (enqueued) from the right of the buffer. In FIG. 7A, a symbol such as $$\overrightarrow{\frac{a}{b}}$$

indicates that an input character is "a" and that "b" is an output character.

3.3 Properties of Moore Machine Filter $M_{A,N}$

In the rest of this section, let A be a pattern NFA (nondeterministic finite automaton) $A=(\Sigma, S, S_0, E, S_F)$, N be a positive integer, and $M_{A,N}=(\Sigma_\perp, \Sigma_\perp, Q, q_0, \Delta, \Lambda)$ be the Moore machine filter in Definition 3.3. Let $w=a_1a_2 \ldots a_n$ be a word over $\Sigma$, and $\perp^N w'$ be an output word of the Moore machine filter $M_{A,N}$ for an input word $w\perp^N$. Note that the word w' is $w'=b_1b_2 \ldots b_n$, where $b_i \in \Sigma_\perp$.

Theorem 3.7 (Soundness):

The Moore machine filter $M_{A,N}$ is sound in the sense of Definition 3.2. If there is an upper boundary in a length of a match, and the buffer size N is not less than the upper boundary, completeness is established. This is essentially the same as multiple string matching.

Theorem 3.8 (Completeness):

Assume that $\max\{|w| \mid w \in L(A)\} \leq N < \infty$. In this case, a non-deterministic finite automaton (NFA) A' satisfying $L(A)=L(A')$, in which a Moore machine filter $M_{A',N}$ is complete, can be constructed. The latter part implies that if an index k satisfies $a_k=b_k$, then there is an interval [i,j] such that $k \in [i,j]$ and $w|_{[i,j]} \in L(A)$.

Intuitive understanding for monotonicity is that with a larger buffer size of N', the Moore machine filter $M_{A,N'}$ masks more characters but also increases the state space. A precise statement is more intricate, and the larger buffer size N" must be a multiple of the smaller one.

Theorem 3.9 (Monotonicity):

For any positive integer N', let $M_{A,N'}$ be the Moore machine filter in Definition 3.3, and let $\perp^{N'} w'^{(N')}$ be an output word of the Moore machine filter $M_{A,N'}$ over an input word $w\perp^{N'}$. Let $w'^{(N')}=b_1^{(N')} \ldots b_n^{(N')}$, where $b_i^{(N')} \in \Sigma_\perp$. For any positive integers n and N', and any index k of w, $b_k^{(nN')}=\perp$ is established if $b_k^{(N')}=\perp$.

As stated in Proposition 3.5, the state space of the Moore machine filter is exponentially larger than that of A. This is because of the powerset construction required for deterministic branching. If sacrificing execution time is allowed, determinization of the non-deterministic finite automaton (NFA) may be performed when needed, which usually requires less memory space.

4. Moore Machine Filtering 2 for (Timed) Pattern Matching:

A configuration of a Moore machine filter for timed pattern matching, which is a major contribution by the inventors, will be proposed. The basic idea is similar to the untimed setting (section 3). However, because timed automata (TA) cannot generally be determinized, determinization is a technical problem. Here, the inventors utilize one-clock determinization (see Section 5.3 of Non-Patent Document 2, for example). Because this one-clock determinization overapproximates reachability, soundness of filtering can be maintained. Moreover, the local nature of the resulting TA (that the TA has only one clock variable that is reset at every transition) makes it possible to construct a filter that is a finite state Moore machine with no time constraints.

4.1 Problem Formulation (Definition 4.1) (Timed Word):

Let $\Sigma$ be an alphabet. A timed word over the alphabet $\Sigma$ is a sequence w of pairs $(a_i, \tau_i) \in \Sigma \times R_{>0}$ satisfying $\tau_i < \tau_{i+1}$ for any $i \in [1, |w|-1]$.

Let $w=(\bar{a}, \bar{\tau})$ be a timed word. A set of timed words over the alphabet $\Sigma$ is denoted by $T(\Sigma)$.

A substring $(a_i, \tau_i), (a_{i+1}, \tau_{i+1}), \ldots, (a_j, \tau_j)$ is denoted by $w(i,j)$. For $t \in R_{\geq 0}$, t-shift of a word w (shifting only time t) is denoted by $(\bar{a}, \bar{\tau})+t=(\bar{a}, \bar{\tau}+t)$, where $\bar{\tau}+t=(\tau_1+t, \tau_2+t, \ldots, \tau_{|\tau|}+t)$. For timed words $w=(\bar{a}, \bar{\tau})$ and $w'=(\bar{a}', \bar{\tau}')$, their absorbing concatenation denoted by $w \circ w'=(\bar{a} \circ \bar{a}', \bar{\tau} \circ \bar{\tau}')$, where $\bar{a} \circ \bar{a}'$ and $\bar{\tau} \circ \bar{\tau}'$ are usual concatenations, and the non-absorbing concatenation of w and w' is $w \cdot w'=w \circ (w'+\tau_{|w|})$. Note that the absorbing concatenation $w \circ w'$ is defined only when $\tau_{|w|} < \tau'_1$.

For a timed word $w=(\bar{a}, \bar{\tau})$ over the alphabet $\Sigma$, and time t and $t' \in R_{>0}$ satisfying $t<t'$, a timed word segment $w|_{(t,t')}$ is defined by a timed word by $(w(i,j)-t) \circ (\$, t'-t)$ over an augmented alphabet $\Sigma \sqcup \{\$\}$, where parameters i and j are chosen such that $\tau_{i-1} \leq t < \tau_i$ and $\tau_j < t' \leq \tau_{j+1}$. Here, the timed word $w(i,j)-t$ is $(-t)$-shift of $w(i,j)$, and the unused symbol $\$$ is referred to as a terminal character.

(Definition 4.2) (Timed Automaton):

Let C be a finite set of clock variables, and $\Phi(C)$ is a set of conjunctions of inequalities $x \bowtie c$, where $x \in C$, $c \in Z_{\geq 0}$, and $\bowtie \in \{>, \geq, <, \leq\}$.

A timed automaton $A=(\Sigma, S, s_0, S_F, C, E)$ is a tuple, where $\Sigma$ is an alphabet, S is a finite set of states, $s_0 \in S$ is an initial state, $S_F \subseteq S$ is a set of accepting states, and $E \subseteq S \times S \times \Sigma \times P(C) \times \Phi(C)$ is a set of transitions.

Components of a transition $(s, s', a, \lambda, \delta) \in E$ represent a source, a target, an action, a reset variable, and a guard of transition, respectively.

A clock valuation v is defined as a function $v:C \to R_{\geq 0}$. T-shift of the clock valuation $(v+t)$ is defined as $(v+t)(x)=v(x)+t$ for any $x \in C$, where $t \in R_{\geq 0}$. For a timed automaton $A=(\Sigma, S, s_0, S_F, C, E)$ and a timed word $w=(\bar{a}, \bar{\tau})$, a run of A over w is a sequence r of pairs $(s_i, v_i) \in S \times (R_{\geq 0})^C$, which satisfies the following conditions.

(Initial Condition)

$s_0$ is the initial state, and $v_0(x)=0$ for any $x \in C$.

(Continuous condition) For any $i \in [1, |w|]$, there exists a transition $(s_{i-1}, s_i, a_i, \lambda, \delta) \in E$ such that $v_{i-1}+\tau_i-\tau_{i-1} \models \delta$ and $v_i(x)=0$ (for $x \in \lambda$) and $v_i(x)=v_{i-1}(x)+\tau_i-\tau_{i-1}$ (for $x \notin \lambda$).

A run that satisfies only the continuous condition is referred to as a path. A run $r=(\bar{s}, \bar{v})$ is referred to as "accepting" in a case in which the last element of s ($s_{|s|-1}$) belongs to $S_F$. Language $L(A)$ is defined as a set of timed words $\{w | \text{there is an accepting run of A over w}\}$.

A problem that is targeted by the inventors is as follows. Algorithms for solving this have been actively studied (see Non-Patent Documents 4 and 5, for example). A filtering Moore machine as a preprocessor for these algorithms is the contribution of the present embodiment.

(Definition 4.3) (Timed Pattern Matching):

Let A be a timed automaton, and w be a timed word, where both are over a common alphabet $\Sigma$. A timed pattern matching problem determines all intervals $(t,t')$ for which the interval $w|_{(t,t')}$ is accepted by the timed automaton (TA) A. That is, the timed pattern matching problem finds a matching set expressed by the following expression.

$$\text{Match}(w, \mathcal{A}) = \{t, t' | w|_{(t,t')} \in L(\mathcal{A})\}$$

4.2 One-Clock Determinization of TA

Among the three main blocks for a configuration of the untimed filter (Definition 3.3), counters and a buffer can be brought into the timed setting. With respect to determinization, the concept of overapproximation in Definition 4.5 is used for the determinization. This is based on Non-Patent Document 2 (see Section 5.3 in Non-Patent Document 2, for example).

First, some auxiliary notations will be described.

(Definition 4.4) (Restriction $v|_C$, Join $v \sqcup v'$):

Let $v:C' \to R_{\geq 0}$ be a clock valuation. The restriction of v to $C \subset C'$ is denoted by $v|_C : C \to R_{\geq 0}$. That is, $(v|_C)(x)=v(x)$ for each $x \in C$.

Let $v:C \to R_{\geq 0}$ and $v':C' \to R_{\geq 0}$ be clock valuations. Their join is defined to be the following clock valuation over a disjoint union $C \sqcup C'$:

$$(v \sqcup v')(x)=v(x) \text{ if } x \in C, (v \sqcup v')(x)=v'(x) \text{ if } x \in C'.$$

A function that maps $x_i$ to $r_i$ (for each $i \in \{1, \ldots, n\}$) is expressed by the following expression:

$$[x_1 \mapsto r_1, \ldots, x_n \mapsto r_n].$$

(Definition 4.5) (One-Clock Determinization):

Let $A=(\Sigma, S, s_0, S_F, C, E)$ be a timed automaton (TA) and y be an unused clock variable (in other words, $y \notin C$). A timed automaton (TA) $A'=(\Sigma, S', s_0', S_F', \{y\}, E')$ is referred to as a one-clock determinization of the automaton A if the following conditions are met.

(1) Each element $S \in S'$ of the new and finite state space is a finite set $S=\{(s_1, Z_1), \ldots, (s_m, Z_m)\}$ of pairs $(s_i, Z_i)$, where $s_i \in S$ is a state of A, and $Z_i$ is a subset of $(R_{\geq 0})^{C \sqcup \{y\}}$ given by a special polytope called a zone.

(2) For each transition $(S, a, \delta, \lambda, S') \in E'$ of the automaton A', a guard $\delta$ is a finite union of intervals of the clock variable y. In addition, it reflects whether the transition E is valid for the automaton A. Precisely, for any $u, u' \in R_{\geq 0}$ that satisfies $\delta$, $E_a(S,u)=E_a(S, u')$ is established, where the set $E_a(S,u) \subseteq E$ is defined by the following formula:

$$E_a(S,u)=\{(s,a,\delta',\lambda',s') \in E | \exists (s,Z) \in S \cdot \exists v \in Z \cdot v(y)=u \text{ and } v \text{ satisfies } \delta'\}.$$

(3) Any transition of the automaton A' resets the unique clock variable y. That is, for each transition $(S, a, \delta, \lambda, S') \in E'$, $\lambda=\{y\}$ is established.

(4) Each transition $(S, a, \delta, \lambda, S') \in E'$ of the automaton A' simulates a transition of A. More precisely, let $(s,Z) \in S$ and $(v: C \sqcup \{y\} \to R_{\geq 0}) \in Z$. Suppose that $$(s, v|_c) \xrightarrow{a,\tau} (s', v')$$

is a path (of length 1) of the automaton A, for some $s' \in S$ and $v':C \to R_{\geq 0}$ ($\tau$ is a dwell time). At this time, it is required that there exists a zone $Z' \subseteq (R_{\geq 0})^{C \sqcup \{y\}}$ such that 1) $(s', Z') \in S'$ and 2) a valuation $v' \sqcup [y \mapsto \tau]$ over the clock set $C \sqcup \{y\}$ belongs to the zone $Z'$.

(5) Automaton A' is deterministic. For each state $S \in S'$, each clock valuation $v \in (R_{\geq 0})^{(y)}$, $a \in S'$, and $\tau \in R_{\geq 0}$ representing a dwell time, a path (of length 1) from $(S,v)$ labeled with a and $\tau$ is unique. That is, if both $$(S, v) \xrightarrow{a,\tau} (S', v') \text{ and } (S, v) \xrightarrow{a,\tau} (S'', v'')$$

are paths of the automaton A', $S'=S''$ and $v'=v''$ are satisfied (note that the condition (3) forces $v'=v''=[y \mapsto 0]$).

(6) The initial state $s_0'$ of the automaton A' is given by $s'_0=\{(s_0, \{0\})\}$. Here, 0 is a valuation that maps every clock variable to 0.

(7) A state S belongs to $S'_F$, only if there exists $(s,Z) \in S$ such that $s \in S_F$.

(Proposition 4.6):

Let $A=(\Sigma, S, s_0, S_F, C, E)$ be a timed automaton (TA). Let an automaton $A'=(\Sigma, S', s_0', S_F', \{y\}, E')$ be a one-clock determinization of the automaton A. In this case, the automaton A' satisfies the following properties.

(Simulation)

Let w∈T(Σ) be a timed word, and assume that there exists a run over the word w that will reach a state s∈S in the automaton A. At this time, there exists S∈S' satisfying:

1) (s,Z)∈S for some zone Z, and
2) there exists a run over w to S in A'.

(Language Inclusion)

Particularly, L(A)⊆L (A').

Note that Definition 4.5 provides properties, and not configurations. For the same timed automaton (TA) A, there are multiple one-clock determinizations with different sizes and precision. In the implementation of the inventors, for example, a specific configuration proposed in Section 5.3.4 of Non-Patent Document 2 is used.

4.3 Configurations of Our Moore Machine Filter $M_{A,N}$ (Definition 4.7) (Moore Machine Filter ($M_{A,N}$) for Timed Pattern Matching):

Let A=(Σ, S, $s_0$, $S_F$, C, E) be a timed automaton (TA), and let N∈$\mathbb{Z}_{>0}$. A Moore machine filter ($M_{A,N}$) is constructed according to the following steps.

In the first step, the original timed automaton (TA) A is augmented with counters. Specifically, the augmented automaton $\mathcal{A}^{N\text{-}ctr}=(\Sigma_\bot, S\times[0,N],(s_0,0),S_F^{N\text{-}ctr},C,E^{N\text{-}ctr})$ is defined, where $S_F^{N\text{-}ctr}=\{(s_f,n)|s_f\in S_F, n\in[0,N]\}$ and $E^{N\text{-}ctr}=\{((s_0,0),a,\text{true},C,(s_0,0))|a\in\Sigma_\bot\}\cup\{((s,n),a,\delta,\lambda,(s',n+1))|(s,a,\delta,\lambda,s')\in E, n\in[0,N-1]\}\cup\{((s,N),a,\delta,\lambda,(s',1))|(s,a,\delta,\lambda,s')\in E\}$.

In the second step, a one-clock determinization (Definition 4.5) of the automaton $A^{N\text{-}ctr}$ is taken. Let $A^{N\text{-}ctr\text{-}d}$ be a result of the second step (one-clock determinization). $A^{N\text{-}ctr\text{-}d}$ is expressed by the following formula:

$\mathcal{A}^{N\text{-}ctr\text{-}d}=(\Sigma_\bot,S^{N\text{-}ctr\text{-}d},s_0^{N\text{-}ctr\text{-}d},S_F^{N\text{-}ctr\text{-}d},\{y\},E^{N\text{-}ctr\text{-}d})$.

Finally, in the third step, the Moore machine filter $M_{A,N}$ is defined as follows:

$\mathcal{M}_{\mathcal{A},N}=(\Sigma_\bot\times\mathbb{R}_{\geq 0},\{\text{pass,mask}\},S^{N\text{-}ctr\text{-}d}\times\{\text{pass,mask}\}^N,(s_0^{N\text{-}ctr\text{-}d},(\text{mask},\ldots,\text{mask})),\Delta,\Lambda)$.

Note that Δ and Λ in the above formula are defined as follows:

$\Delta(S,\bar{l}),(a,\tau))=(S',\bar{l}')$ where state S' is a unique successor of the state S in the automaton $A^{N\text{-}ctr\text{-}d}$ under a character "a" and a dwell time τ (Definition 4.5).

Also, $\bar{l}'$ is defined as follows:

$$\bar{l}' = \begin{cases} \text{pass}^N & \text{if } \exists s, Z \cdot (s, N), Z) \in S \\ l_2, l_3, \ldots, l_{N-\psi(S')+1}, \overline{\text{pass},\ldots,\text{pass}}^{\psi(S')} & \text{else if } \exists ((s, n), Z) \in S \cdot s \in S_F \\ l_2, l_3, \ldots, l_N, \text{mask} & \text{otherwise.} \end{cases}$$

where $\psi(S')=\max\{n|\exists s, Z\cdot((s, n), Z) \in S \text{ and } s \in S_F\}$.

Λ is defined as $\Lambda((S, (l_1, l_2, \ldots, l_N)))=l_1$.

Figure 7B:
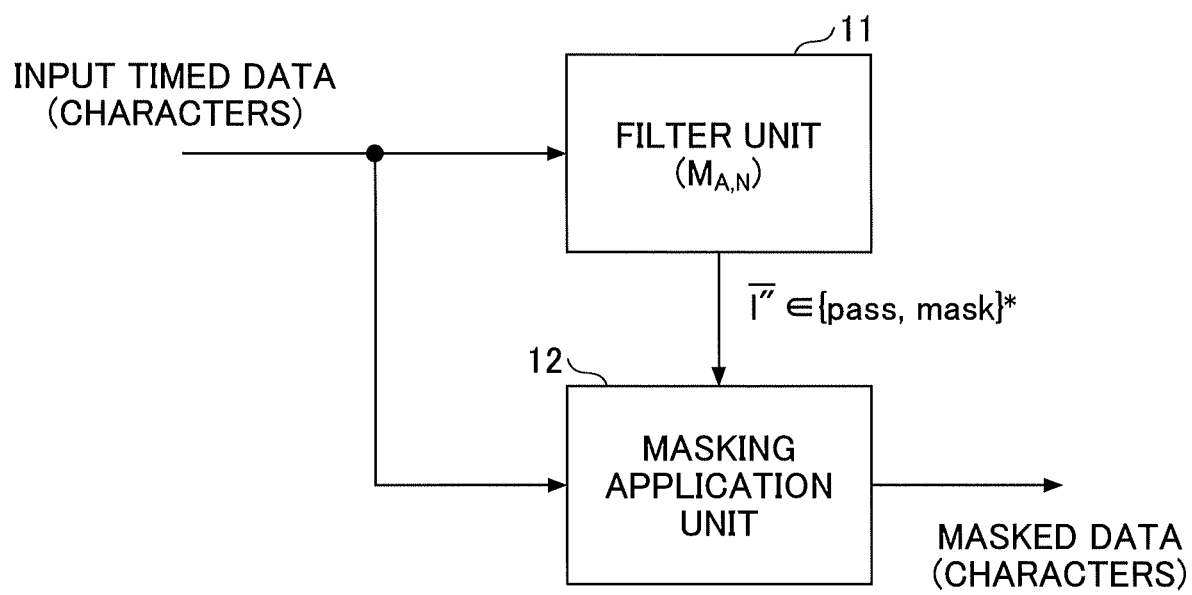
FIG. 7B is a block diagram illustrating an example of a processing circuit of a preprocessing circuit according to the embodiment.

FIG. 7B is a block diagram illustrating an example of a configuration of the preprocessing circuit according to the present embodiment. In FIG. 7B, the preprocessing circuit includes a filter unit 11 and a masking application unit 12.

Note that the resulting Moore machine takes a timed word as input. This makes the input alphabet infinite (i.e., $\Sigma_\bot\times R_{\geq 0}$). This is not a major implementation issue, because the state space remains finite. Furthermore, because an output alphabet of the Moore machine filter $M_{A,N}$ (filter unit 11 in FIG. 7B) is a two-element set {pass, mask}, the automaton of the Moore machine filter outputs only masking information. Although the finite state Moore machine cannot buffer timestamped characters, the original time-stamped string can be copied, and then appropriate masking can be applied by the masking application unit 12 (see FIG. 7B).

(Theorem 4.8) (Soundness):

Let an automaton A=(Σ, S, $s_0$, $S_F$, C, E) be a pattern TA, N be a positive integer, and $M_{A,N}$ be the Moore machine filter in Definition 4.7. Let w=$(a_1,\tau_1)$ $(a_2,\tau_2)$ ... $(a_n,\tau_n)$ be a timed word over Σ and mask$^N$w' be an output word of the Moore machine filter $M_{A,N}$ for an input word w$(\bot,\tau_n)^N$ (where the input word and the output word are padded by mask$^N$ and $(\bot,\tau_n)^N$ respectively, as illustrated in FIG. 4). Let the word w' be w'=$b_1 b_2 \ldots b_n$, where $b_k\in\{\text{pass, mask}\}$.

For any pairs (i,j) of indices of a string w satisfying w(i,j)-$\tau_{i-1}\in L(A)$, and for any index k∈[i,j], $b_k$=pass is established.

EXAMPLE 1

5. Example 1 (Implementation and Experiment)

The inventors have implemented a Moore machine filter for timed pattern matching (Example 1). Our implementations are designed to suppress successive ⊥'s into two ⊥'s, and to maintain the timestamps of the first ⊥ and the last ⊥. A buffer portion of the state space Q ({pass, mask}$^N$ in Definition 4.7) is generated when it becomes necessary, as mentioned in Proposition 3.5. We performed experiments to answer the following research questions (RQ1 to RQ5).

RQ1: Does the present Moore machine filter mask many events?

RQ2: Does the present Moore machine filter operate online? That is, does it work in linear time and constant space with respect to the length of the input timed word?

RQ3: Does the present Moore machine filter accelerate an entire task of timed pattern matching?

RQ4: Is the present Moore machine filter accurate? That is, do many unmasked events contribute to actual matching?

RQ5: Is the present Moore machine filter filter-responsive? That is, does it not cause a significant delay?

Figure 8:
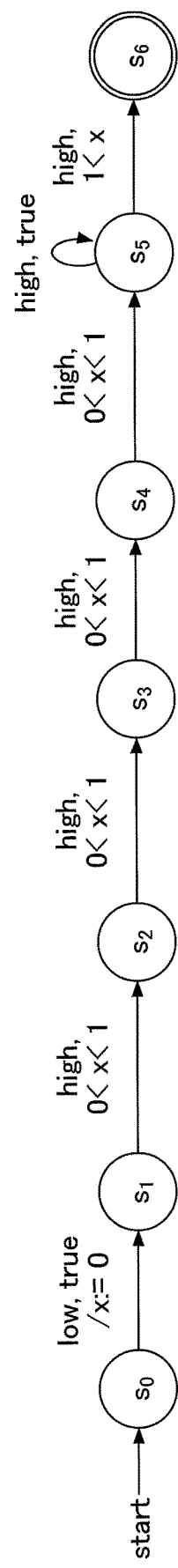
FIG. 8 is a diagram illustrating an example of a Moore machine filter for data of a torque sensor of an automobile according to Example 1.
Figure 10:
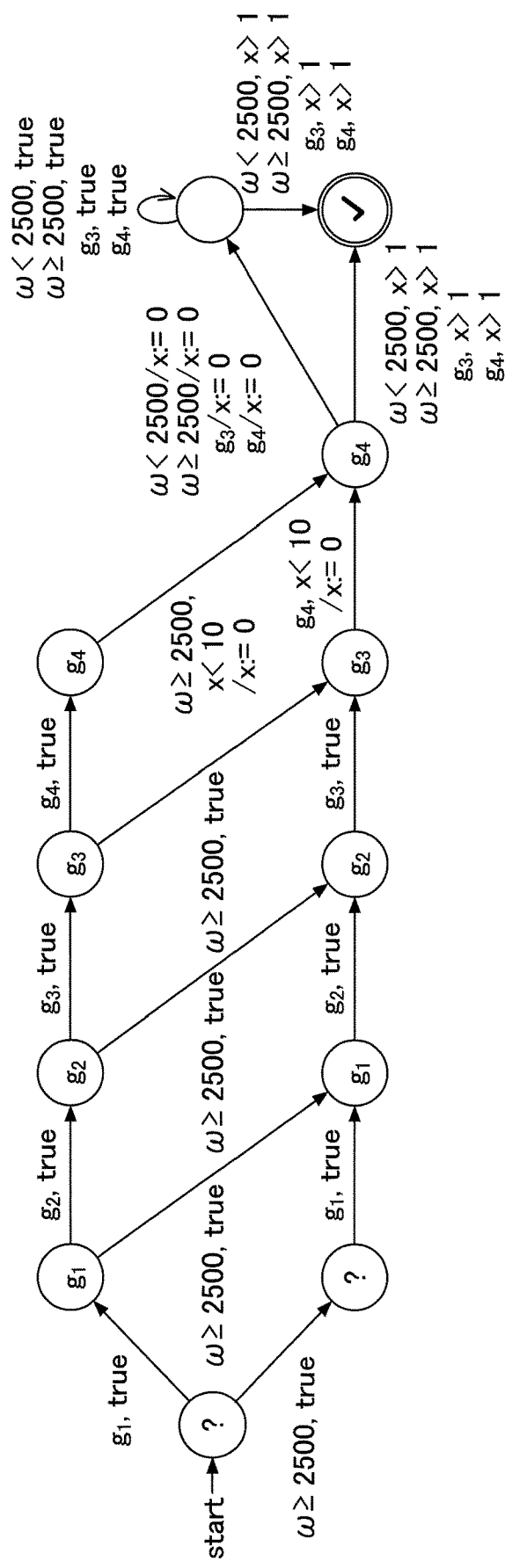
FIG. 10 illustrates an example of a Moore machine filter for the data of a throttle position sensor of an automobile according to Example 1.

The filter was implemented with C++ programming language, and was compiled with clang-900.0.39.2. The input of the tool consists of a pattern TA A, a buffer size N, and a timed word w, and the tool outputs a filtered word. The experiments were performed on a personal computer (MacBook Pro Early 2013 with 2.6 GHz Intel Core i5 processor and 8 GB 1600 MHz DDR3 RAM, running Mac OS 10.13.4). The benchmark problem used is illustrated in FIGS. 8 to 10. All of these are taken from automotive scenarios.

FIG. 8 is a diagram illustrating an example of a Moore machine filter for torque sensor data of an automobile according to Example 1.

In FIG. 8, a set W of input words (length is from 242,808 to 4,873,207) was generated by sldemo_enginewc.slx, which is an automotive engine model, with random input. This pattern describes four or more occurrences of high within one second. In a case of a buffer size N=10, a size of the Moore machine filter $M_{A,10}$ was 16 (which was measured by the number of reachable states of the non-buffer portion of $S^{N\text{-}ctr\text{-}d}$).

FIG. 9 is a diagram illustrating an example of a Moore machine filter for data of a gear position sensor of an automobile according to Example 1.

In FIG. 9, a set W of input words (length is from 306 to 1,011,426) was generated from an automatic transmission system model. This pattern taken from $\phi AT5$ of the model represents an event in which gear shifts (from a first gear to a second gear) are performed excessively frequently. When a buffer size is N=10, a size of the Moore machine filter $M_{A,10}$, which was measured in the same manner as that in FIG. 8, was 3.

FIG. 10 is a diagram illustrating an example of a Moore machine filter for data of a throttle position sensor of an automotive according to Example 1.

In FIG. 10, a set W of input words (length is from 708 to 1,739,535) was generated in the same model as that of the gear. The pattern is the same as $\phi AT8$: gear is shifted from first to fourth, and RPM becomes high, but speed is low (in other words, no event of $v \geq 100$). When a buffer size is N=10, a size of the Moore machine filter $M_{A,10}$, which was measured in the same manner as that in FIG. 8, was 71.

In order to measure execution time and memory usage, GNU time was used, and an average of 20 executions was taken. In each experiment, measurement of an entire workflow was performed. In an experiment of RQ2, time including a filter construction and memory usage were measured, and in an experiment of RQ3, time, which includes a filter construction, filtering, inter-process communication, and pattern matching, and memory usage were measured. In the RQ3 experiment, MONAA, the latest tool for timed pattern matching, was used.

RQ1: Filtering Rate

Figure 11A:
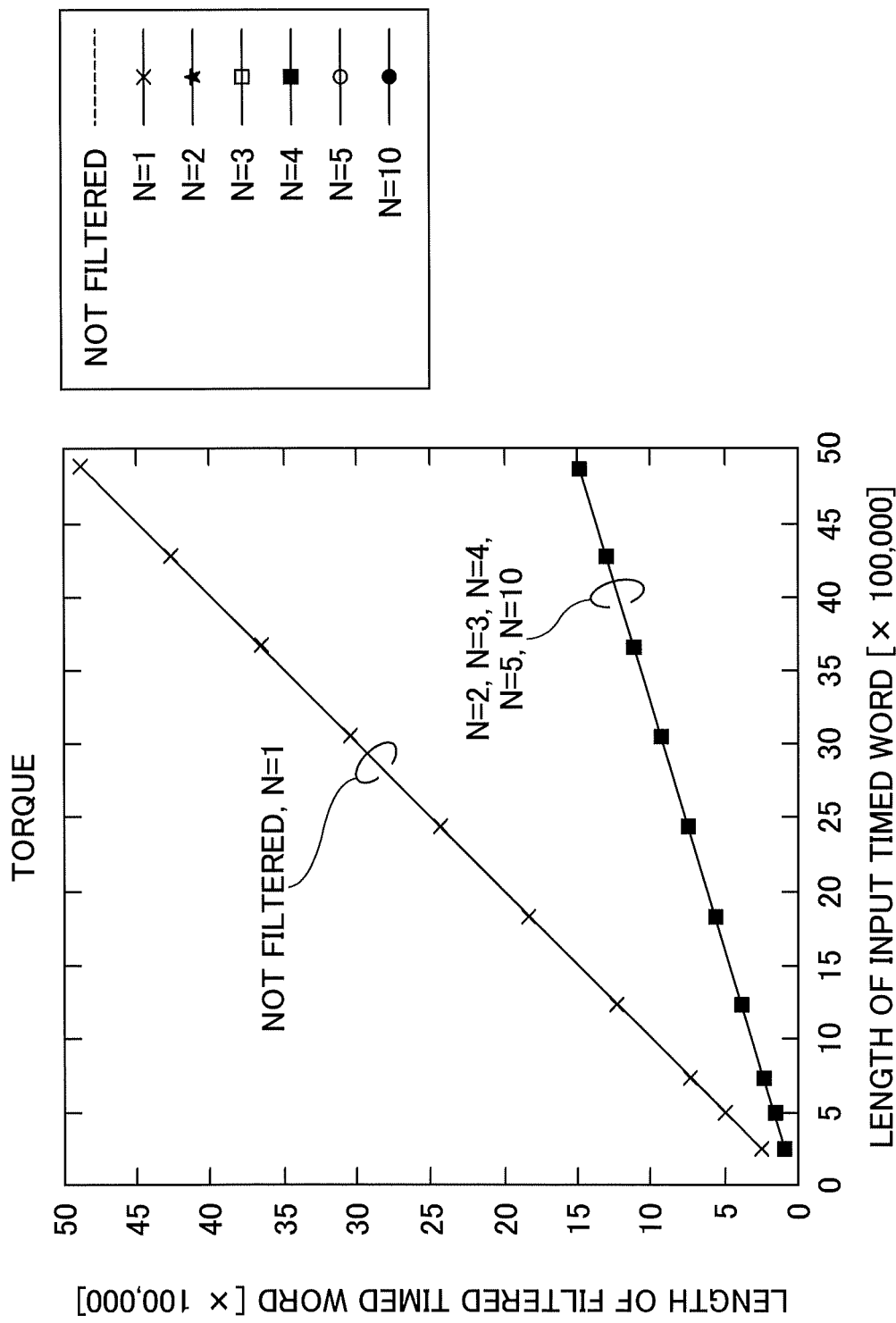
FIG. 11A is a graph illustrating simulation results in the Moore machine filter for the data of the torque sensor of the automobile according to Example 1, and illustrating a length of a filtered timed word with respect to a length of an input timed word.
Figure 11C:
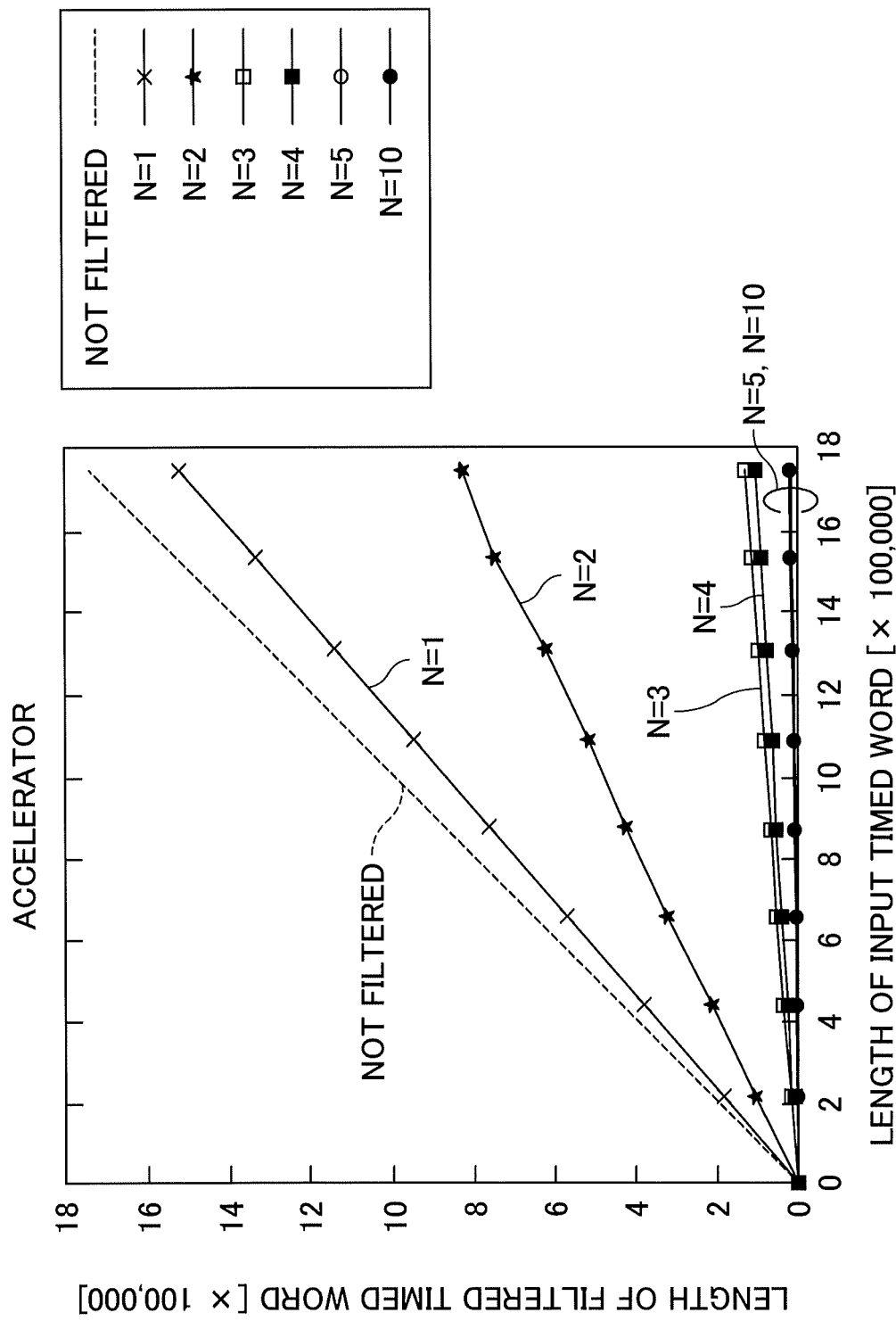
FIG. 11C is a graph illustrating simulation results in the Moore machine filter for the data of the throttle position sensor of the automobile according to Example 1, and illustrating a length of a filtered timed word with respect to a length of an input timed word.

FIG. 11A is a graph illustrating a length of a filtered timed word with respect to a length of an input timed word, which is simulation results of a Moore machine filter for automobile torque sensor data according to Example 1. FIG. 11B is a graph illustrating a length of a filtered timed word with respect to a length of an input timed word, which is simulation results of a Moore machine filter for data of an automobile gear position sensor according to Example 1. FIG. 11C is a graph illustrating a length of a filtered timed word with respect to a length of an input timed word, which is simulation results of a Moore machine filter for data of an automotive throttle position sensor according to Example 1. That is, FIGS. 11A to 11C each illustrates the length of the timed word filtered by each timed automaton A, for each buffer size N and timed word w∈W.

As can be seen from FIGS. 11A-11C, the larger the buffer size N, the shorter the filtered word. This is consistent with the theoretical considerations described in Theorem 3.9 (although the result was for untimed setting). It seems that peak performance can be attained with a relatively small N, such as N=10. When buffer size N=10, the length of the filtered timed word for torque, gear, and accelerator, is approximately ⅓, ½, and 1/100 of that of the original timed word, respectively. With respect to the data for accelerators, the present filter filters (masks) many characters. This is because a size of an alphabet and a size of the pattern timed automaton are relatively large. This significant data reduction indicates that the filtering method according to the present embodiment can be practiced in scenarios of embedded systems (see FIG. 1).

RQ2: Speed and Memory Usage

Figure 12A:
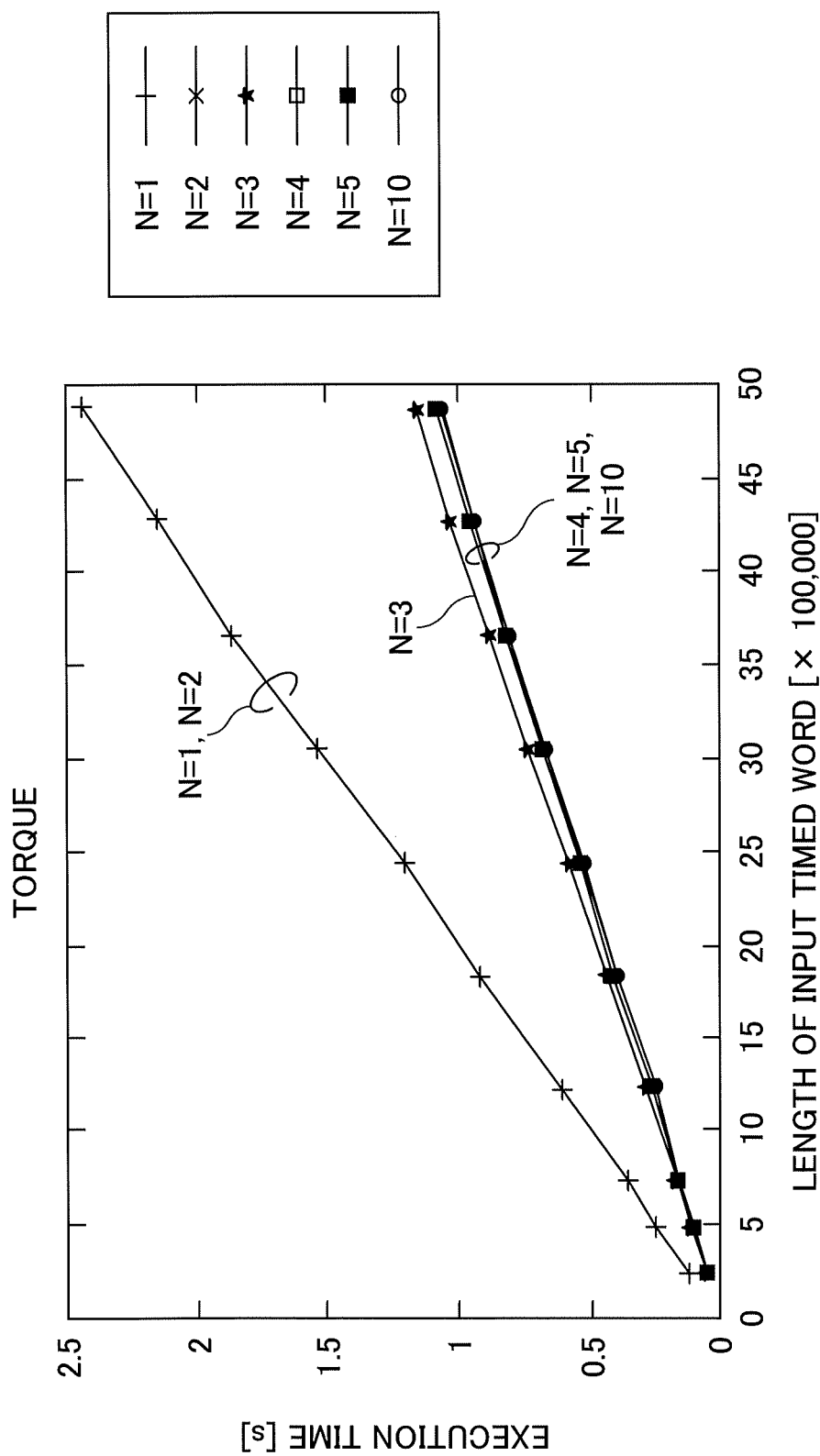
FIG. 12A is a graph illustrating simulation results of the Moore machine filter for the automotive torque sensor data according to Example 1, and illustrating an execution time with respect to a length of an input timed word.
Figure 12B:
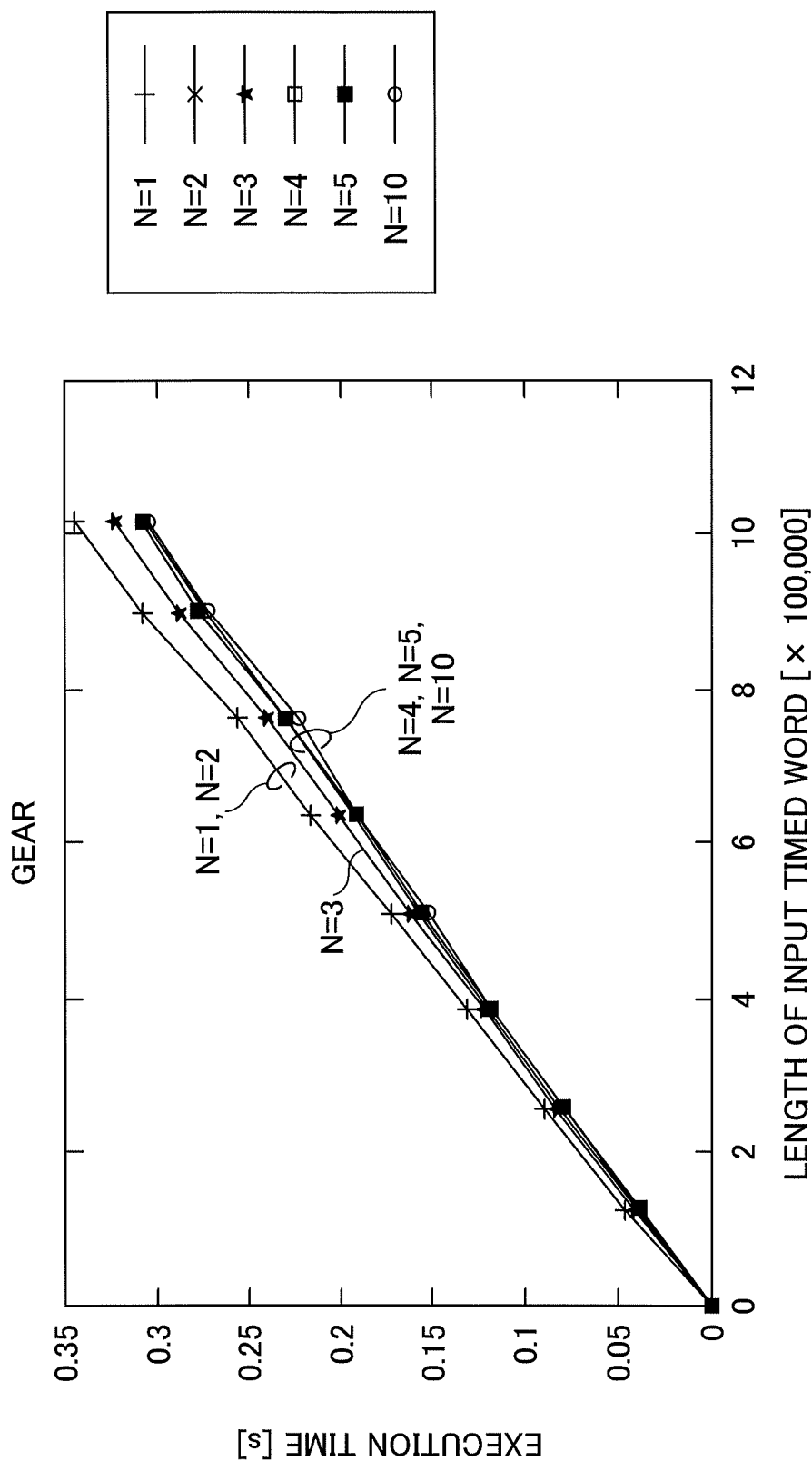
FIG. 12B is a graph illustrating simulation results of the Moore machine filter for the automotive gear position sensor data according to Example 1, and illustrating an execution time with respect to a length of an input timed word.
Figure 12C:
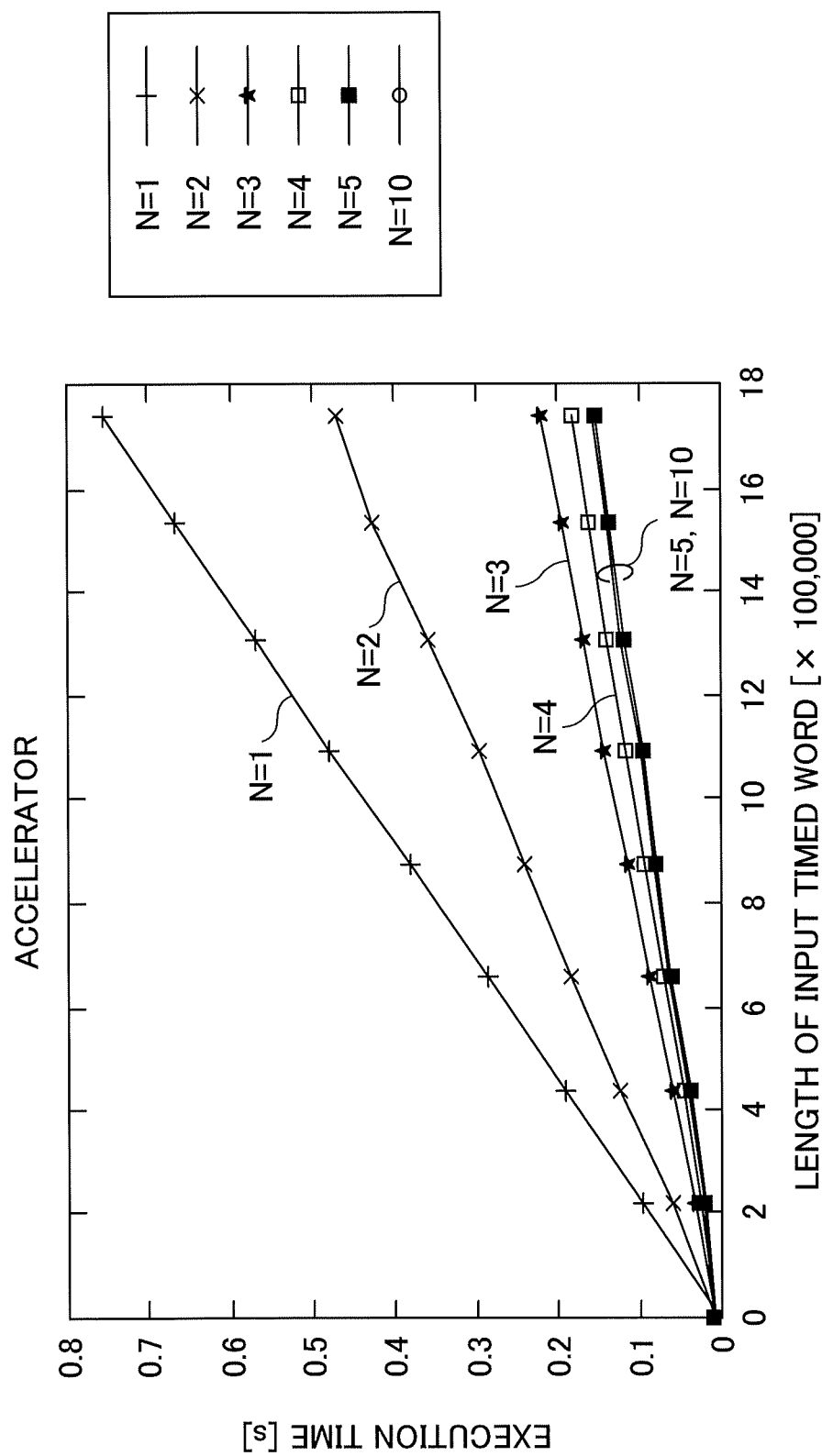
FIG. 12C is a graph illustrating simulation results of the Moore machine filter for the automotive throttle position sensor data according to Example 1, and illustrating an execution time with respect to a length of an input timed word.

FIG. 12A illustrates simulation results of a Moore machine filter for automobile torque sensor data according to Example 1, which is a graph illustrating execution time for a length of an input timed word. FIG. 12B illustrates simulation results of a Moore machine filter for automobile gear sensor data according to Example 1, which is a graph illustrating execution time for a length of an input timed word. FIG. 12C illustrates simulation results of a Moore machine filter for data of throttle position sensor for an automobile according to Example 1, which is a graph illustrating execution time for a length of an input timed word.

Figure 13A:
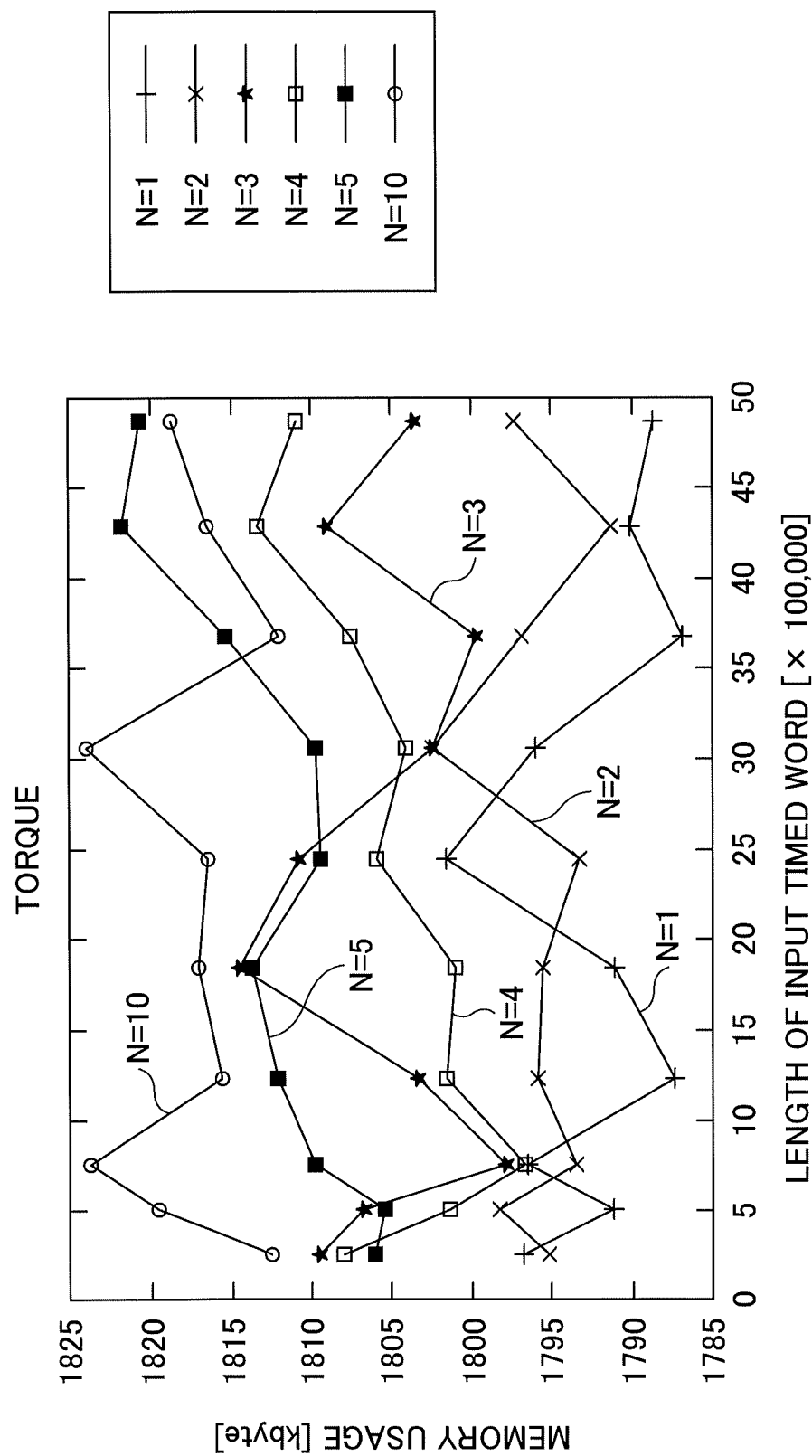
FIG. 13A is a graph illustrating simulation results of the Moore machine filter for the automotive torque sensor data according to Example 1, and illustrating memory usage with respect to a length of an input timed word.

FIG. 13A illustrates simulation results of a Moore machine filter for automobile torque sensor data according to Example 1, which is a graph illustrating memory usage for a length of an input timed word. FIG. 13B illustrates simulation results of a Moore machine filter for automobile gear sensor data according to Example 1, which is a graph illustrating memory usage for a length of an input timed word. FIG. 13C illustrates simulation results of a Moore machine filter for data of a throttle position sensor for an automobile according to Example 1, which is a graph illustrating memory usage for a length of an input timed word.

That is, FIGS. 12A to 13C each illustrates the time and memory usage of the present Moore machine filter for each pattern timed automaton A, buffer size N, and timed word w∈W.

As can be seen from FIG. 12, the execution time is linear to the length of the input word. As can be seen from FIG. 13, the memory usage is generally constant with respect to the length of the input word. These two results suggest that the filtering method of the inventors can be used in an online environment.

The time for constructing a Moore machine filter is considered to be negligible. See the execution time for the short input string in FIG. 12.

As for an effect of varying the buffer size N, it can be seen that the execution time is relatively large for smaller buffer size N. This may be because fewer characters are masked and more characters are output, which exacerbates cost of I/O devices. As for memory usage, its increase for larger buffer size N was moderate, despite the worst-case result (exponential for N) described in Proposition 3.5. This is because not all states generated by powerset construction can be reached.

RQ3: Acceleration of Timed Pattern Matching

Figure 14A:
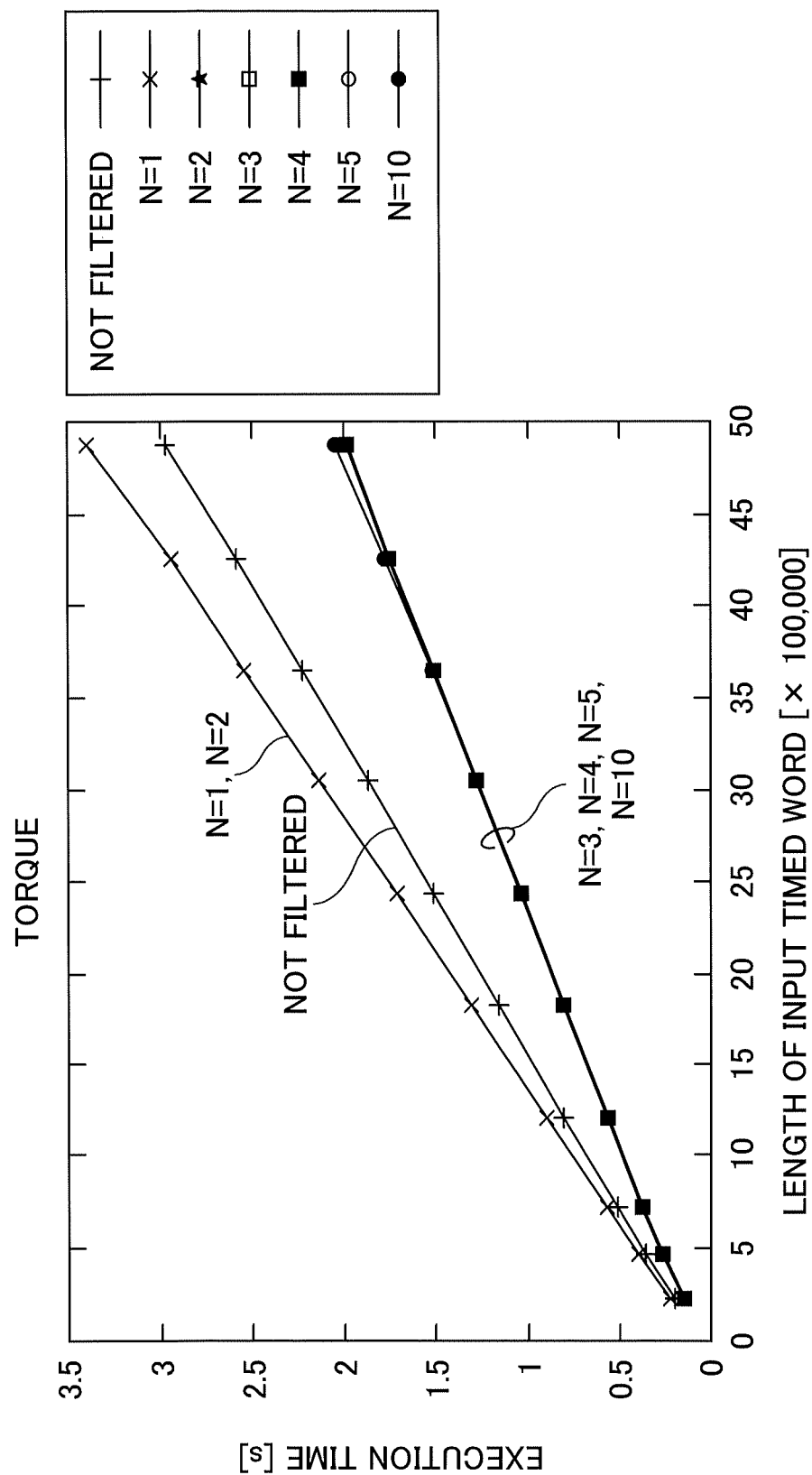
FIG. 14A is a graph illustrating simulation results for the data of the torque sensor of the automobile obtained by using a tool according to a comparative example, and illustrating an execution time with respect to a length of an input timed word.
Figure 14B:
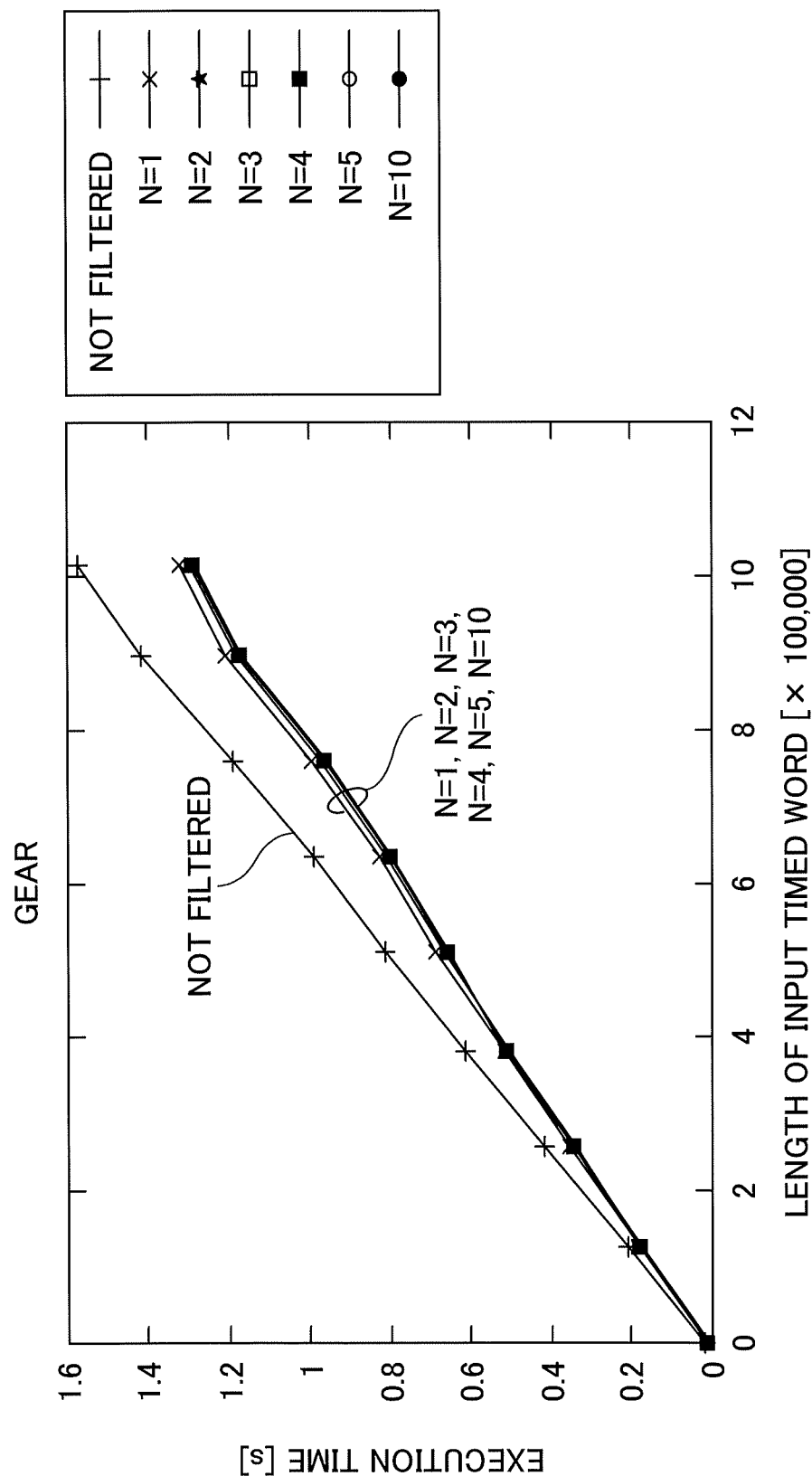
FIG. 14B is a graph illustrating simulation results for the data of the torque sensor of the automobile obtained by using a tool according to a comparative example, and illustrating an execution time with respect to a length of an input timed word.
Figure 14C:
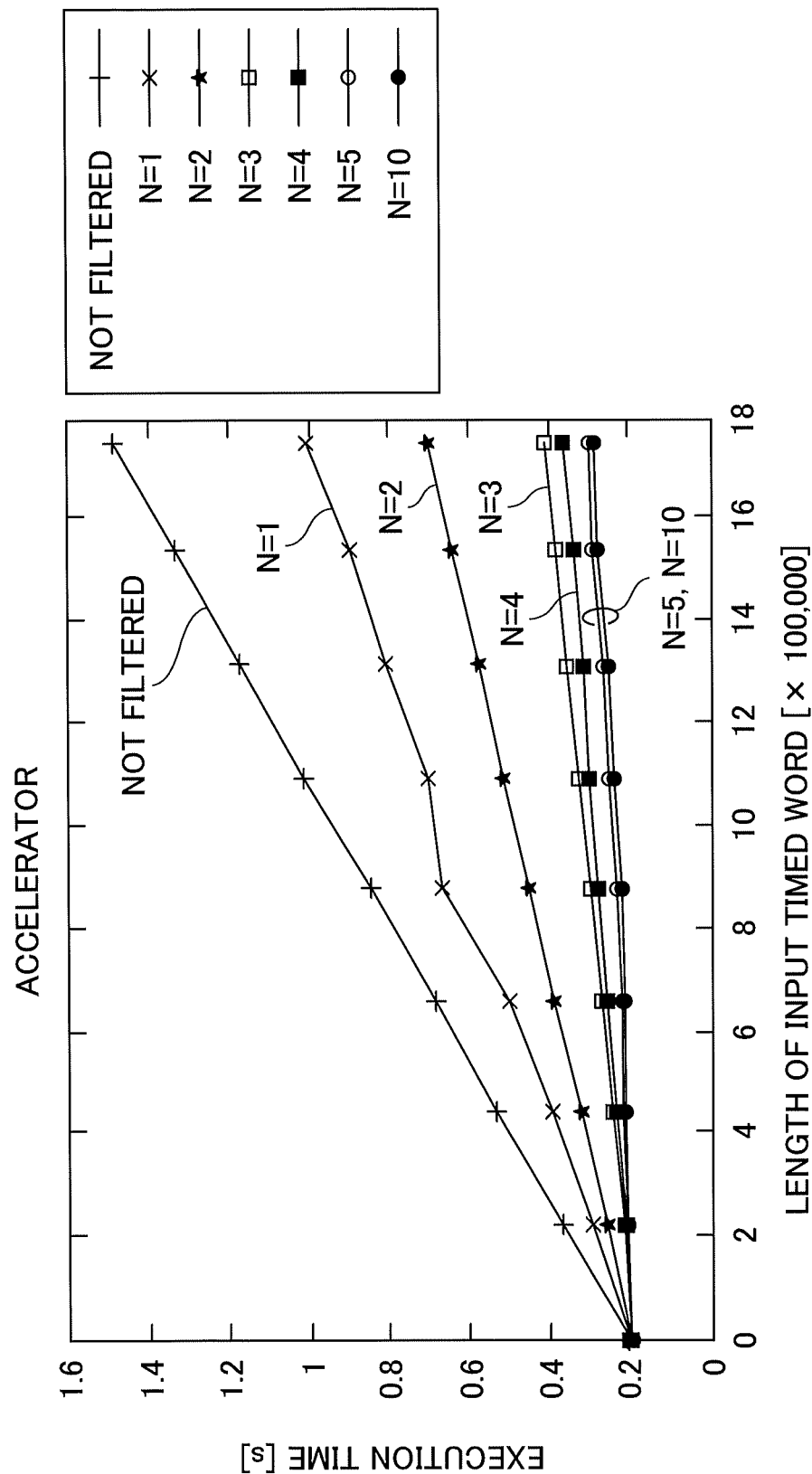
FIG. 14C is a graph illustrating simulation results for the data of the throttle position sensor of the automobile obtained by using a tool according to a comparative example, and illustrating an execution time with respect to a length of an input timed word.

FIG. 14A illustrates simulation results of a tool according to a comparative example for automobile torque sensor data, which is a graph illustrating execution time for a length of an input timed word. FIG. 14B illustrates simulation results of a tool according to a comparative example for automobile gear position sensor data, which is a graph illustrating execution time for a length of an input timed word. FIG. 14C illustrates simulation results of a tool according to a comparative example for data of an automotive throttle position sensor, which is a graph illustrating execution time for a length of an input timed word.

That is, FIG. 14 illustrates the workflow run time of FIG. 2. Here, the filters are given by an inventors' algorithm, and pattern matching is performed in the latest tool MONAA. More specifically, standard output of the Moore machine filter is connected to standard input of MONAA by a pipeline in UNIX (Registered Trademark). This allows the filter and MONAA to be executed in parallel on different CPU cores.

It was found that filtering improves an overall performance of timed pattern matching, if the buffer size N is large enough (e.g., N=10). With respect to torque data and gear data, performance was improved 1.2 times. With respect to accelerator data, performance was improved approximately twice. This improvement suggests that the filtering method of the inventors may be beneficial independently of the configuration assumptions illustrated in FIG. 1. In a case in which a log is enormous and monitoring takes hours or days, by running filtering in parallel, execution time may be shortened.

RQ4: Accuracy

As a result of applying filtering to the three example data, torque data, gear data, and accelerator data, with a buffer size N=10, ratios of the unmasked events that contributed to actual matching were 0.34%, 99%, and 92%, respectively. Therefore, accuracy varies dramatically depending on patterns. It should be noted that the filter of the inventors successfully reduce a log size by approximately three times, even with a low accuracy example (torque) (FIGS. 11A to 11C).

Most of the inaccuracy in the timed setting is attributed to laxness of one-clock determinization (Definition 4.5). For example, the timed automaton (TA) for the torque data (FIG. 8) requires four consecutive occurrences of high within one second using the same clock x. The best overapproximation by one-clock determinization (which requires all clocks must be reset for each transition) is the requirement that high needs to occur in each of four consecutive intervals of length (or less). This is a much looser requirement than the original requirement, explaining the relatively low accuracy of the torque data example.

RQ5: Responsiveness

For the three examples, torque data, gear data, and accelerator data, we calculated an average latency (run time)/|w|×N caused by the filter of the inventors when the buffer size N=10. Results were 2.2 microseconds, 3.1 microseconds, and 0.91 microseconds, respectively. Although the latency depends largely on computing power of the processor, it is concluded that the latency is small and that the filter operates at a sufficiently high speed.

6. Related Work

Pattern matching efficiency has been actively studied in the fields of database and networking. In these fields, issues in hardware architecture (speed difference between L1/L2 caches and a main memory) are similar to the issue in embedded monitors that has been discussed.

Studies in these application areas have treated strings as patterns. The main source of ideas was classic algorithms such as Boyer-Moore, Commentz-Walter, and Aho-Corasick. Many algorithms for patterns, provided by regular expressions or automata instead of strings, rely on these string matching techniques.

In database and networking, pattern matching for a regular expression has been done mainly by application-specific heuristics that take machine architecture into account.

Pre-filtering prior to actual pattern matching has been considered in the above studies (see, e.g., Non-Patent Document 3). The main difference between these studies and the inventors' studies is that their filters output matching candidates, which explicitly include indices for potential matches. For this reason, the second step of the workflow (pattern matching as we call it) is referred to as verification in their studies. In contrast, the inventors' filter only masks an input word. This is because the inventors' purpose (looking at embedded applications) is not only to increase matching speed, but also to reduce an amount of data sent from the sensor to the device performing pattern matching. This selection allows the use of a Moore machine, and the inventors' filter can be easily implemented by a field programmable gate array (FPGA) or an application specific integrated circuit (ASIC).

Monitoring over a real-time temporal logic and timed pattern matching (see, for example, Non-Patent Document 4) is a relatively new topic. Although such studies have been primarily conducted in the context of cyber-physical systems, they have considerable potential for application to database and networking. In timed pattern matching, specification can be described with a timed automaton (used in the present embodiment), a timed regular expression, or a metric temporal logic formula. Algorithms for timed pattern matching against these formulated specifications have been actively studied, for example, in Non-Patent Document 1. In addition, timed pattern matching is accelerated by combining shift table techniques, such as Boyer-Moore and Franek-Jennings-Smyth, with timed automata (see, for example, Non-Patent Document 5).

7. Conclusion

Motivated by the recent increase in demand for monitoring in embedded applications, the inventors have proposed the architecture of a filtering Moore machine for (untimed and timed) pattern matching. Its architecture is automaton-theoretic, and realizes a filter as a Moore machine.

Second Embodiment

Figure 15:
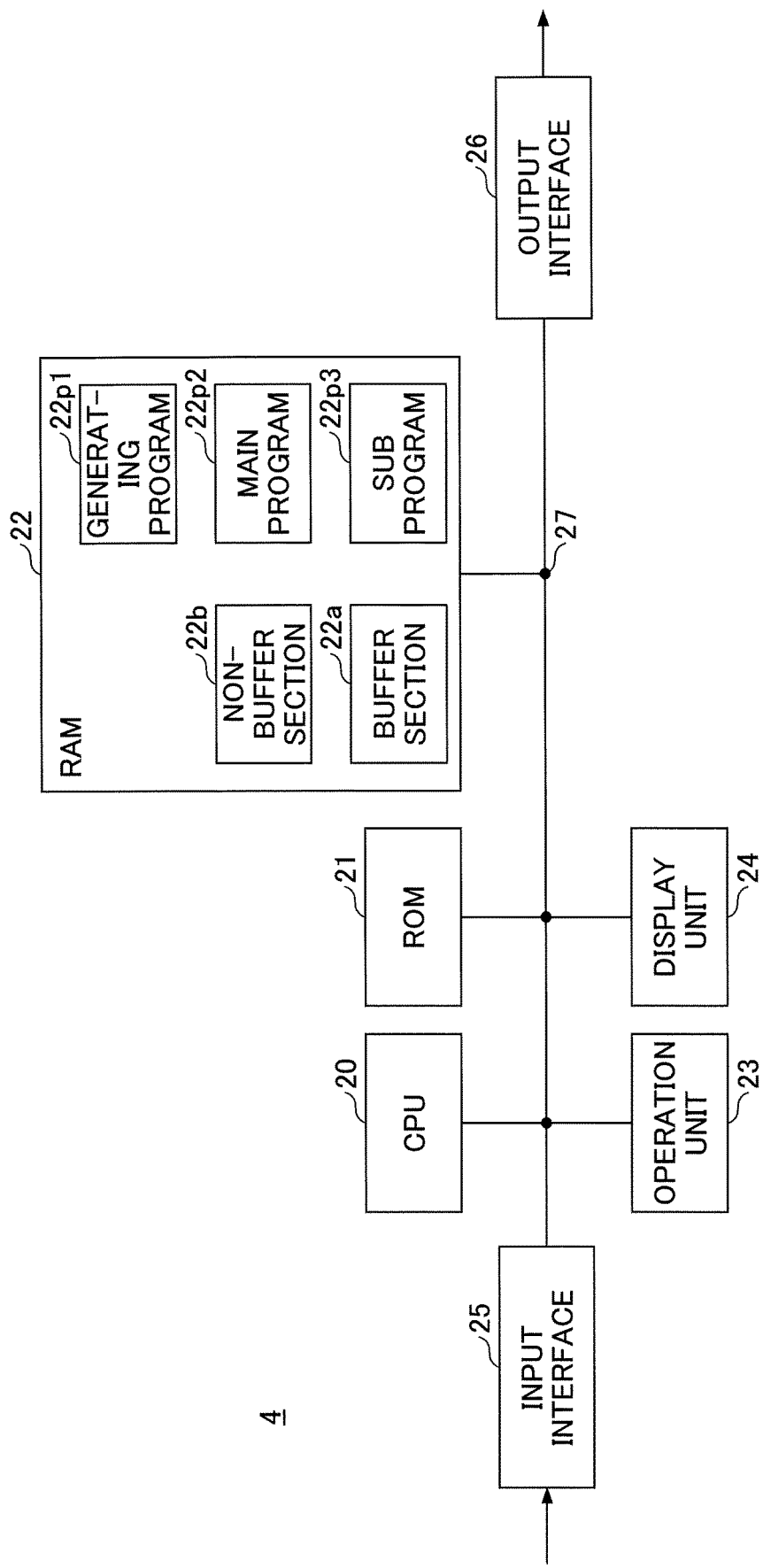
FIG. 15 is a block diagram illustrating an example of a configuration of a preprocessing circuit according to a second embodiment.

FIG. 15 is a block diagram illustrating an example of a configuration of the preprocessing circuit 4 according to a second embodiment. In FIG. 15, the preprocessing circuit 4 is a processor circuit having a function of a Moore machine filter, and includes a CPU 20, a ROM 21, a RAM 22, an operation unit 23, a display unit 24, an input interface 25, and an output interface 26, which are interconnected via a bus 27.

In FIG. 15, the CPU 20 is a processor that executes while controlling a process of the Moore machine filter. The ROM 21 stores programs and data necessary for operating the preprocessing circuit 4. The RAM 22 is a memory area used for performing the process of the Moore machine filter (filtering process), and includes, for example, a buffer section 22a which is a FIFO memory, and a non-buffer section 22b. The buffer section 22a may be referred to as a "buffer 22a", and the non-buffer section 22b may be referred to as a "non-buffer 22b". In the RAM 22, various programs (a generating program 22p1, a main program 22p2, and a sub program 22p3) executed by the CPU 20 are loaded from the ROM 21. Details of these programs will be described later. The input interface 25 receives input sequence data, converts the input sequence data into a predetermined data format, and outputs the converted data to the CPU 20 or the like. The output interface 26 converts the processed sequence data, which is a processing result of the Moore machine filter by the CPU 20, to a predetermined data format, and outputs the data to an external circuit or line. The operation unit 23 may include, for example, a keyboard, a mouse, or the like. The operation unit 23 is used to instruct execution or stop, or to input necessary data.

The operation unit 23 is also used to input, to the preprocessing circuit 4, a condition of a pattern (may also be referred to as a matching condition) that is desired to be retrieved from the input sequence data. The matching condition may be entered in a format of a character string (word) or a regular expression. Alternatively, the matching condition may be provided to the preprocessing circuit 4 in a form of an automaton. In another embodiment, the matching condition may be entered along with the sequence data through the input interface 25 (e.g., from an external device). The display unit 24 is a liquid crystal display for example, and displays the input sequence data, sequence data to be output, and the like.

Figure 16:
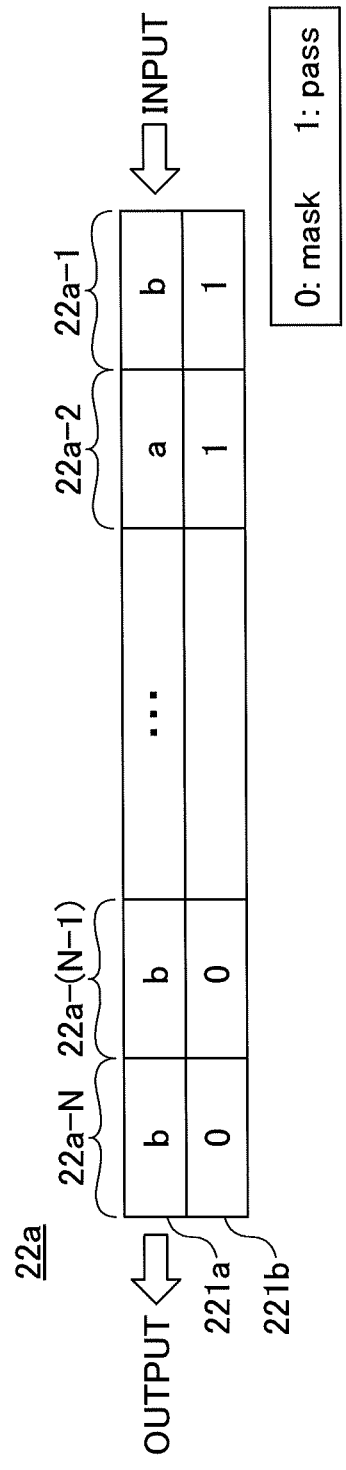
FIG. 16 is a diagram illustrating an example of a configuration of a buffer section.

An example of a configuration of the buffer section 22a is illustrated in FIG. 16. The buffer section 22a is one of components of a finite state machine (specifically, a Moore machine) that operates in the preprocessing circuit 4. As will be described in more detail below, the Moore machine operating in the preprocessing circuit 4 defines a state space by dividing the state space into a buffer portion and a non-buffer portion, similar to the Moore machine described in Section 3.2. The buffer section 22a corresponds to the buffer portion of the state space.

The buffer section 22a is a FIFO buffer having N memory blocks (22a-1, 22a-2, . . . , and 22a-N). Each of the memory blocks (22a-1, 22a-2, . . . , and 22a-N) includes a data area for storing data corresponding to one unit of input sequence data, and includes a flag area. In FIG. 16, a row 221a represents the data area(s), and a row 221b represents the flag area(s). Each of the data areas is a storage area having the same size (or larger size) as a size of one unit data of the sequence data. For example, in a case in which the sequence data is a character string, each character constituting the character string is a one-byte character, and the sequence data is input to the preprocessing circuit 4 character by character (on byte-by-byte basis), the size of the data area may be 1 byte.

A size of each of the flag areas is 1 bit, for example, and 0 (mask) or 1 (pass) is stored in each of the flag areas. Hereinafter, data (0 or 1) stored in the flag area is referred to as "flag". The value 0 stored in the flag area is denoted by "mask", and the value 1 stored in the flag area is denoted by "pass".

In the preprocessing circuit 4 according to the second embodiment, when sequence data is input to the buffer section 22a, data (one unit data) is stored in the rightmost memory block (22a-1). Before the data is stored in the memory block (22a-1), data (and a flag) in the leftmost memory block (22a-N) is output from the buffer section 22a, and data and a flag in the remaining memory blocks (22a-1, 22a-2, . . . , and 22a-(N−1)) are moved to the memory blocks (22a-2, 22a-3, . . . , and 22a-N) on their left, respectively. In the following description, the rightmost memory block (22a-1) is referred to as a "head (or beginning) of the buffer section 22a", and the leftmost memory block (22a-N) is referred to as an "end of the buffer section 22a".

In the above description, a case in which each of the memory blocks (22a-1, 22a-2, . . . , and 22a-N) has a data area and a flag area is described. However, the memory blocks are not required to have a data area. For example, in the Moore machine according to the definition described in Section 4.3 of the present specification, only a flag is stored in the buffer portion of the state space stores, and data (input sequence data) is not stored in the buffer portion, as described in Section 4.3. Therefore, in a case in which a Moore machine operating in the preprocessing circuit 4 is the Moore machine according to the definition described in Section 4.3, the data area is not required in the buffer section 22a.

Next, an example of the Moore machine that operates in the preprocessing circuit 4 according to the second embodiment will be described. Here, a case in which the preprocessing circuit 4 receives a character string not having a timestamp as the input sequence data, and in which the preprocessing circuit 4 generates a Moore machine for filtering the received character string, is mainly described. In this case, the Moore machine operating in the preprocessing circuit 4 is similar to that described in Section 3.2 of the present specification.

The Moore machine operating in the preprocessing circuit 4 is generated based on the matching condition for the input sequence data. Thus, before describing the Moore machine, an example of the matching condition will be described. The following description illustrates an example in which the matching condition is described as "a(a*)b" (when expressed by a regular expression).

Figure 17:
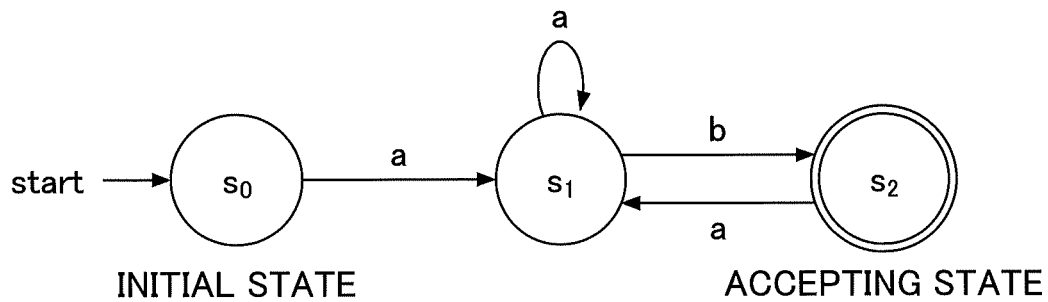
FIG. 17 is a diagram illustrating an example of a state transition diagram of an automaton.

The regular expression "a(a*)b" is equivalent to an automaton $A=(\Sigma, S, s_0, S_F, E)$ that operates in accordance with a state transition diagram illustrated in FIG. 17. Definitions of symbols in the automaton $A=(\Sigma, S, s_0, S_F, E)$ are as follows. $\Sigma$ represents an input character set, S represents a set of states, $s_0$ represents an initial state (which is also an element of S), $S_F$ (which is also a subset of S) represents a final state (may also be referred to as an accepting state), and E is a set of transitions.

In the example described here, the automaton A has three states $\{s_0, s_1, s_2\}$. $s_0$ is the initial state and $s_2$ is the final state (the accepting state). $\Sigma$ consists of characters "a" and "b". In FIG. 17, each of the states $\{s_0, s_1, s_2\}$ is represented by a circle, and a double circle represents an accepting state. In addition, a character (such as a or b) on an arrow (edge) connecting each state indicates the input to the automaton A. For example, in FIG. 17, a letter "a" is present on an arrow connecting state $s_0$ and state $s_1$. It indicates that "if the letter "a" is entered when the automaton A is in the state $s_0$, the automaton A transits to the state $s_1$".

The preprocessing circuit 4 generates the Moore machine according to the definition described in Section 3.2 of the present specification. In the present embodiment, the generated Moore machine is denoted by $M_{A,N}=(\Sigma_\perp, \Sigma_\perp, Q, q_0, \Delta, \Lambda)$. Definitions of symbols in $M_{A,N}=(\Sigma_\perp, \Sigma_\perp, Q, q_0, \Delta, \Lambda)$ are as follows. The first $\Sigma_\perp$ represents an input character set, and the second $\Sigma_\perp$ represents an output character set. $\Sigma$ is the input character set of the automaton A as described above, and $\Sigma_\perp$ is a character set made by adding a character $\perp$ to the input character set of the automaton A (note that the character $\perp$ is a character not included in the input character set $\Sigma$ of the automaton A; in the present embodiment, $\perp$ is referred to as a "blocked character"). Q represents a state space of the Moore machine, $q_0$ represents an initial state, $\Delta$ denotes a transition function, and $\Lambda$ represents an output function. A suffix "A" of $M_{A,N}$ means an automaton (i.e., the automaton A received by the preprocessing circuit 4) from which the Moore machine is generated, and "N" means a buffer size (the number of the memory blocks of the buffer 22a described with reference to FIG. 16).

When generating the Moore machine, the preprocessing circuit 4 first defines an augmented state based on each possible state of the automaton A. In the second embodiment, pairs of a possible state of the automaton A (this possible state is denoted by $s_k$) and the number of state transitions required for the automaton A to transition from the initial state ($s_0$) to the state $s_k$ are defined as new (augmented) states. If the number of the transitions from the initial state ($s_0$) to the state $s_k$ is c, the new state is denoted by ($s_k$, c). In the present embodiment, this new state is sometimes referred to as a "counter-equipped state", and the number of transitions required for transiting from the initial state ($s_0$) to the state $s_k$ is sometimes referred to as a "counter". In the present embodiment, although the counter is an integer of 0 or greater, the upper limit of the counter is an integer of buffer size N. Thus, to be correct, the counter is a value obtained by calculating the following equation (7) (i.e., the counter belongs to a residual class with respect to N).

$$((\text{number of transitions}-1) \bmod N)+1 \qquad (7)$$

Accordingly, a case may occur in which a value of the counter is not equal to the number of transitions, but in the present embodiment, the c of ($s_k$, c) may be referred to as a counter of the state $s_k$, or sometimes may be referred to as the number of transitions (or transition count).

Figure 18:
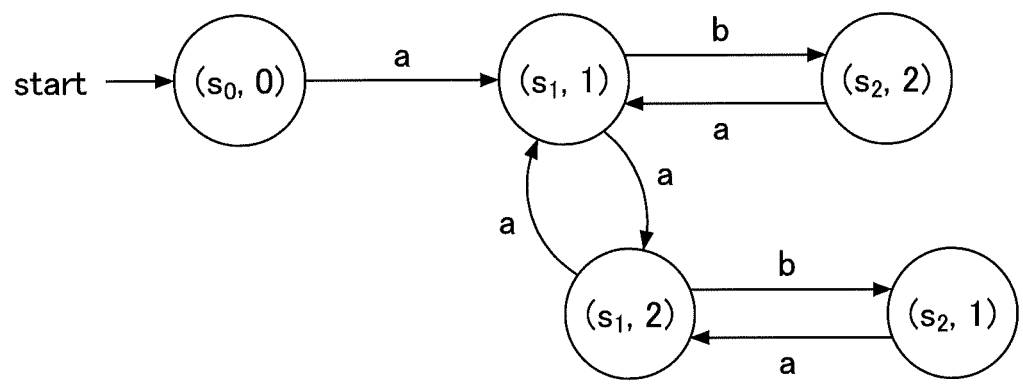
FIG. 18 is a diagram illustrating an example of a state transition diagram of an automaton described using states having counters.

The counter and the counter-equipped state will be described with reference to a state transition diagram of an automaton described by using counter-equipped states (FIG. 18). Unless otherwise noted, the following description explains a case in which the buffer size (N) is 2.

With respect to the automaton A of FIG. 17, because the number of transitions required for transiting from the initial state $s_0$ to the state $s_1$ is one, the counter of the state $s_1$ is 1 based on the above equation (7). Therefore, the preprocessing circuit 4 defines ($s_1$, 1) as a counter-equipped state.

In addition, as can be seen from FIG. 17, when a character "a" is input to the automaton A, when the state of the automaton A is $s_1$, the state is again transited to $s_1$ (this is a case in which a character "a" is entered twice consecutively when the state of the automaton A is $s_0$). This means that the automaton A transits to the state $s_1$ as a result of two transitions, so the number of transitions is 2 and the value of the counter is 2. Therefore, the preprocessing circuit 4 also defines ($s_1$, 2) as a counter-equipped state.

Furthermore, if the character "a" is input three times consecutively when the state of the automaton A is $s_0$, the state transits to $s_1$ again. In this case, the number of transitions is three, but the value of the counter becomes 1 [((3-1) mod 2)+1=1], based on the above equation (7). Therefore, with respect to the state $s_1$ of the automaton A, two new states (counter-equipped states) can be created by adding counters (1 and 2) to the state $s_1$ of the automaton A, namely ($s_1$, 1) and ($s_1$, 2).

Similarly, with respect to a possible state $s_2$ of the automaton A, two new states ($s_2$, 1) and ($s_2$, 2) can be defined by adding counters to the possible state $s_2$ of the automaton A. Therefore, when the buffer size N is 2, the preprocessing circuit 4 defines the five counter-equipped states ($s_0$, 0), ($s_1$, 1), ($s_1$, 2), ($s_2$, 1), and ($s_2$, 2) based on the automaton A illustrated in FIG. 17. After defining the counter-equipped states, the preprocessing circuit 4 defines an automaton using the counter-equipped states, as illustrated in FIG. 18 (the automaton defined herein by using the counter-equipped states is denoted by A').

The automaton A' illustrated in FIG. 18 differs from the automaton A illustrated in FIG. 17 in that each state of the automaton A' is a counter-equipped state, but a rule of state transition of the automaton A' illustrated in FIG. 18 is the same as that of the automaton A illustrated in FIG. 17 in principle. That is, the preprocessing circuit 4 defines the automaton A' based on the automaton A illustrated in FIG. 17. For example, in the automaton A illustrated in FIG. 17, when a character "b" is input when the automaton A is in the state $s_1$ (($s_1$, 1) or ($s_1$, 2)), the automaton A transits to the state $s_2$ (($s_2$, 2) or ($s_2$, 1)). Therefore, the preprocessing circuit 4 defines the automaton A' such that, when the character "b" is input to the automaton A' that is in the state ($s_1$, 1) or ($s_1$, 2), the automaton A' transits to the state ($s_2$, 2) or ($s_2$, 1).

Next, the preprocessing circuit 4 defines (generates) a Moore machine based on the automaton A' in FIG. 18. First, definition of possible states (state spaces) of the Moore machine and a method of defining a transition function are explained. In the process of generating the Moore machine by the preprocessing circuit 4, a process similar to a known subset construction (also referred to as a powerset construction) is performed. Because the subset construction is a well-known method as disclosed in, for example, Japanese Laid-open Patent Application Publication No. 2009-58989, detailed description of the subset construction is omitted. In the present embodiment, only processes related to generation of the Moore machine performed by the preprocessing circuit 4 will be described.

The subset construction is used to convert (called determinization) a nondeterministic finite automaton (NFA) into a deterministic finite automaton (DFA). Therefore, the Moore machine generated by the preprocessing circuit 4 is a DFA. As is well known, the determinization specifies all states that can be reached from a given state (or set of states) of the non-deterministic finite automaton (NFA) when a certain input character x is given, and defines a set of the specified states as a state of the deterministic finite automaton. The preprocessing circuit 4 performs a process similar to this determinization.

However, in the determinization performed by the preprocessing circuit 4, a set of states that is made by adding the initial state ($s_0$, 0) to the above-described "set of specified states" is defined as the state of the Moore machine $M_{A,N}$ generated by the preprocessing circuit 4. In addition, as an input character set of the Moore machine, $\Sigma_\perp$ is used instead of $\Sigma$, the input character set of automaton A'. Hereinafter, a process of generating the Moore machine $M_{A,N}$ performed by the preprocessing circuit 4 will be described with reference to FIGS. 18 and 19.

In a case in which the input character "a" is given to the automaton A' when the automaton A' of FIG. 18 is in the initial state ($s_0$, 0), the automaton A' transits to a counter-equipped state ($s_1$, 1), and does not transit to the other states. Therefore, the preprocessing circuit 4 determines that a set of (destination) states that can be reached from the initial state ($s_0$, 0), in a case in which the input character "a" is given, is {($s_1$, 1), ($s_0$, 0)} (i.e., which is a set of states made by adding ($s_0$, 0) to the specified destination state ($s_1$, 1)). In the following description, this set of states is denoted by $q_1'$. Also, the initial state ($s_0$, 0) is denoted by $q_0'$ (i.e., $q_0'$ is the initial state of the Moore machine $M_{A,N}$). Similarly, the preprocessing circuit 4 specifies a set of destination states when an input character b is input to the automaton A' in the initial state ($s_0$, 0), and a set of destination states when an input character ⊥ is input to the automaton A' in the initial state ($s_0$, 0). As can be seen from FIG. 18, there is no corresponding destination state for these cases. If a destination state does not exist, the above-described "set of specified states" is equivalent to an empty set. In this case, the preprocessing circuit 4 determines a set of a state {($s_0$, 0)} (that is, $q_0'$), which is formed by adding the initial state ($s_0$, 0) to an empty set, as a set of a destination state. Therefore, the preprocessing circuit 4 determines that {($s_0$, 0)} (=$q_0'$) is a set of a destination state from the initial state ($s_0$, 0), in a case in which the input character b (or ⊥) is given.

Subsequently, the preprocessing circuit 4 specifies a set of destination states from the set of states $q_1'$ (={($s_1$, 1), ($s_0$, 0)}). As can be seen from the state transition diagram in FIG.

18, a destination state when the input character a is given to the automaton A' in the state ($s_1$, 1) is ($s_1$, 2), and a destination state when the input character a is given to the automaton A' in the state ($s_0$, 0) is ($s_1$, 1). Therefore, the preprocessing circuit 4 determines that a set of destination states from the state $q_1$', in a case in which an input character a is given, is a set of states {($s_1$, 1), ($s_1$, 2), ($s_0$, 0)} formed by adding a state ($s_0$, 0) to the states ($s_1$, 1) and ($s_1$, 2). Hereinafter, this set of states {($s_1$, 1), ($s_1$, 2), ($s_0$, 0)} is denoted by $q_2$'. Similarly, the preprocessing circuit 4 determines a set of destination states (which is $q_2$' illustrated in FIG. 19) from the state $q_1$' in a case in which an input character b is given, and a set of destination states (which is $q_0$') from the state in a case in which an input character ⊥ is given. Note that elements in $q_2$' are "($s_2$, 2) and ($s_0$, 0)".

Figure 19:
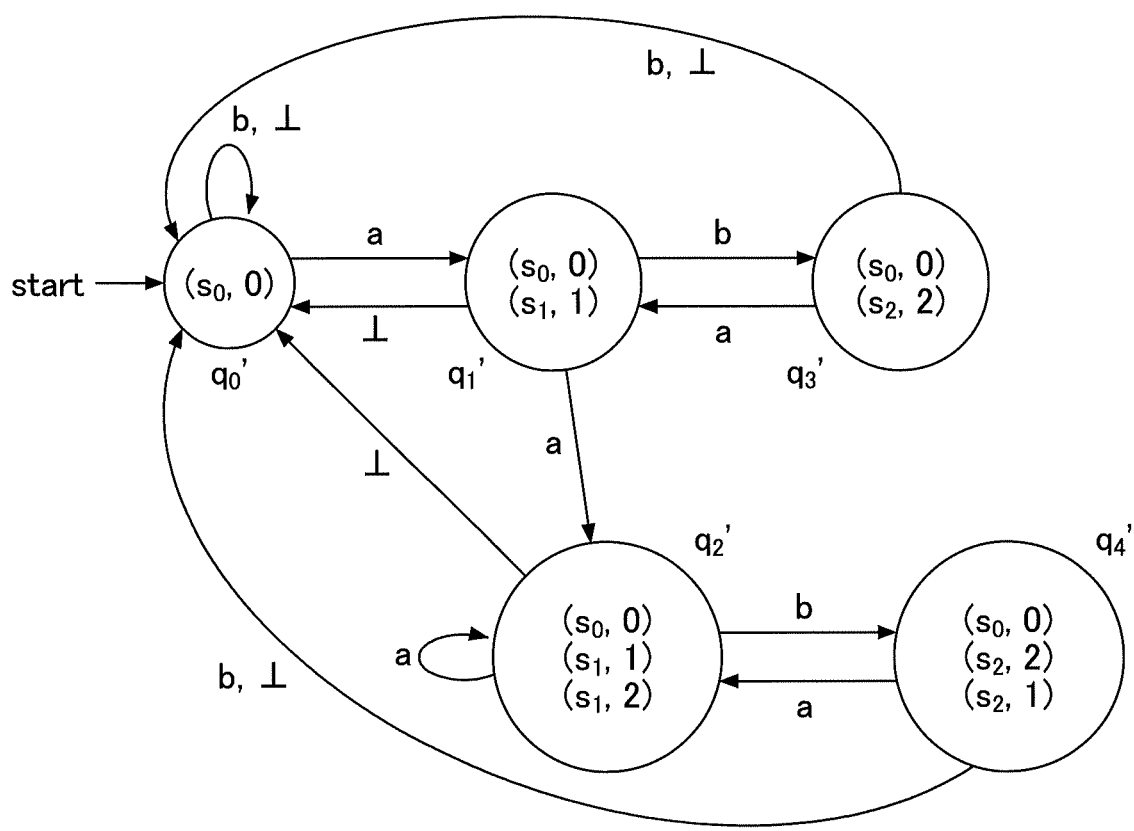
FIG. 19 is a diagram illustrating an example of a state transition diagram of a Moore machine according to the second embodiment.

By repeating the above-described operations, the preprocessing circuit 4 determines each state and each state transition of the Moore machine $M_{A,N}$. FIG. 19 illustrates each of the determined states and each of the determined state transitions of the Moore machine $M_{A,N}$. Then, the preprocessing circuit 4 stores each of the determined states and each of the determined state transitions into the RAM 22. Examples of the states and state transitions of the Moore machine $M_{A,N}$ stored in the RAM 22 are illustrated in FIGS. 20 and 21. FIG. 20 illustrates a state transition table (equivalent to the state transition diagram illustrated in FIG. 19) of the Moore machine $M_{A,N}$ generated by the preprocessing circuit 4 based on the automaton A' of FIG. 18, and FIG. 21 is a state management table of the Moore machine $M_{A,N}$.

As illustrated in FIG. 21, the state management table has columns of "state", "subset", and "Current". The column "state" contains a list of possible states of the Moore machine $M_{A,N}$. Each row of the column "subset" contains an element (or elements) (specifically, one or more counter-equipped states of the automaton A') that is included in the corresponding state of the Moore machine $M_{A,N}$. The column "Current" is an area for storing a current state of the Moore machine. A state corresponding to a row of which "1" is stored in the column "Current" is the current state of the Moore machine. Details will be described below.

The state transition table in FIG. 20 represents a rule (transition function) of the state transition of the Moore machine $M_{A,N}$. The state transition table has multiple rows, and each row (denoted by $\delta_0$ to $\delta_{11}$) represents a specification of the transition of the Moore machine $M_{A,N}$. As illustrated in FIG. 20, each row of the state transition table has columns of "state before transition", "state after transition", and "input". For example, the top row of the transition table (the line describing a specification of the transition $\delta_0$) contains "$q_0$'", "$q_1$'", and "a" in the "state before transition", "state after transition", and "input" columns, respectively. This means that if a state before transition is $q_0$' and an input string "a" is given, the state after transition becomes $q_1$'.

The state transition table and the state management table of the Moore machine $M_{A,N}$ are stored in the non-buffer 22b of the RAM 22. The state transition table and the state management table generated by the preprocessing circuit 4 may include information other than the information described herein. Further, the state transition table and the state management table illustrated in FIG. 20 and FIG. 21 are examples, and the preprocessing circuit 4 does not necessarily need to create information in the format illustrated in FIG. 20 and FIG. 21. The preprocessing circuit 4 may store the information required for operating (state transition) the Moore machine $M_{A,N}$ in a storage area (the RAM 22 or the like) in a format different from that illustrated in FIG. 20 and FIG. 21.

In order to operate the Moore machine $M_{A,N}$, definition of an output function is required, in addition to the definition of the state and the definition of the transition function. Details of the output function will be described later. Further, when the Moore machine $M_{A,N}$ according to the second embodiment operates, contents of the buffer 22a are also updated. This operation will also be described later.

Figure 22:
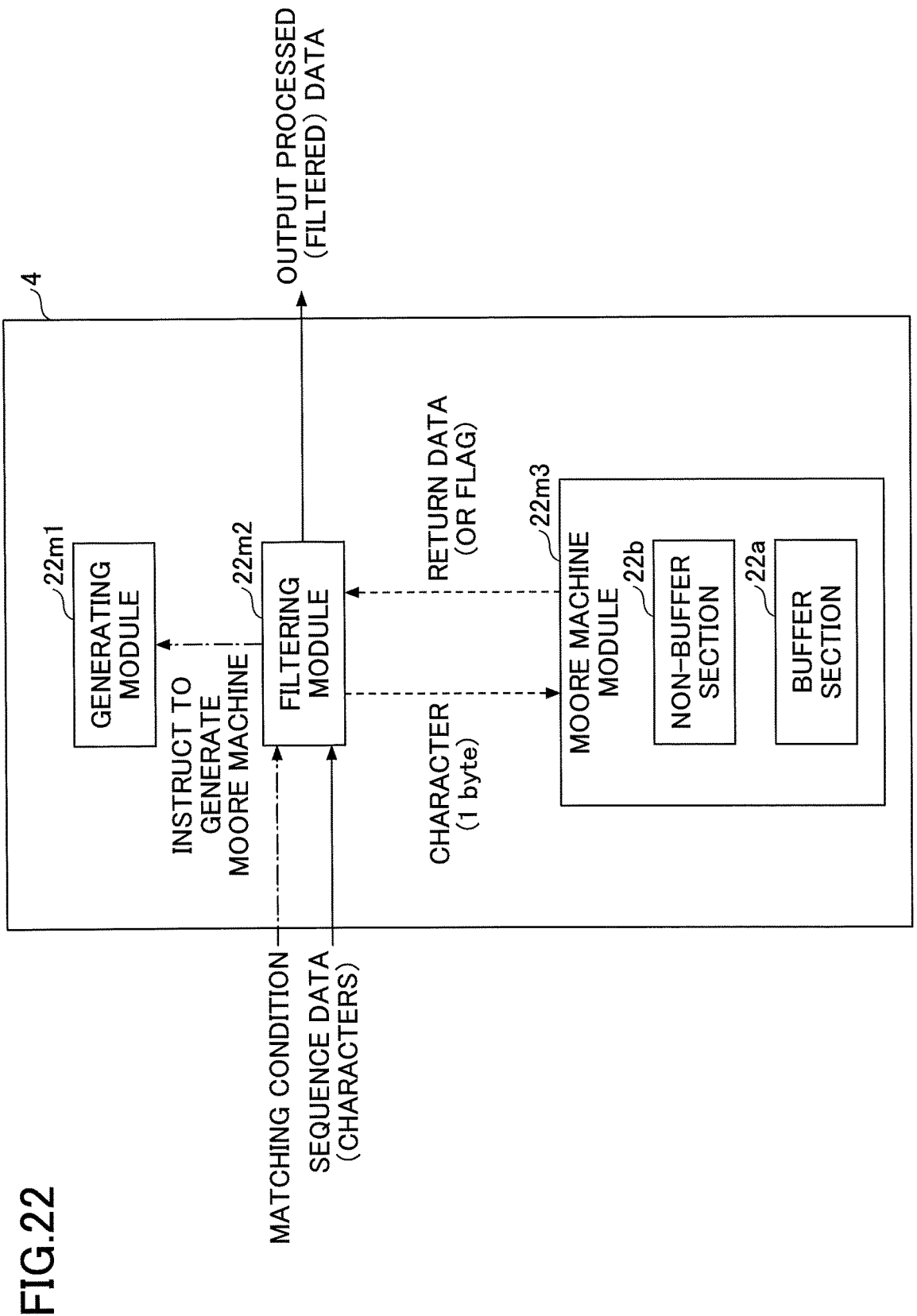
FIG. 22 is a diagram illustrating functional blocks of the preprocessing circuit according to the second embodiment.

Next, each functional block of the preprocessing circuit 4 will be described. FIG. 22 is a diagram illustrating each functional block of the preprocessing circuit 4. As illustrated in FIG. 22, the preprocessing circuit 4 includes processing modules (functional blocks) of a generating module 22m1, a filtering module 22m2, and a Moore machine module 22m3. These functional blocks are embodied by the CPU 20 executing each program that the preprocessing circuit 4 has. Specifically, the generating module 22m1 is a functional block realized when the CPU 20 executes the generating program 22p1. The filtering module 22m2 is a functional block realized by the CPU 20 executing the main program 22p2. The Moore machine module 22m3 is a functional block realized by the CPU 20 executing the sub program 22p3.

The filtering module 22m2 and the Moore machine module 22m3 are functional blocks for performing data processing (filtering process), and the generating module 22m1 is a functional block for generating Moore machine module 22m3 (sub program 22p3). The generating module 22m1 generates the Moore machine module 22m3 by receiving an instruction from the filtering module 22m2. The Moore machine module 22m3 operates as the above-described finite state machine (Moore machine), based on an instruction from the filtering module 22m2. Specifically, the Moore machine module 22m3 receives sequence data (character string) on a per unit data basis (character-by-character) from the filtering module 22m2, and performs state transition and output of information in response to receiving the sequence data. Details of processes of the generating module 22m1, the filtering module 22m2, and the Moore machine module 22m3 will be described below.

Next, a flow of the filtering process performed by the preprocessing circuit 4 will be described. Hereinafter, an example in which the preprocessing circuit 4 receives, as sequence data, a sequence (character string) of one-byte characters not having a timestamp, on a per byte basis, will be described.

Figure 23:
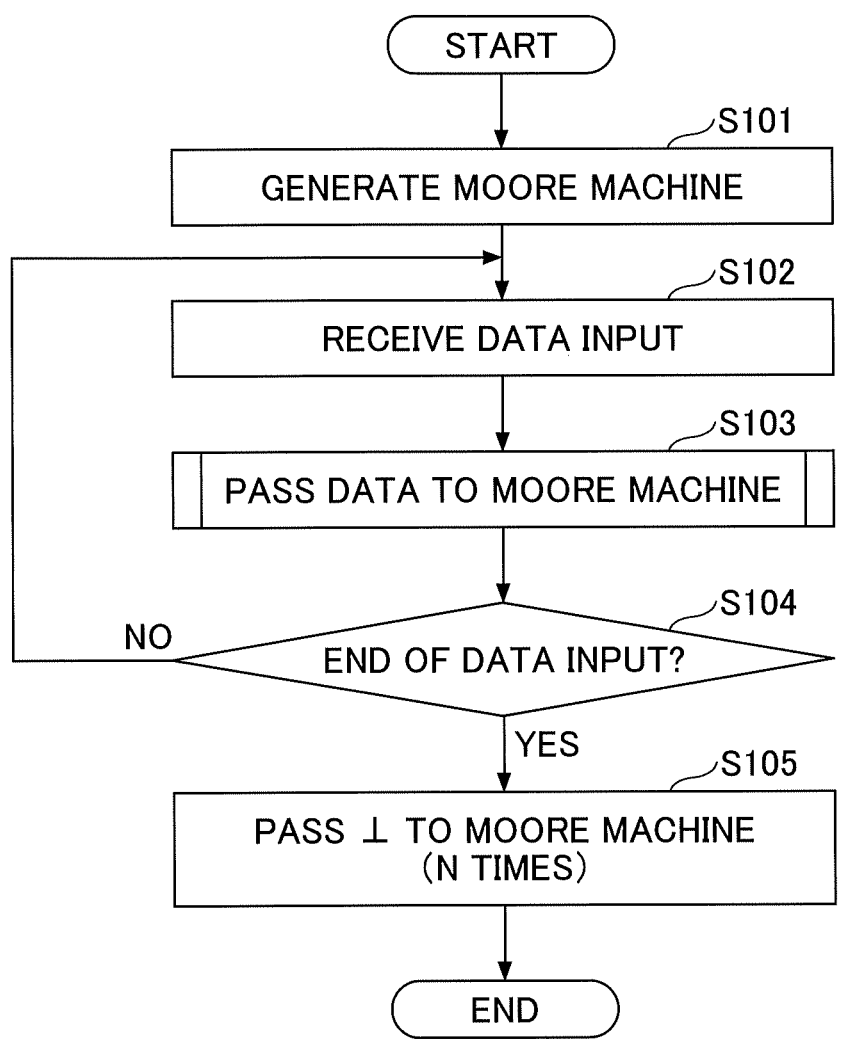
FIG. 23 is a flowchart illustrating a process flow of the preprocessing circuit according to the second embodiment.
Figure 24:
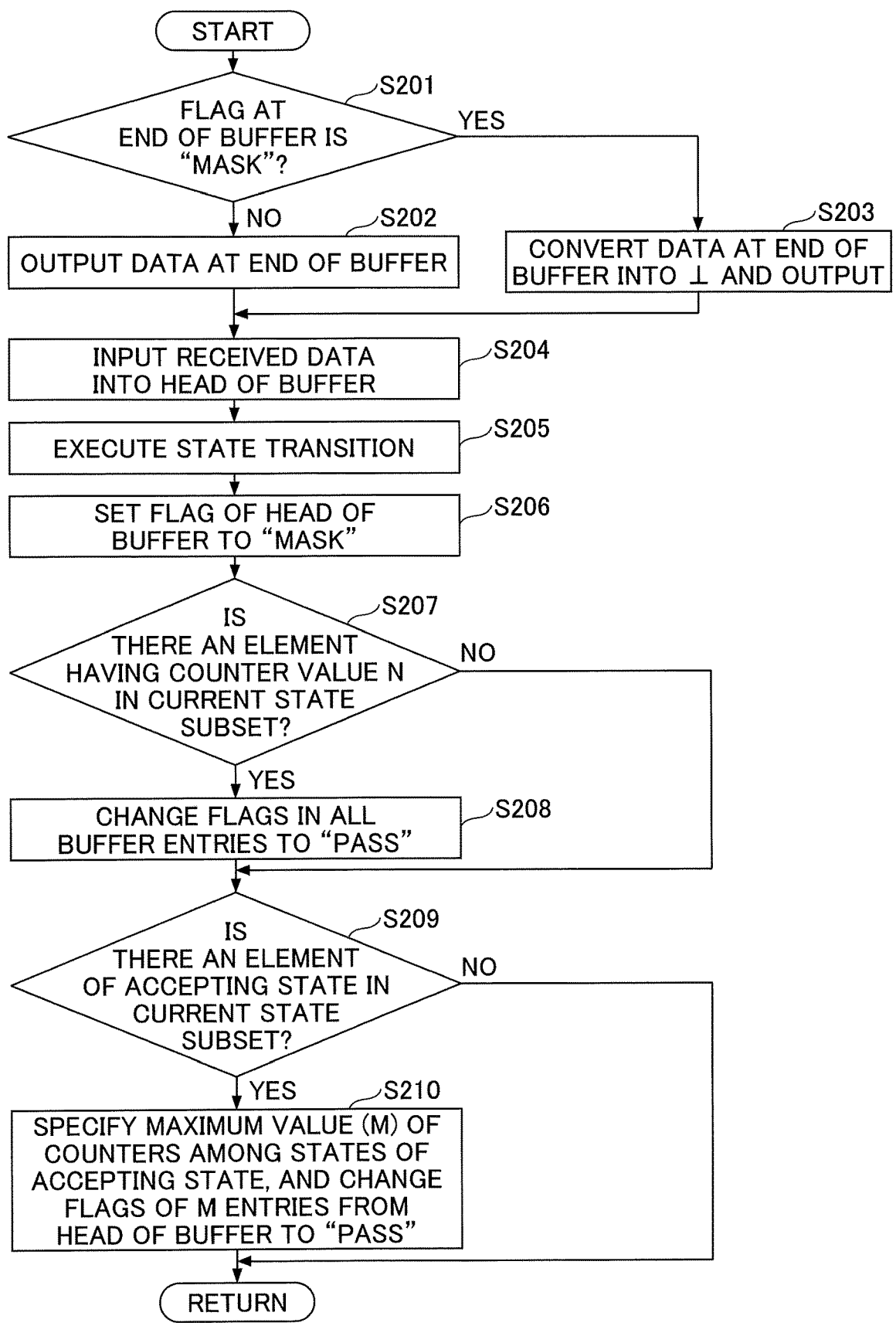
FIG. 24 is a flowchart illustrating a process flow at a time of state transition of the Moore machine.

FIG. 23 and FIG. 24 are flowcharts of data processing (filtering process) performed by the preprocessing circuit 4. The flowchart of FIG. 23 illustrates an entire flow of the filtering process. FIG. 24 is a flowchart illustrating a detail of a process of a portion (step S103) of the flowchart in FIG. 23.

First, the overall flow of the filtering process will be described with reference to FIG. 23. The filtering process is performed, for example, when the preprocessing circuit 4 receives a process start instruction from a user through the operation unit 23, or when the preprocessing circuit 4 receives a process start instruction from an external device through the input interface 25. When the filtering process starts, the filtering module 22m2 receives a matching condition via an operation unit 23 or an input interface 25, and generates a Moore machine from the received matching condition (step S101 in FIG. 23). In step S101, the filtering module 22m2 causes the generating module 22m1 to generate the Moore machine module 22m3. The generating module 22m1 defines, as described above, states of the Moore machine and a transition function of the Moore machine (that is, the generating module 22m1 generates not only a program code executed by the CPU 20 but also information such as the state management table described above (information required for an operation of the Moore machine)).

The definition of the states of the Moore machine and the definition of the transition function are as described above with reference to FIGS. 17 to 21. As a result of the definition of the states, the generating module 22*m*1 generates the state management table as illustrated in FIG. 21, and stores the state management table in the non-buffer 22*b* (because a state of the Moore machine (Moore machine module 22*m*3), immediately after the state management table is generated, is an initial state, the generating module 22*m*1 generates a state management table in which a value of the column "Current" in a row corresponding to the initial state $q_0$' (the top row of FIG. 21) is 1, and in which 0's are set to the other rows of "Current". As a result of the definition of the transition function, the generating module 22*m*1 generates the state transition table as illustrated in FIG. 20 and stores the state transition table in the non-buffer 22*b*. The generating module 22*m*1 also generates a buffer 22*a*. Specifically, the generating module 22*m*1 allocates an area having N memory blocks as illustrated in FIG. 16 on the RAM 22, and initializes data areas and flag areas of the N memory blocks (the flag "mask" is stored in the flag area of each of the memory blocks, and the block character ⊥ is stored in the data area of each of the memory blocks). The definition of the output function will be described below.

The filtering module 22*m*2 does not necessarily need to receive the matching condition in step S101. For example, a Moore machine (Moore machine module 22*m*3) generated based on a predetermined matching condition may be implemented in the preprocessing circuit 4 in advance. In such a case, the filtering module 22*m*2 may execute this pre-implemented Moore machine when performing the filtering process. When the Moore machine is implemented in advance, the preprocessing circuit 4 does not need to execute step S101, and the preprocessing circuit 4 does not need to have the generating module 22*m*1.

Subsequently, in step S102, the filtering module 22*m*2 receives the sequence data via the input interface 25. Each time step S102 is executed, the preprocessing circuit 4 receives data corresponding to one unit of the sequence data (a one-byte character in the present description).

Subsequently, the filtering module 22*m*2 calls the Moore machine module 22*m*3, and performs a process using the Moore machine $M_{A,N}$ by passing the data (one-byte character) received in step S102 to the Moore machine module 22*m*3 (step S103). Details of the process in step S103 will be described below, but when step S103 is executed once, the Moore machine module 22*m*3 outputs the data stored in the memory block at the end of the buffer 22*a*. The filtering module 22*m*2 outputs data, which is output from the Moore machine module 22*m*3, to an external device via the output interface 26.

Subsequently, in step S104, the filtering module 22*m*2 determines whether the input of the sequence data has been completed or not (whether reception of the character string to the last character has been completed). A notification as to whether or not the input of the sequence data has been completed is transmitted, for example, from the input interface 25. However, the filtering module 22*m*2 may detect, by using another method, whether or not the input of the sequence data has been completed. If it is determined that the input of the sequence data is not completed (step S104: NO), the filtering process returns to step S102. If it is determined that the input of the sequence data has been completed (step S104: YES), the filtering module 22*m*2 performs a process of passing the block character ⊥ to the Moore machine module 22*m*3 N times (step S105). As mentioned earlier, N represents the buffer size. Therefore, when the buffer size (N) is 2, in step S105, step S103 is performed substantially twice. After step S105, the filtering process terminates.

As described above, when step S103 is executed, the data (one-byte character) that is passed to the Moore machine module 22*m*3 is input (enqueued) to the memory block (data area) of the buffer 22*a*, and the data stored in the memory blocks at the end of the buffer 22*a* is output (dequeued). Therefore, by performing step S105, all of the data stored in the N memory blocks of the buffer 22*a* is output. That is, step S105 is performed in order to output all data stored (remaining) in the memory blocks of the buffer 22*a* before execution of step S105.

Next, details of the process performed in step S103 will be described with reference to FIG. 24. The process illustrated in FIG. 24 is performed by the Moore machine module 22*m*3. The Moore machine module 22*m*3 performs state transition of the Moore machine (Moore machine module 22*m*3) and an update of contents in the buffer 22*a*, every time data is received from the filtering module 22*m*2. In the following description, the buffer size N is 2 (the number of memory blocks that the buffer 22*a* has is 2).

When the Moore machine module 22*m*3 receives data (one-byte character) from the filtering module 22*m*2, the Moore machine module 22*m*3 fetches data stored in the data area at the end of the memory blocks (memory block 22*a*-N) of the buffer 22*a*, and also determines whether or not the flag stored in the flag area at the end of the memory blocks (memory block 22*a*-N) of the buffer 22*a* is "mask" (step S201). If the flag of the memory block (22*a*-N) is not "mask", that is, if the flag is "pass" (step S201: NO), the Moore machine module 22*m*3 outputs (without changing) the data stored in the data area of the memory block (22*a*-N) to the filtering module 22*m*2 (step S202). The filtering module 22*m*2, which receives the data from the Moore machine module 22*m*3, outputs the data externally via the output interface 26. Conversely, if the flag of the memory blocks (22*a*-N) is "mask" (step S201: YES), the Moore machine module 22*m*3 changes the fetched data to a block character ⊥ (step S203), and outputs the changed data (block character ⊥) to the filtering module 22*m*2. The filtering module 22*m*2 outputs the block character I received from the Moore machine module 22*m*3 externally via the output interface 26.

In step S204, the Moore machine module 22*m*3 stores the data received from the filtering module 22*m*2 into the data area at the beginning of the buffer 22*a*. As described above, before the data is stored at the beginning of the buffer 22*a*, contents (data and a flag) in the respective memory blocks (22*a*-1, 22*a*-2, . . . , 22*a*-(N−1)) in the buffer 22*a* are moved to the left adjacent memory blocks (22*a*-2, 22*a*-3, . . . , 22*a*-N), respectively. That is, the buffer 22*a* operates as a FIFO queue.

Subsequently, in step S205, the Moore machine module 22*m*3 performs state transition of the Moore machine (Moore machine module 22*m*3) using the state transition table and the state management table stored in the non-buffer 22*b*. In the following description, a case in which the state transition table illustrated in FIG. 20 and the state management table illustrated in FIG. 21 are stored in the non-buffer 22*b* will be described.

In the state management table of FIG. 21, a current state of the Moore machine module 22*m*3 is recorded in the column "Current". Each element of the column "Current" contains either a value of 0 or 1. The current state corresponds to a row with a value of "Current" of "1". In FIG. 21, with respect to a row whose column "state" is $q_1'$, because a value of the column "Current" of the row is "1", the state management table in FIG. 21 indicates that the current state is $q_1'$.

When the current state of the Moore machine module 22m3 is specified as described above, the Moore machine module 22m3 determines a destination state (state after transition) based on the state transition table in FIG. 20 and the data received from the filtering module 22m2 (hereinafter referred to as the "input character"). When the current state is $q_1'$ as illustrated in the state management table in FIG. 21, and if the input character is "b", the state after transition is determined to be $q_3'$ by referring to the state transition table in FIG. 20. Therefore, the Moore machine module 22m3 changes the current state to $q_3'$ by updating the column "Current" in the state management table of FIG. 21. Specifically, the Moore machine module 22m3 changes a value of the column "Current" in the row whose "state" is $q_1'$ into "0", and a value of column "Current" in the row whose "state" is $q_3'$ into "1".

In step S206, the Moore machine module 22m3 changes the flag area of the memory block at the head of the buffer 22a (22a-1 in FIG. 16) to "mask".

In step S207, the Moore machine module 22m3 determines if there is a state having a counter value equal to N (buffer size) in one or more states (hereinafter referred to as a "state subset") of the automaton A (or the automaton A') included in the current state of the Moore machine module 22m3. A "state subset" is element(s) (one or more counter-equipped states of the automaton A') stored in the column "subset" of the state management table of FIG. 21. For example, a case in which a current state of the Moore machine module 22m3 (a state after execution of step S205) is $q_3'$ will be described. With respect to a row whose "state" is $q_3'$, as the content of the column "state subset" of this row in the state management table of FIG. 21 is $\{(s_0, 0), (s_2, 2)\}$, the state subset of the current state $q_3'$ of the Moore machine module 22m3 is $\{(s_0, 0), (s_2, 2)\}$. Among the states (counter-equipped states) in this state subset, a value of the counter of the state ($s_2$, 2) is 2 (which is equal to the buffer size N). In such a case (step S207: YES), the Moore machine module 22m3 changes the flag areas of all the memory blocks of the buffer 22a to "pass" (step S208). Conversely, if there is no state (counter-equipped state) with a counter value N in the state subset (step S207: NO), step S208 is not executed. For example, if the current state of the Moore machine module 22m3 is $q_1'$, because a state subset of the state $q_1'$ is $\{(s_0, 0), (s_1, 1)\}$, a state (counter-equipped state) with a counter value N is not present in the state subset. In this case, step S208 is not executed.

In step S209, it is determined whether the state subset of the current state of the Moore machine module 22m3 includes, as an element, an accepting state of an automaton from which the Moore machine module 22m3 is generated (which is the Automaton A in the present embodiment) (i.e., whether the accepting state (in the example of FIG. 20 and FIG. 21, $s_2$ (($s_2$, 1) or ($s_2$, 2)) is the accepting state) is included in the state subset). If the state subset of the current state of the Moore machine module 22m3 includes, as an element, the accepting state of the automaton from which the Moore machine module 22m3 is generated (step S209: YES), the process proceeds to step S210. If the accepting state is not included in the state subset (step S209: NO), the Moore machine module 22m3 terminates the process of the Moore machine module 22m3 without executing step S210.

In step S210, the Moore machine module 22m3 identifies all values of counters corresponding to the accepting states included in the state subset, and obtains the maximum value (which is hereinafter referred to as M) of these counter values. Then, the Moore machine module 22m3 changes flags, in the flag areas of M consecutive memory blocks in the buffer 22a from the beginning of the memory blocks, to "pass". For example, if the current state of the Moore machine module 22m3 (after step S205 is executed) is $q_4'$, the state subset of $q_4'$ includes states (accepting states) ($s_2$, 1) and ($s_2$, 2). Therefore, the maximum value M of the counter values corresponding to the accepting states is determined to be 2. In this case, among all of the memory blocks in the buffer 22a, the Moore machine module 22m3 changes flags in the flag area of the first two memory blocks to "pass".

After step S210, the Moore machine module 22m3 terminates the processing, and the Filtering module 22m2 resumes the process immediately after step S103.

In the flowchart of FIG. 24, steps S201 to S203 correspond to the operation of the output function of the Moore machine $M_{A,N}$. In steps S201 to S203, an operation described in Formula (6) illustrated in Section 3.2 is performed. In Formula (6), $a_1$ and $l_1$ respectively represent contents of the data area and the flag area of the memory block (22a-N) at the end of the buffer section 22a. According to Formula (6), if $l_1$ is "pass" (when the determinization at step S201 in FIG. 24 is NO), $a_1$ is output (step S202 in FIG. 24). Conversely, if $l_1$ is "mask" (when the determinization at step S201 in FIG. 24 is YES), a block character ⊥ is output (step S203 in FIG. 24).

Further, in the flowchart of FIG. 24, by executing steps S206 to S210, a process corresponding to Formula (5) described in Section 3.2 is performed.

As described above, by the sub program 22p3 of FIG. 24 (or the Moore machine module 22m3 of FIG. 22) being executed, an operation (state transition) of the Moore machine is realized and data in the buffer section 22a is updated. At the same time, with respect to data in the input sequence data that obviously does not conform to the matching condition, the data can be masked (replaced with a block character) and the masked data can be output.

In the above description, an example, in which the preprocessing circuit 4 receives a character string (sequence data) not having timestamps and the preprocessing circuit 4 filters the received character string, has been described. That is, the Moore machine (Moore machine module 22m3) operated by the preprocessing circuit 4 was the same as that described in Section 3.2 of the present specification. However, a Moore machine operated in the preprocessing circuit 4 is not limited to the above-described Moore machine. For example, a Moore machine according to the definition described in Section 4.3 of the present specification may also operate in the preprocessing circuit 4. Specifically, in a case in which pattern matching is performed for a character string (sequence data) having timestamps, the preprocessing circuit 4 performs pattern matching by operating the Moore machine according to the definition described in Section 4.3 in the present specification (hereinafter referred to as a "timed Moore machine").

A filtering process performed by the timed Moore machine is almost similar to the filtering process described above. The following explains mainly a difference between the filtering process using the timed Moore machine and the filtering process described above, and the description common to both is omitted.

As described in Section 4.3 of this specification, in the timed Moore machine, only flags are stored in the buffer portion of the state space. Therefore, in a case in which the preprocessing circuit 4 operates the timed Moore machine, the preprocessing circuit 4 defines a buffer 22*a* not having a data area (defines a buffer in which row 221*a* is removed from the buffer 22*a* illustrated in FIG. 16).

In a case in which the timed Moore machine operates, as data (input sequence data) is not stored into the buffer 22*a*, the process is slightly different from that of the Moore machine module 22*m*3 described above. A process flow when the preprocessing circuit 4 operates the timed Moore machine will be described with reference to flowcharts illustrated in FIG. 25 and FIG. 26.

First, a flow of a process performed by the timed Moore machine (may be referred to simply as a "Moore machine" below) will be described with reference to FIG. 26. Because most parts of the process in FIG. 26 are common with FIG. 24, points that differ from FIG. 24 among the steps in FIG. 26 will be mainly described below.

Figure 26:
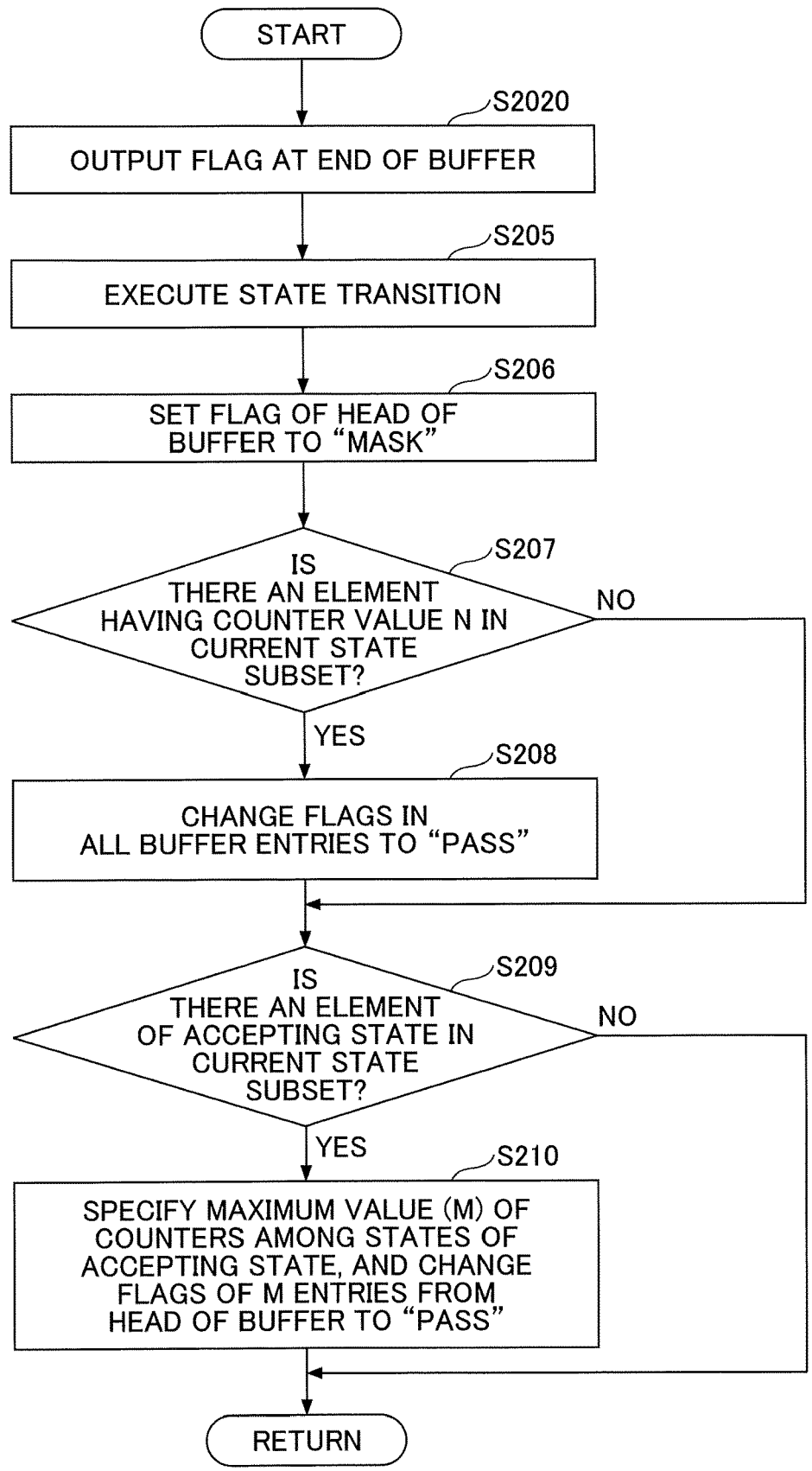
FIG. 26 is a flowchart illustrating a process flow at a time of state transition of the timed Moore machine.

As illustrated in FIG. 26, the timed Moore machine executes step S2020 instead of steps S201 to S203 in FIG. 24. That is, when the Moore machine receives data (one-byte character) from the filtering module 22*m*2, the Moore machine does not perform the process illustrated in FIG. 24 (for example, the process of determining content of the flag in step S201), but outputs a flag stored in the flag area in the memory block (22*a*-N) at the end of the buffer 22*a* (step S2020). Because a process performed in step S205 and thereafter (in FIG. 26) are the same as that in FIG. 24, description of the process will be omitted.

Because the timed Moore machine does not have a data area in the buffer 22*a*, unlike the process illustrated in FIG. 24, the timed Moore machine does not perform a data conversion process or a data output process in the data area. Data conversion and output are performed by the filtering module 22*m*2 of the preprocessing circuit 4.

Figure 25:
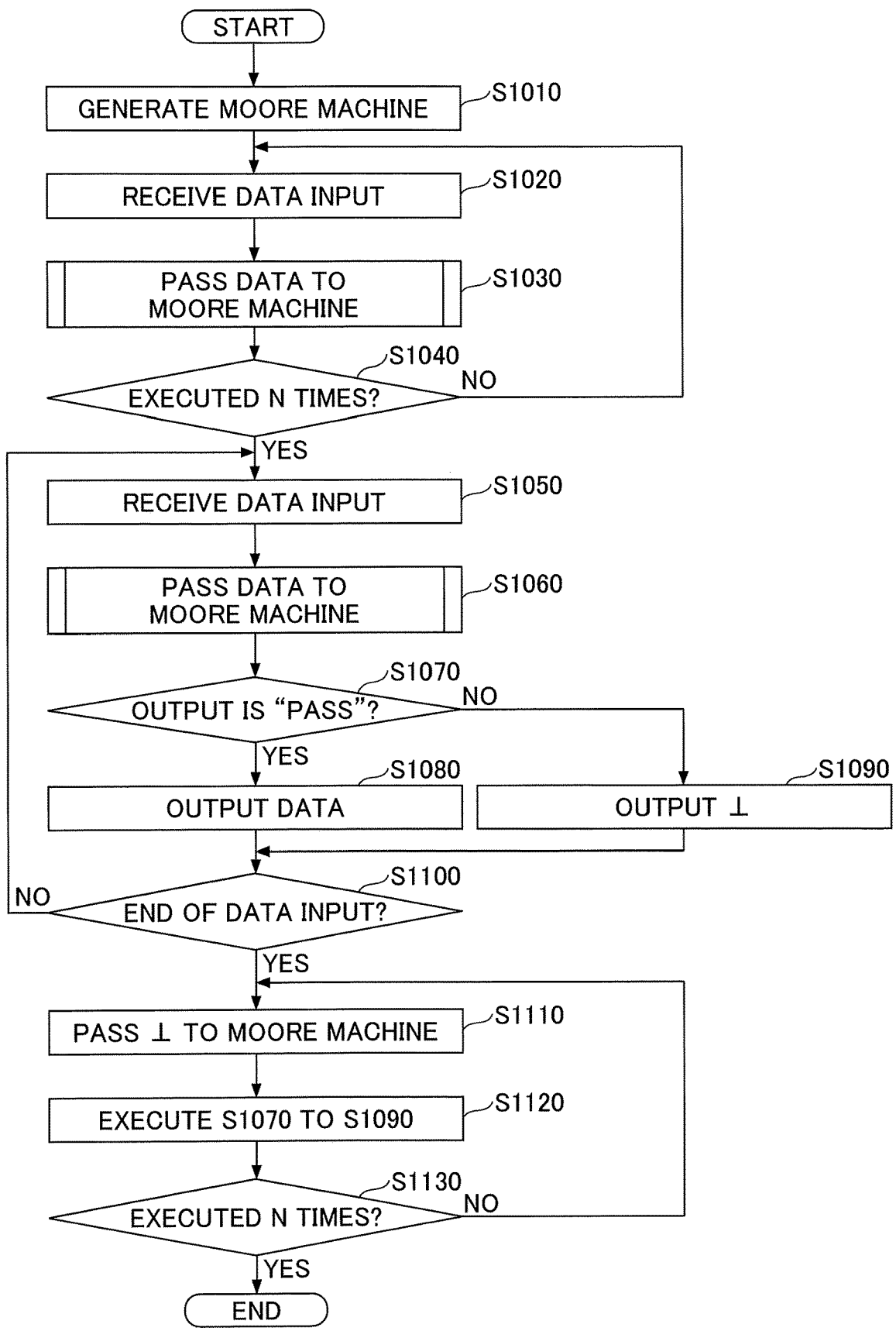
FIG. 25 is a flowchart illustrating a process flow of the preprocessing circuit when a timed Moore machine is used.

A process performed by the filtering module 22*m*2 when filtering is performed by the timed Moore machine is described with reference to FIG. 25. First, in step S1010, the filtering module 22*m*2 causes the generating module 22*m*1 to generate a Moore machine. This process is similar to step S101 in FIG. 23, but differs from step S101 in FIG. 23 in that the generated Moore machine is a timed Moore machine. In step S1010, the filtering module 22*m*2 allocates a storage area in the RAM 22 for temporarily retaining data received through the input interface 25. The storage area allocated by the filtering module 22*m*2 is a FIFO buffer, and this FIFO buffer has (N+1) memory blocks, each of which is large enough to store data (data received via the input interface 25) corresponding to one character.

Subsequently, in step S1020, the filtering module 22*m*2 receives the sequence data via the input interface 25. Step S1020 is similar to step S102 in FIG. 23. However, in step S1020, the filtering module 22*m*2 performs the process of storing the received sequence data into the FIFO buffer allocated in step S1010.

Next, the filtering module 22*m*2 passes the data (one-byte character) received in step S1020 to the Moore machine (timed Moore machine). In response to receiving the data, the timed Moore machine executes the process illustrated in FIG. 26 (step S1030). As described above, when the timed Moore machine performs the process illustrated in FIG. 26, the timed Moore machine outputs a flag (pass or mask) stored in the flag area of the memory block (22*a*-N) at the end of the buffer 22*a*.

Next, the filtering module 22*m*2 determines whether or not the processes of step S1020 and step S1030 were performed N times. As mentioned earlier, N is the buffer size. When the processes of step S1020 and step S1030 have not been performed N times (step S1040: NO), the process returns to step S1020. When the processes of step S1020 and step S1030 have been performed N times (step S1040: YES), the filtering module 22*m*2 performs the step S1050 and thereafter.

In step S1050, the filtering module 22*m*2 receives the sequence data via the input interface 25. This is similar to step S1020. In step S1050, the filtering module 22*m*2 passes the data (one-byte character) received in step S1050 to the Moore machine. That is, step S1050 is the same process as step S1030.

As described above, by executing step S1060, the Moore machine outputs a flag (pass or mask). In step S1070, the filtering module 22*m*2 determines whether or not the output (flag) of the Moore machine is "pass". If the output of the Moore machine is "pass" (step S1070: YES), the filtering module 22*m*2 outputs data (one character) stored in the end of the FIFO buffer to an external device via the output interface 26 (step S1080). Because data stored at the end of the FIFO buffer having (N+1) elements (memory blocks) is output in step S1080, if, for example, the process performed in step S1050 is the (N+1)-th data reception process (i.e. when the process of step S1050 is performed just after the process of step S1020 has been performed N times), in step S1080, data received at the first data reception process is output. Meanwhile, in step S1070, if the output of the Moore machine is "mask" (step S1070: NO), the filtering module 22*m*2 outputs the block character ⊥ to an external device via the output interface 26 (step S1090).

Subsequently, in step S1100, the filtering module 22*m*2 determines whether or not input of the sequence data has been completed (whether or not reception of the character string to the end character has been completed). The process of step S1100 is the same as that of step S104 of FIG. 23. If it is determined that the input of the sequence data has not been completed (step S1100: NO), the process returns to step S1050. If it is determined that the input of the sequence data has been completed (step S1100: YES), step S1110 is then performed.

In step S1110, the filtering module 22*m*2 passes the block character ⊥ to the Moore machine. By passing the block character, a flag is output from the buffer 22*a* in the Moore machine. Subsequently, in step S1120, steps S1070 to S1090 are performed based on a state (pass or mask) of the flag output from the Moore machine in step S1110.

Subsequently, the filtering module 22*m*2 determines whether or not step S1110 and step S1120 have been performed N times (step S1130). If steps S1110 and S1120 have been performed N times (step S1130: YES), the process terminates. If steps S1110 and S1120 have not been performed N times (step S1130: NO), the filtering module 22*m*2 executes step S1110 again.

The processes of steps S1110 to S1130 are performed for the same purpose as that of step S105 in FIG. 23. That is, at a time immediately before the execution of step S1110, N number of the flags (not yet output) are left in the memory block of the buffer 22*a*. Therefore, the filtering module 22*m*2 performs steps S1110 to S1130 N times to cause the flags remaining in the memory block of buffer 22*a* to be output, and the filtering module 22m2 determines data to be output to the external device based on the output flags.

As described above, the preprocessing circuit 4 according to the second embodiment can output data processed so as to remove data that does not obviously match the matching condition from the input sequence data. However, in the preprocessing circuit 4 according to the second embodiment, in a case in which a sequence of data (for example, a character string) in the input sequence data does not actually match the matching condition, but if it is uncertain whether or not the sequence of data matches the matching condition, the preprocessing circuit 4 outputs the sequence of data without removing the sequence of data (without applying any process to the sequence of data).

This case may occur, for example, when the determinization of step S207 in FIG. 24 is YES. An example will be described with reference to FIGS. 17 to 21 and FIG. 24. Suppose a Moore machine of a buffer size 2 that is generated based on the automaton A illustrated in FIG. 17 (a Moore machine having five states $q_0'$ to $q_4'$ illustrated in FIG. 21 and performing state transition according to the rule illustrated in FIG. 20 (or FIG. 19)). When a current state of the Moore machine is $q_2'$, the state subset of the state $q_2'$ is $\{(s_0, 0), (s_1, 1), (s_1, 2)\}$. In this case, as can be seen from FIG. 24 (particularly step S207 and step S208), data stored in the buffer 22a at this point in time is output as is (without being converted to a block character). This is because the flag areas of all memory blocks in the buffer 22a are updated to "pass" in step S208. However, because the state subset at this time point in time does not include the accepting state ($s_2$) as an element, the sequence of data stored in the buffer 22a meets a portion of the matching condition described as the automaton A illustrated in FIG. 17, but it is not certain that the sequence of data meets an entirety of the matching condition. In such a case, because the preprocessing circuit 4 according to the second embodiment outputs data stored in the buffer 22a as is (without converting data into a block character), data that may meet the matching condition is not removed.

The above description has described an example in which the preprocessing circuit 4 converts data that does not obviously match the matching condition into a block character ⊥ in order to remove the data that does not obviously match the matching condition. However, the method of removing data that does not obviously match the matching condition is not limited thereto. For example, when the preprocessing circuit 4 converts data in the input sequence data that does not obviously match the matching condition into a block character ⊥, and as a result, if a character string in which the block character ⊥ consecutively appears multiple times is included in the sequence data after conversion, the preprocessing circuit 4 may convert the character string into a pair of "a block character ⊥ and the number of occurrences of the block character", and output the converted string to an external device. Specifically, after the preprocessing circuit 4 converts a character string "abbbbbb" into "ab⊥⊥⊥⊥⊥" by performing the above-described process (FIG. 23 and FIG. 24), the preprocessing circuit 4 may convert the character string "ab⊥⊥⊥⊥⊥" into "ab⊥5", and may output "ab⊥5" to an external device (i.e., the "⊥5" represents that the blocking character ⊥ appears five times consecutively). By performing such a conversion, data is substantially compressed, thereby reducing an amount of data output to an external device.

Figure 27:
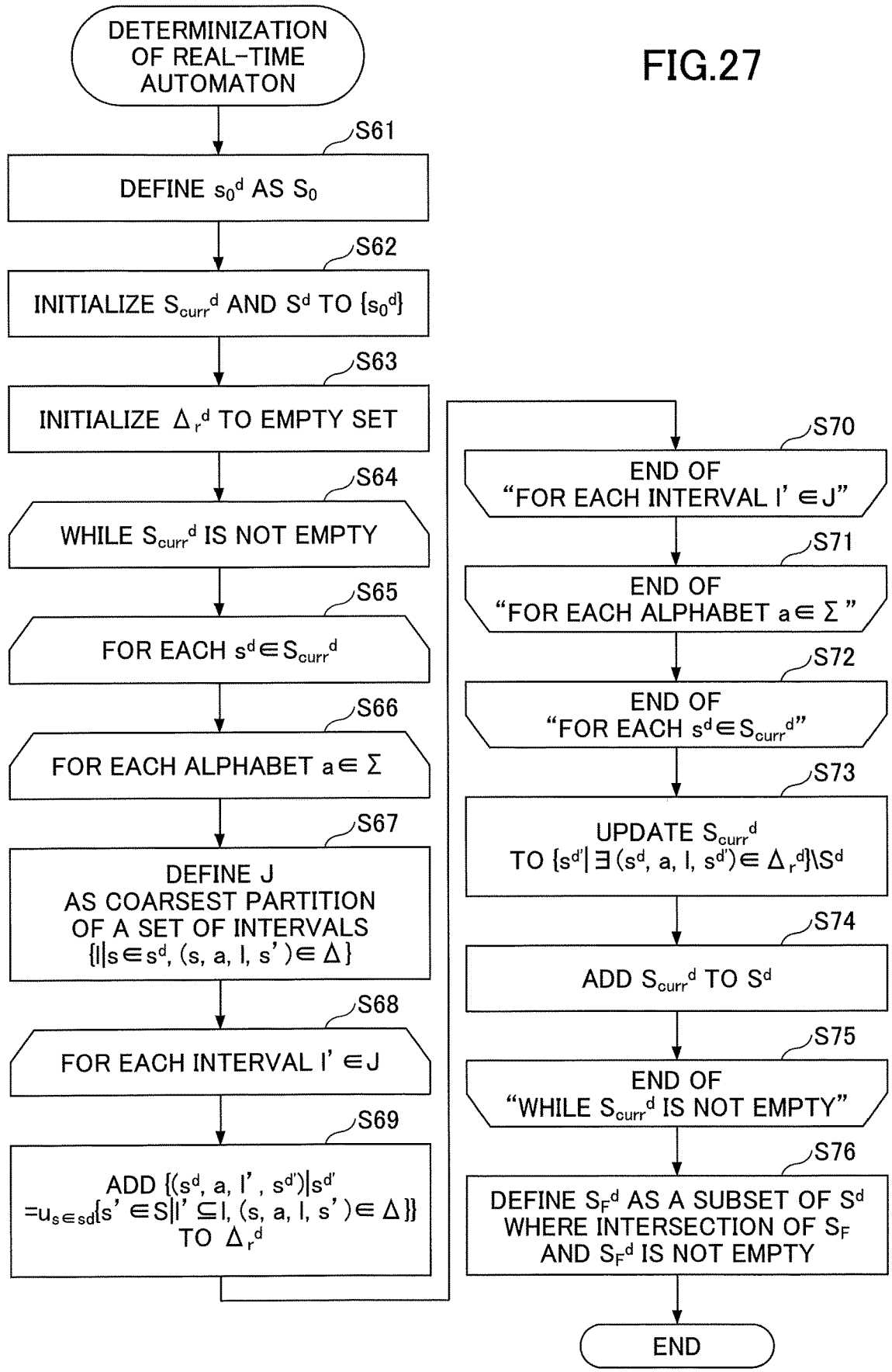
FIG. 27 is a flowchart illustrating a determinization process of a real-time automaton.

FIG. 27 is a flowchart illustrating a determinization process of a real-time automaton performed in the preprocessing circuit 4 according to the second embodiment.

In steps S61 to S63 of FIG. 27, definition from the state $s_0^d$ in the automaton to the state space $S_0$, initialization of the current state space $S_{curr}^d$ and the state space $S^d$, and initialization of an output function $\Lambda_r^d$ are performed. In steps S64 to S75, while the current state space $S_{curr}^d$ is not empty, steps S67 to S74 are performed. Further, in steps S65 to S72, for each state $s^d \in S_{curr}^d$, steps S67 to S69 are executed. Furthermore, in steps S66 to S71, for each character $a \in \Sigma$, steps S67 to S69 are executed. Further, in steps S68 to S70, for each interval $I' \in J$, step S69 is performed (where J is the coarsest partition of a set of intervals as illustrated in step S67). In step S76, the determinization process is terminated by defining the state space $S_F^d$ of a filtering result as a subset of the state space $S^d$ where intersection of $S_F$ and $S_F^d$ is not empty.

As described above, by performing the determinization process of FIG. 27, a non-deterministic real-time automaton can be converted into a deterministic automaton.

Figure 28:
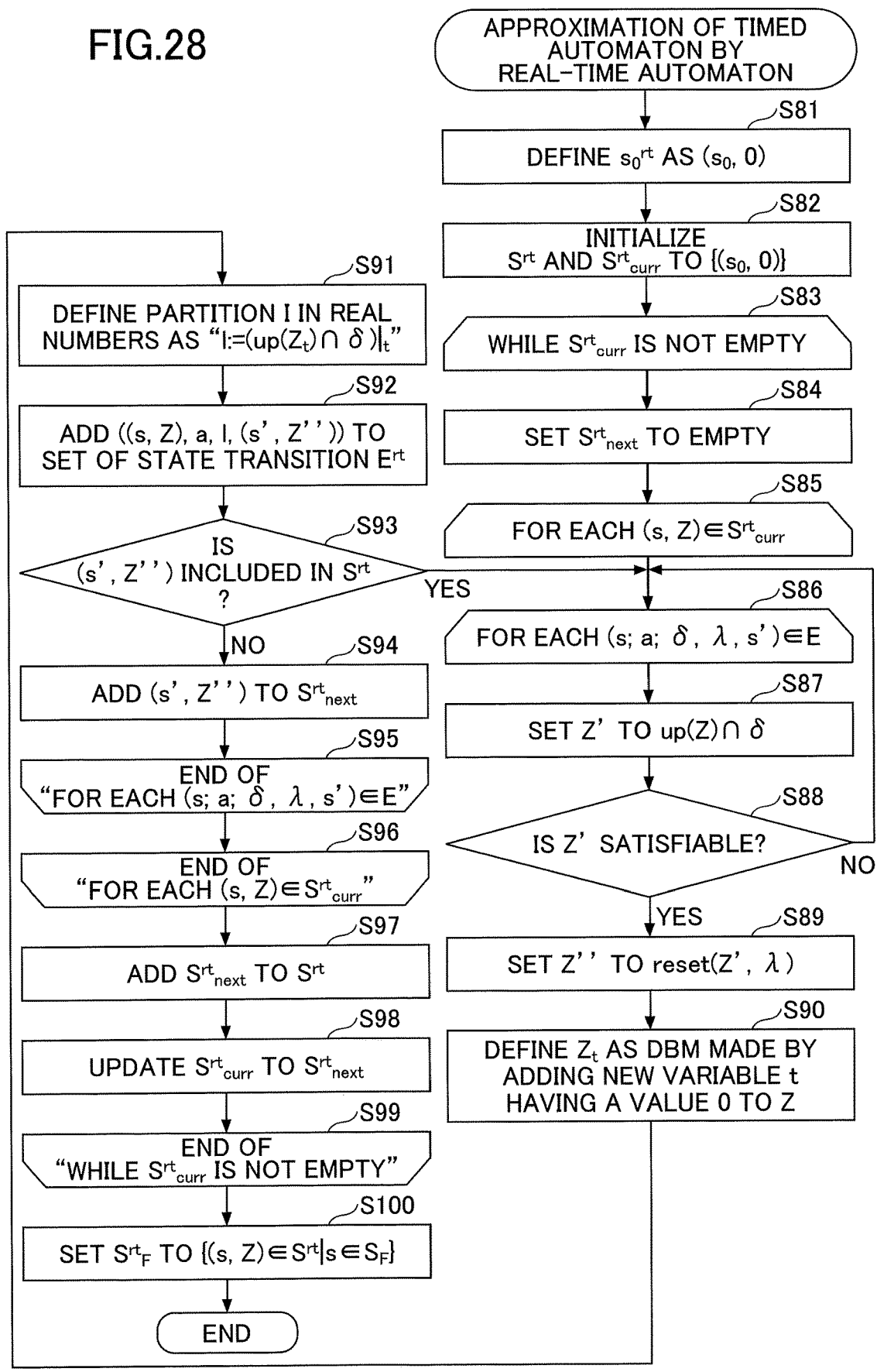
FIG. 28 is a flowchart illustrating an approximation process for approximating a timed automaton to a real-time automaton.

FIG. 28 is a flowchart illustrating approximation processing for approximating a timed automaton by a real-time automaton performed by the preprocessing circuit 4 according to the second embodiment. Note that a superscript rt attached to parameters indicates "real time".

In steps S81 to S82 of FIG. 28, definition of a state $s_0^{rt}$ in the automaton, and initialization process of the state space $S^{rt}$ and $S_{rt}^{curr}$ in the automaton are performed. In steps S83 to S99, while the current state space $S_{rt}^{curr}$ is not empty, steps S84 to S98 are performed. Also, in steps S85 to S96, for each $(s,Z) \in S_{rt}^{curr}$, steps S87 to S94 are executed. In addition, in steps S86 to S95, for each $(s; a; \delta, \lambda, s') \in \Sigma$, steps S87 to S94 are performed. The up(Z) in step S87 represents passage of time. The reset(Z', $\lambda$) in step S89 represents initialization of a clock variable included in $\lambda$. Further, $S_{rt}^{next}$ in step S94 or the like represents a state space to be added next to the real-time state space $S^{rt}$. In addition, a DBM zone in step S90 is a zone defined by the known Difference Bound Matrix. In step S100, by setting a state space $S_F^{rt}$ of a filtering result to $\{(s,Z) \in S^{rt} | s \in S_F\}$, the approximation process is terminated.

As described above, by performing the approximation process of FIG. 28, a timed automaton can be approximated by a real-time automaton.

Third Embodiment

Figure 29:
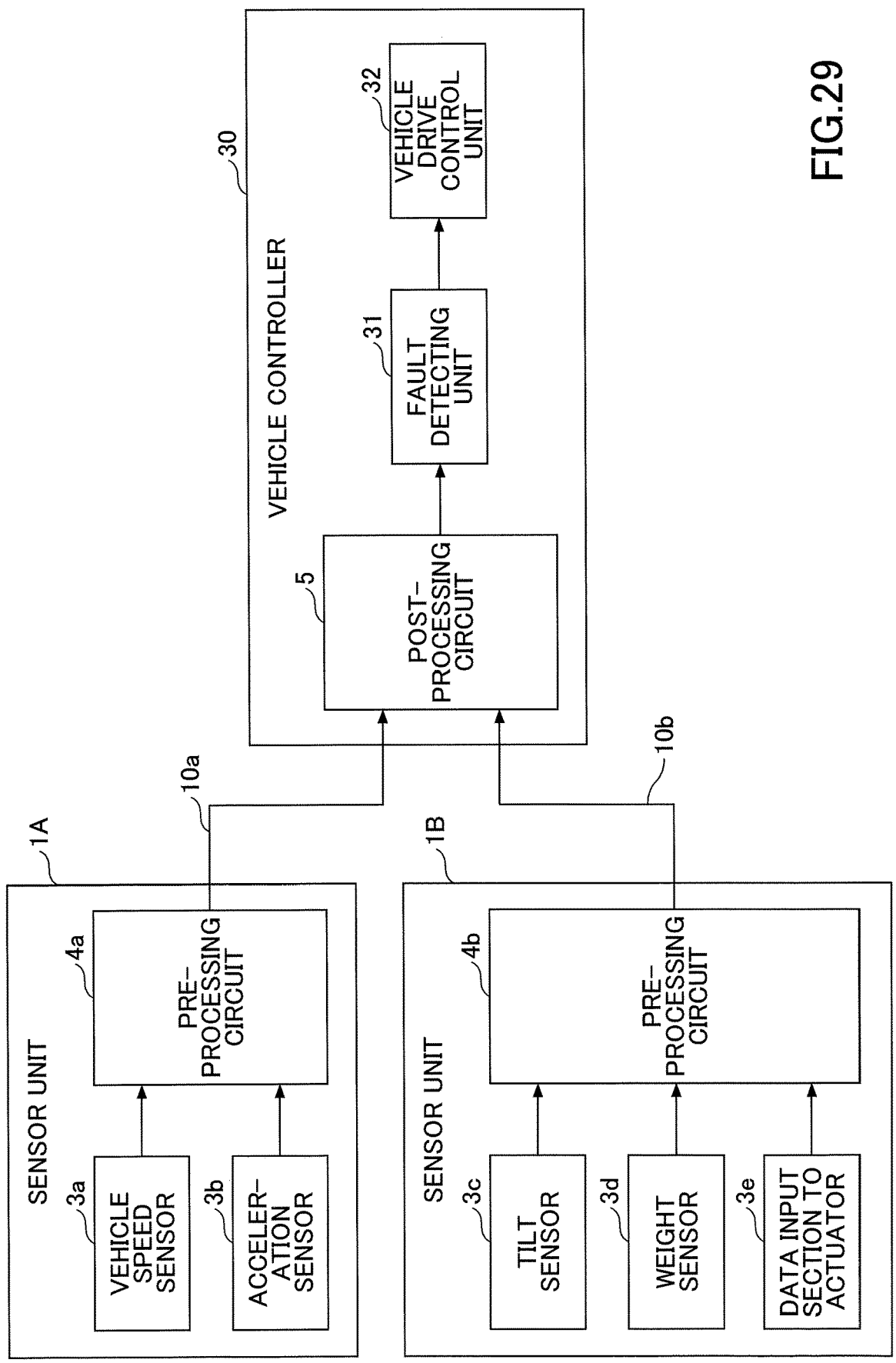
FIG. 29 is a block diagram illustrating an example of a configuration of a vehicle control system having an automatic stop mechanism at an abnormal time according to a third embodiment.

Automatic Stop Mechanism in Case if Emergency:

FIG. 29 is a block diagram illustrating an example of a configuration of a vehicle (automobile) control system according to a third embodiment, which includes an automatic stop mechanism in case of emergency.

In FIG. 29, the vehicle control system is configured such that sensor units 1A and 1B are connected to a vehicle controller 30 via communication lines 10a and 10b, respectively.

In the sensor unit 1A, speed of a vehicle detected by a vehicle speed sensor 3a and acceleration detected by an acceleration sensor 3b are input to a preprocessing circuit 4a. The preprocessing circuit 4a has the same configuration as the preprocessing circuit 4 according to the second embodiment. The preprocessing circuit 4a processes (timed) sequence data of the vehicle speed and acceleration so as to remove data that is easily understood not to match a matching condition, and transmits the timed sequence data after being processed to a post-processing circuit 5 through the communication line 10a.

In the sensor unit 1B, a gradient detected by a tilt sensor 3c, a mass detected by a weight sensor 3d, and input data (emergency stop instruction data) that is input to a data input section to an actuator 3e are input to a preprocessing circuit 4b. The preprocessing circuit 4b has the same configuration as the preprocessing circuit 4 according to the second embodiment. The preprocessing circuit 4b processes timed sequence data of the gradient, the mass, and the input data to the actuator, which is input to the preprocessing circuit 4b, so as to remove data that is easily found not to match a matching condition, and transmits the timed sequence data after being processed to the post-processing circuit 5 through the communication line 10b.

In the vehicle controller 30, the post-processing circuit 5 receives the sequence data processed by the preprocessing circuit 4a and the sequence data processed by the preprocessing circuit 4b. Then, with respect to these sequence data, the post-processing circuit 5 applies a process for extracting sequence data pieces that match the above-described matching conditions (the matching conditions used in the preprocessing circuit 4a and the preprocessing circuit 4b), and outputs the extracted sequence data pieces to the fault detecting unit 31. The fault detecting unit 31 determines whether or not the input sequence data pieces match a predetermined fault condition based on the input sequence data pieces. If the input sequence data pieces match a predetermined fault condition, the fault detecting unit 31 outputs information indicating that the input sequence data pieces match a predetermined fault condition to a vehicle drive control unit 32, and performs a predetermined control process such as an emergency stop.

As described above, the preprocessing circuit 4b does not process (remove) data that meets a portion of a matching condition but is not necessarily sure whether the data meets an entirety of the matching condition. Therefore, in the data extraction process performed by the post-processing circuit 5, a process of extracting all data that meets the above-described matching condition is performed against the processed sequence data received from the preprocessing circuit 4a or the preprocessing circuit 4b. Specifically, for example, when the preprocessing circuit 4a or the preprocessing circuit 4b transmits a character string (sequence data) in which some characters (characters that do not obviously match a matching condition) are each replaced with the block character ⊥ to the post-processing circuit 5, the post-processing circuit 5 not only removes the block characters from the character string, but also determines whether or not a character string that meets the matching condition is included in the character string that is not replaced with the block character ⊥, to extract a character string that meets the matching condition.

A workload for extracting a character string (sequence data) that matches a matching condition performed by the post-processing circuit 5, in a case in which the preprocessing circuit 4a or the preprocessing circuit 4b is provided in the vehicle control system as illustrated in FIG. 29, is lower than that in a case in which the preprocessing circuit 4a or the preprocessing circuit 4b is not provided. This is because data (character string) that does not obviously match the matching conditions is removed (converted to a block character) by the preprocessing circuit 4a or the preprocessing circuit 4b, and an amount of data from which the post-processing circuit 5 needs to search for data that meets the matching condition is greatly reduced.

As described above, according to the third embodiment, a failure is detected by monitoring log data (vehicle speed, acceleration, gradient, mass, etc.) of a driving vehicle by using the vehicle control system, and if an emergency stop is required, an emergency stop is made by providing an appropriate input to the vehicle drive control unit 32. In particular, by installing the preprocessing circuits 4a and 4b to the sensor units 1A and 1B, respectively, an amount of data transmission in the communication lines 10a and 10b can be reduced and more data can be handled.

Fourth Embodiment

Figure 30:
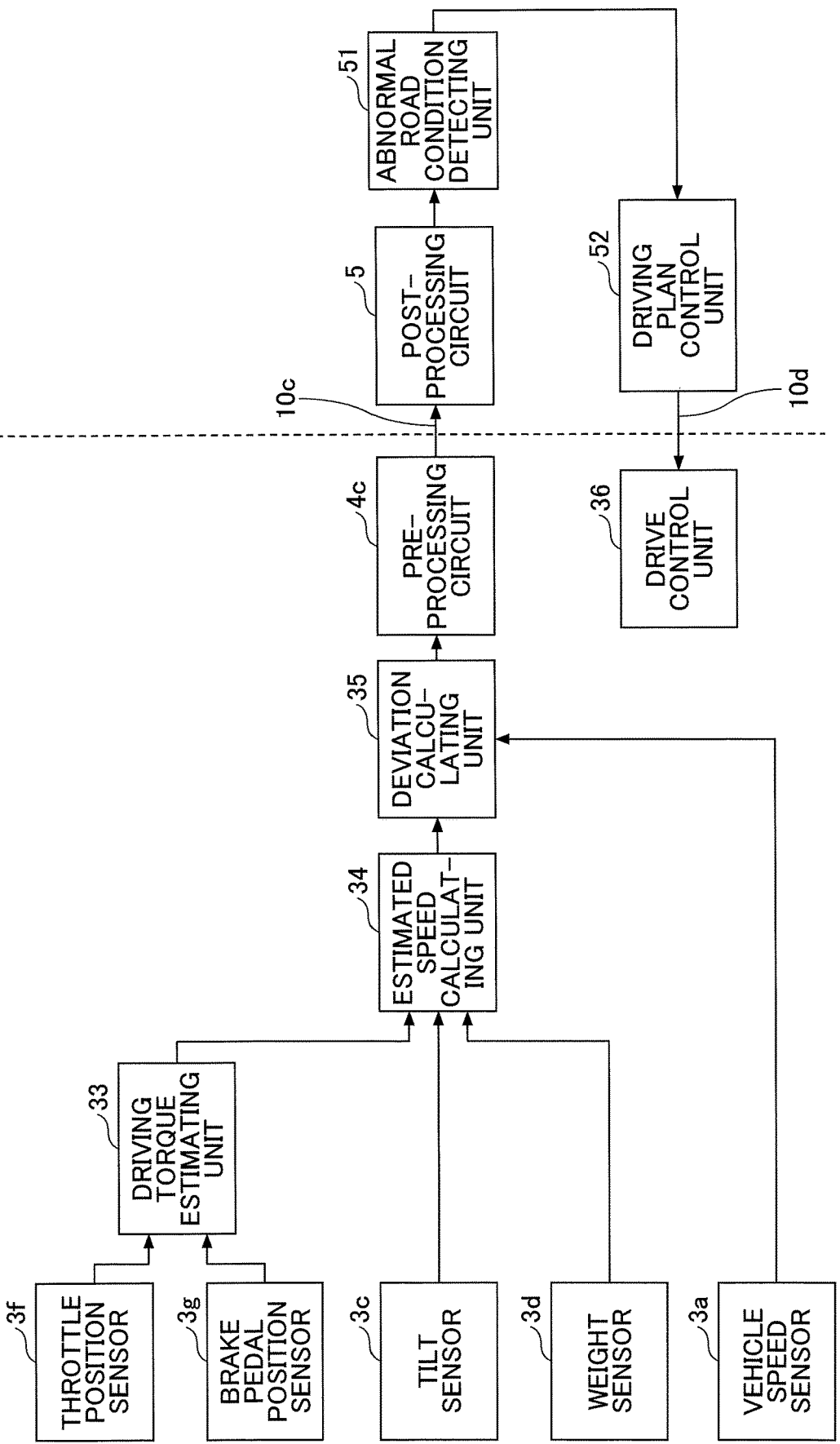
FIG. 30 is a block diagram illustrating an example of a configuration of an automobile control system having a driving route optimization mechanism of a semi-connected car according to a fourth embodiment.

Optimization of a Driving Route of Semi-Connected Cars:

FIG. 30 is a block diagram illustrating an example of a configuration of a vehicle control system including a driving route optimization mechanism of a semi-connected car according to a fourth embodiment. The vehicle control system is configured such that a vehicle 40 is connected to a server 50 via a network including communication lines 10c and 10d. Here, the semi-connected car is a vehicle for which a control unit of the vehicle 40 controls driving of the vehicle 40 by connecting the control unit of the vehicle 40 to the server 50 as needed, rather than always connecting the control unit of the vehicle 40 to the server 50.

In the vehicle 40, throttle data detected by a throttle position sensor 3f and brake pedal data detected by a brake pedal position sensor 3g are input to the driving torque estimating unit 33. The driving torque estimating unit 33 estimates drive torque based on the input throttle data and the brake pedal data in a known manner, and outputs the estimated drive torque to the estimated speed calculating unit 34. A gradient detected by a tilt sensor 3c and a mass detected by a weight sensor 3d are input to the estimated speed calculating unit 34. The estimated speed calculating unit 34 calculates estimated vehicle speed by a known method based on the three inputs, and outputs the estimated vehicle speed to a deviation calculating unit 35. The deviation calculating unit 35 compares the calculated estimated vehicle speed with vehicle speed detected by a vehicle speed sensor 3a to calculate a deviation amount, which can estimate a road state with the deviation of the vehicle speed, and outputs the deviation amount to the preprocessing circuit 4c. The preprocessing circuit 4c has the same configuration as the preprocessing circuit 4 according to the second embodiment. The preprocessing circuit 4c processes timed sequence data of the deviation amount so as to remove data that is easily understood not to match a matching condition, and transmits the timed sequence data after being processed to the post-processing circuit 5 of the server 50 through the communication line 10c.

In the server 50, the post-processing circuit 5 receives the sequence data processed by the preprocessing circuit 4c, extracts sequence data pieces matching the above-described matching condition, and outputs the extracted sequence data pieces to the abnormal road condition detecting unit 51. The abnormal road condition detecting unit 51 determines whether or not the received sequence data pieces match a condition of a predetermined "abnormal road condition" (for example, in a case in which the deviation amount is equal to or larger than a predetermined threshold value, it is determined that the abnormal road condition has occurred) based on the received sequence data pieces. If the sequence data pieces match the condition, the abnormal road condition detecting unit 51 outputs information indicating that the sequence data pieces match the predetermined abnormal road condition to a driving plan control unit 52. The driving plan control unit 52 detects an undesirable road condition based on the received information, optimizes a driving plan depending on the road condition, and outputs data of the optimized driving plan to a drive control unit 36 of the vehicle 40 via the communication line 10*d*, to optimize driving of the vehicle 40.

As described above, according to the fourth embodiment, a driving log (throttle data, brake pedal data, gradient, mass, vehicle speed, and predetermined calculation data based thereon) of the semi-connected car during driving is transmitted as appropriate, through the communication line 10*c* to the server 50. By monitoring the data by the abnormal road condition detecting unit 51, an undesirable road condition is detected and a driving plan is optimized according to the road condition. Here, by providing the preprocessing circuit 4*c* in the vehicle 40 which is a semi-connected car, and by providing the post-processing circuit 5 in the server 50, an amount of data transfer is reduced, and for example, the semi-connected car can operate appropriately even in an environment in which wireless communication is not in a favorable condition.

Fifth Embodiment

Figure 31:
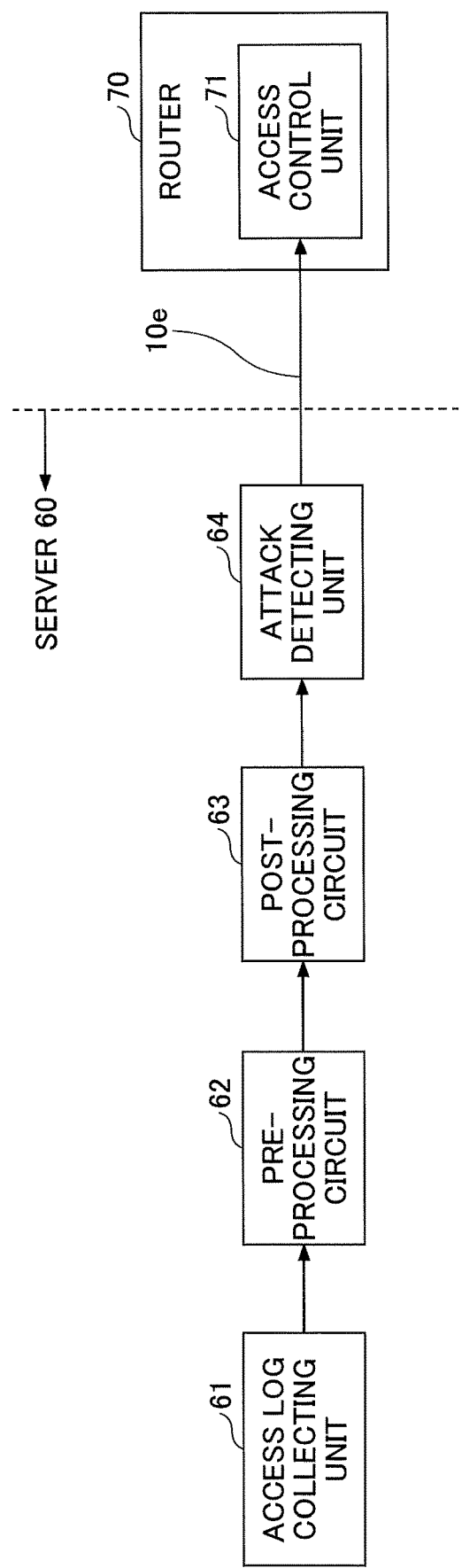
FIG. 31 is a block diagram illustrating an example of a configuration of a communication system having a mechanism of monitoring an attack on a server and having an access blocking mechanism according to a fifth embodiment.

Monitoring of Attack on Server and Access Blocking:

FIG. 31 is a block diagram illustrating an example of a configuration of a communication system including a mechanism of monitoring an attack on a server and blocking an access according to a fifth embodiment. The communication system is configured such that a server 60 and a router 70 are connected via a network including a communication line 10*e*.

In the server 60, an access log collecting unit 61 collects a log (access source information, time, or the like) regarding an access from outside, and outputs sequence data of the log to a preprocessing circuit 62. The preprocessing circuit 62 has the same configuration as the preprocessing circuit 4 according to the second embodiment. The preprocessing circuit 62 processes the input timed sequence data so as to remove data that is easily understood not to match a matching condition, and transmits the timed sequence data after being processed to a post-processing circuit 63. The post-processing circuit 63 receives the input timed sequence data, extracts sequence data pieces that match the above-described matching condition, and outputs the extracted sequence data pieces to an attack detecting unit 64. The attack detecting unit 64 refers to predetermined threshold data based on the input sequence data to detect an access aiming at attacking the server 60, and transmits information (access information) about the detected access to the access control unit 71 of the router 70 through the communication line 10*e*. In response, the access control unit 71 controls access to the server 60 to be blocked based on the detected access information input to the access control unit 71.

As described above, according to the fifth embodiment, in the server 60 such as WWW, a log of communication from outside is monitored using a real-time condition extractor including the preprocessing circuit 62 and the post-processing circuit 63 to detect an attack from the outside, and an access from the attacker is blocked by providing the router with an appropriate input. By using a real-time data filtering unit of the real-time condition extractor, a CPU time required for data processing can be reduced, and monitoring can be performed without impairing an original operation of the server 60.

In the foregoing embodiments and examples, the preprocessing circuit 4 generates a Moore machine based on an automaton describing a predetermined matching condition for input event sequence data, filters the sequence data by using the generated Moore machine, so as to substantially remove data that does not match the matching condition from the sequence data, and outputs sequence data of a filtered result. However, the present invention is not limited thereto. A model generated for filtering may not be limited to a Moore machine, but may include various types of finite state machines, such as a Mealy machine.

Features of present embodiments and differences of the embodiments from Patent Documents 2 and 3:

(1) Patent Document 2

In Patent Document 2, a program description (1) defining multiple devices that is described by using a program language capable of describing parallel processing is input, the input program description is converted into an intermediate representation (S2), a parameter satisfying real-time constraint is generated for the intermediate representation (S3), and a circuit description by a hardware description language is synthesized based on the generated parameter (S4). The intermediate representation includes a concurrent control flow flag, and a time automaton having a concurrent parameter. In the above-described parameter generation, parametric model checking is performed. The program description defines the devices using a run method, and defines the clock synchronization of the devices using barrier synchronization. This allows for the design of a bus system that meets the real-time constraint.

In Patent Document 2, in particular, when designing a circuit using a language that can describe parallel processing such as JAVA (Registered Trademark), in order to design a bus system efficiently so as to satisfy a real-time constraint, modeling is performed as a pre-process of a verification process for design automation. In one step, conversion from a concurrent control flow graph (C-CFG) to a concurrent parametric timed automaton (C-TNFA), and to a parametric timed automaton (TNFA) is performed. During the conversion from C-CFG to C-TNFA conversion, a process of deleting a state transition that does not meet an assumption in a validation process of a post-processing is performed, and during the conversion from C-TNFA to TNFA, an upper limit of transition time is set for parallel processing that does not require a bus access right, and a state that does not meet the upper limit is deleted.

Patent Document 2 discloses a masking process in a preprocessing considering a post-processing process, but does not disclose a specific method of the embodiments according to the present invention such as determinization considering time constraint, or buffer optimization.

(2) Patent Document 3

Patent Document 3 discloses a method of converting a source code of software to a test code using a computer. The method includes a step of inputting the source code of the software; a step of inputting multiple different conversion rules; a step of inputting a non-functional rule that is a constraint on process performance; and a step of converting the source code to a non-functional test code described in an input language of a verification tool, by the multiple different conversion rules and the non-functional rule.

In particular, Patent Document 3 discloses a technique of converting behavior of the software into an input language (test code) as a preprocessing before software inspection. The technique includes converting each component (function) of software into a timed automaton for which processing time by the execution environment is assigned. The technique also includes removing a portion of repeated execution when there is a specific defect in the portion of the repeated execution, to detect other defects while reducing the number of conditions, and to avoid state explosion in which a calculation time becomes too large.

However, Patent Document 3 discloses a masking process in the preprocessing, but does not disclose a specific method of the embodiments according to the present invention such as determinization considering time constraint, or buffer optimization.

What is claimed is:

1. An information processing apparatus comprising:
an information processing circuit configured
to generate a finite state machine based on a predetermined matching condition with respect to sequence data of an event that is input to the information processing apparatus;
to process the sequence data so as to remove data that does not match the matching condition from the sequence data; and
to output the processed sequence data,
wherein
the finite state machine includes a FIFO buffer having N number of memory blocks, and information about a rule of state transition of the finite state machine; and
each of the memory blocks includes an area for storing a flag indicating either a first state or a second state.

2. The information processing apparatus according to claim 1, wherein
the sequence data is composed of a plurality of data elements each having a timestamp; and
the matching condition is described by a timed automaton.

3. The information processing apparatus according to claim 1, wherein the finite state machine is configured, each time a data element of the sequence data is received,
to retrieve a content in a memory block at an end of the buffer;
to perform state transition of the finite state machine based on the received data element and the rule;
to store the flag indicating the second state into a memory block at a beginning of the buffer; and
to update the flags stored in the memory blocks, in accordance with the state of the finite state machine.

4. The information processing apparatus according to claim 3, wherein
the finite state machine has a plurality of possible states, each of the possible states being a set of at least one pair of (s, n), where s is a state of possible states of the automaton, and n is a counter indicating a number of transitions required for the automaton in an initial state to transit to the state s of the automaton; and
after the finite state machine transits to a given state of the possible states, the given state being $\{(s_1, n_1), \ldots, (s_k, n_k)\}$, where $s_k$ is a state of possible states of the automaton, and "$n_k$" is a counter indicating a number of transitions required for the automaton in an initial state to transit to the state $s_k$ of the automaton (k is an integer not less than 1), the information processing circuit is configured to
(1) in a case in which a counter having a value N is present in the counters to change the flags in all of the memory blocks in the buffer into the first state, and
(2) in a case in which an accepting state is included in the states $s_1, \ldots, s_k$, to specify a maximum value M of the counter corresponding to the accepting state, and to change the flags of M number of the memory blocks from the beginning of the buffer.

5. The information processing apparatus according to claim 4, wherein
the sequence data is a character string;
each of the data elements in the sequence data is a character having a timestamp, the character being an element in a predetermined character set; and
each time a data element of the sequence data is received,
the finite state machine is configured to output the flag stored in the memory block at the end of the buffer; and
the information processing circuit is configured,
in a case in which the flag output by the finite state machine is indicating the first state, to output a data element corresponding to the flag, and
in a case in which the flag output by the finite state machine is indicating the second state, to convert a data element corresponding to the flag into a character not included in the predetermined character set, in order to remove data that does not match the matching condition from the sequence data, and to output the converted data element.

6. An information processing system comprising:
a first information processing apparatus, and
a second information processing apparatus connected to the first information processing apparatus via a predetermined communication network; wherein
the first information processing apparatus is the information processing apparatus according to claim 1; and
the second information processing apparatus is configured to extract data that matches the matching condition, from the processed sequence data output by the first information processing apparatus, and to output the extracted data.

7. An information processing circuit configured:
to receive a matching condition for searching for a given pattern from sequence data including a plurality of symbols; and
to generate a finite state machine based on the received matching condition, the finite state machine being configured to generate information for removing data that does not match the matching condition from the sequence data,
wherein
the finite state machine includes a FIFO buffer having N number of memory blocks, and information about a rule of state transition of the finite state machine; and
each of the memory blocks includes an area for storing a flag indicating either a first state or a second state.

8. The information processing circuit according to claim 7, wherein the matching condition is described by an automaton.

9. The information processing circuit according to claim 7, wherein
the finite state machine is configured, each time a data element of the sequence data is received,
to retrieve a content in a memory block at an end of the buffer;
to perform state transition of the finite state machine based on the received data element and the rule;
to store, as an initial value, the flag indicating the second state into a memory block at a beginning of the buffer; and
to update the flags stored in the memory blocks, in accordance with the state of the finite state machine.

10. The information processing circuit according to claim 9, wherein
the finite state machine has a plurality of possible states, each of the possible states being a set of at least one pair of (s, n), where s is a state of possible states of the automaton, and n is a counter indicating a number of transitions required for the automaton in an initial state to transit to the state s of the automaton; and
after the finite state machine transits to a given state of the possible states, the given state being $\{(s_1, n_1) \ldots, (s_k, n_k)\}$, where $s_k$ is a state of possible states of the automaton, and "$n_k$" is a counter indicating a number of transitions required for the automaton in an initial state to transit to the state $s_k$ of the automaton (k is an integer not less than 1), the information processing circuit is configured to
(1) in a case in which a counter having a value N is present in the counters $n_1, \ldots, n_k$, to change the flags in all of the memory blocks in the buffer into the first state, and
(2) in a case in which an accepting state is included in the states $s_1, \ldots, s_k$, to specify a maximum value M of the counter corresponding to the accepting state, and to change the flags of M number of the memory blocks from the beginning of the buffer.

11. The information processing circuit according to claim 10, wherein
each of the memory blocks includes an area for storing a data element of the sequence data;
the information processing circuit is configured to input the sequence data into the finite state machine, on an element-by-element basis; and
the finite state machine is configured, when an input of the data element is received,
to store the received data element into the memory block at the beginning of the buffer, in addition to storing the flag of the initial value.

12. The information processing circuit according to claim 11, wherein
the sequence data is a character string;
each of the data elements in the sequence data is a character, the character being an element in a predetermined character set; and
the finite state machine is configured, in response to receiving the data element,
in a case in which the flag stored in the memory block at the end of the buffer is indicating the first state, to output a data element stored in the memory block at the end of the buffer, and
in a case in which the flag stored in the memory block at the end of the buffer is indicating the second state, to convert a data element stored in the memory block at the end of the buffer into a character not included in the predetermined character set, in order to remove data that does not match the matching condition from the sequence data, and to output the converted data element.

13. The information processing circuit according to claim 10, wherein
the automaton is a timed automaton;
the sequence data is a character string;
each of the data elements in the sequence data is a character having a timestamp, the character being an element in a predetermined character set; and
each time a data element of the sequence data is received,
the finite state machine is configured to output the flag stored in the memory block at the end of the buffer; and
the information processing circuit is configured,
in a case in which the flag output by the finite state machine is indicating the first state, to output a data element corresponding to the flag, and
in a case in which the flag output by the finite state machine is indicating the second state, to convert a data element corresponding to the flag into a character not included in the predetermined character set, in order to remove data that does not match the matching condition from the sequence data, and to output the converted data element.

14. A method of applying a predetermined process to sequence data of an event that is input to an information processing apparatus, the method performed by an information processing circuit in the information processing apparatus comprising:
receiving an automaton describing a predetermined matching condition with respect to the sequence data;
generating a finite state machine based on the automaton;
receiving an input of the sequence data;
processing the sequence data so as to remove data that does not match the matching condition from the sequence data; and
outputting the processed sequence data,
wherein
the finite state machine includes a FIFO buffer having N number of memory blocks, and information about a rule of state transition of the finite state machine; and
each of the memory blocks includes an area for storing a flag indicating either a first state or a second state.

* * * * *